US008576549B2

(12) United States Patent
Hayashi et al.

(10) Patent No.: US 8,576,549 B2
(45) Date of Patent: Nov. 5, 2013

(54) TWO-AXIS HINGE AND MOBILE DEVICE

(75) Inventors: Wakato Hayashi, Tachikawa (JP);
Yuuichi Oota, Higashiyamato (JP);
Satoshi Tanaka, Tachikawa (JP);
Hirokazu Nagae, Tachikawa (JP);
Yusuke Yamamoto, Tachikawa (JP);
Nobuyoshi Ooba, Tachikawa (JP);
Tetsuo Ito, Yokohama (JP); Noriyuki Iwama, Higashiyamato (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/551,174

(22) Filed: Jul. 17, 2012

(65) Prior Publication Data

US 2012/0279016 A1 Nov. 8, 2012

Related U.S. Application Data

(62) Division of application No. 12/757,707, filed on Apr. 9, 2010, now Pat. No. 8,385,056.

(30) Foreign Application Priority Data

Apr. 28, 2009 (JP) ................................. 2009-108967
May 13, 2009 (JP) ................................. 2009-116160

(51) Int. Cl.
*G06F 1/16* (2006.01)
*H04M 1/00* (2006.01)
*E05D 3/06* (2006.01)
*E05D 3/10* (2006.01)

(52) U.S. Cl.
USPC ............ 361/679.06; 361/679.07; 361/679.55; 361/679.56; 455/575.1; 455/575.3; 16/366; 16/367

(58) Field of Classification Search
USPC ............ 361/679.01–679.45, 679.55–679.59; 455/575.1, 575.3, 575.4; 16/366, 367
See application file for complete search history.

(56) References Cited

U.S. PATENT DOCUMENTS

| 7,548,414 | B2 * | 6/2009 | Hung ..................... 361/679.27 |
| 2003/0167600 | A1 * | 9/2003 | Chien et al. ................ 16/367 |
| 2003/0167601 | A1 * | 9/2003 | Chen ........................ 16/367 |
| 2005/0160558 | A1 * | 7/2005 | Kim ......................... 16/367 |
| 2006/0293095 | A1 * | 12/2006 | Takagi .................. 455/575.3 |
| 2008/0034549 | A1 * | 2/2008 | Lee et al. ................... 16/367 |
| 2008/0204985 | A1 * | 8/2008 | Bae et al. .................. 361/681 |

FOREIGN PATENT DOCUMENTS

| JP | 2004-204950 | 7/2004 |
| JP | 2004-304458 | 10/2004 |
| JP | 2005-143000 | 6/2005 |
| JP | 2005-216158 | 8/2005 |

(Continued)

*Primary Examiner* — Jayprakash N Gandhi
*Assistant Examiner* — Nidhi Desai
(74) *Attorney, Agent, or Firm* — Cozen O'Connor

(57) ABSTRACT

A two-axis hinge unit is provided with a first rotating shaft that rotates so as to open in the vertical direction from a folded state with a first casing and a second casing overlapping and a second rotating shaft that rotates so as to open in the horizontal direction from a folded state with the first casing and the second casing overlapping, and is provided with a restriction member positioned between the first rotating shaft and the second rotating shaft that, when one of the rotating shafts is in a predetermined rotational position, is pressed by this one rotating shaft and engages with the other rotating shaft, thereby restricting rotation of that other rotating shaft.

2 Claims, 65 Drawing Sheets

(56) References Cited

FOREIGN PATENT DOCUMENTS

| | | | |
|---|---|---|---|
| JP | 2005216158 A | * | 8/2005 |
| JP | 2005-277626 | | 10/2005 |
| JP | 2005-286425 | | 10/2005 |
| JP | 2005-340952 | | 12/2005 |
| JP | 2006-022899 | | 1/2006 |
| JP | 2006-246535 | | 9/2006 |
| JP | 2007-282263 | | 10/2007 |
| JP | 2008-054179 | | 3/2008 |
| JP | 4176756 | | 8/2008 |
| JP | 2008-263285 | | 10/2008 |
| JP | 4216887 | | 11/2008 |
| JP | 2009-068550 | | 4/2009 |
| JP | 4286735 | | 4/2009 |
| JP | 2009068550 A | * | 4/2009 |

* cited by examiner

TWO-AXIS HINGE AND MOBILE DEVICE

CROSS-REFERENCE TO RELATED APPLICATION

This is a division of application Ser. No. 12/757,707, filed Apr. 9, 2010 which claims the benefit of Japanese Patent Application No. 2009-108967, filed on Apr. 28, 2009, and Japanese Patent Application No. 2009-116160, filed on May 13, 2009, the entire disclosures of which are incorporated by reference herein.

FIELD

This application relates generally to a two-axis hinge and a mobile device provided with a two-axis hinge.

BACKGROUND

Foldable mobile handsets equipped with a two-axis hinge such that a display case can be in the vertical direction or the horizontal direction with respect to an operation unit case, the style of the handset being changeable through this two-axis hinge, have been known from before. For example, such a device is disclosed in Japanese Patent No. 4216887.

In addition, Unexamined Japanese Patent Application KOKAI Publication No. 2005-143000 discloses a mobile device comprising a main body having an operation unit, a cover having a display, and a connecting unit with a built-in camera, with the main body and the cover connected by the connecting unit and the connecting unit rotating so that the main body and cover can slide relative to each other.

As can be seen in the example disclosed in Japanese Patent No. 4216887, with a conventional two-axis hinge there are no restrictions on the two axes, which open two cases vertically and horizontally, so the case can be opened in an arbitrary direction. However, when the user releases the case swiftly in the vertical or horizontal direction to change the style of the mobile handset, the case may rotate in an unintended direction, making it difficult to smoothly operate the two-axis hinge.

In addition, when taking video with a mobile phone, it is desirable from the perspective of visibility to take video while viewing the display screen horizontally the same as the configuration of a normal movie, but with the example disclosed in Unexamined Japanese Patent Application KOKAI Publication No. 2005-143000, the display is a vertical screen, so switching to a horizontal display on this vertical screen would make the display smaller.

SUMMARY

It is an objective of the present invention to improve the operability of a two-axis hinge that releases a case vertically or horizontally and a mobile device equipped with such a two-axis hinge.

In order to achieve the above objective, the two-axis hinge according to a first aspect of the present invention is provided with:
  a first rotating shaft, which is positioned on a boundary between an end of a first casing and an end of a second casing, and which through rotating in one direction changes between a folded state with the first casing and the second casing overlapping and an open state with the first casing and the second casing separated from each other;
  a second rotating shaft, which is positioned orthogonal to the first rotating shaft, and which through rotating in another direction orthogonal to the first direction changes between a folded state with the first casing and the second casing overlapping and an open state with the first casing and the second casing separated from each other; and
  a restriction member, which is positioned at an end of the first rotating shaft and an end of the second rotating shaft facing the end of the first rotating shaft, such that when one of the rotating shafts is in a predetermined rotational position, the restriction member is pressed by the one rotating shaft and engages with the other rotating shaft, restricting rotation of the other rotating shaft.

In order to achieve the above objective, a mobile device according to a second aspect of the present invention is provided with:
  a first casing;
  a second casing; and
  a two-axis hinge comprising a first rotating shaft, which is positioned on a boundary between an end of the first casing and an end of the second casing, and which through rotating in one direction changes between a folded state with the first casing and the second casing overlapping and an open state with the first casing and the second casing separated from each other; a second rotating shaft, which is positioned orthogonal to the first rotating shaft, and which through rotating in another direction orthogonal to the first direction changes between a folded state with the first casing and the second casing overlapping and an open state with the first casing and the second casing separated from each other; and a restriction member, which is positioned at an end of the first rotating shaft and an end of the second rotating shaft facing the end of the first rotating shaft, such that when one of the rotating shafts is in a predetermined rotational position, the restriction member is pressed by the one rotating shaft and engages with the other rotating shaft, restricting rotation of the other rotating shaft.

With the present invention, it is possible to improve ease-of-operation of a two-axis hinge that releases a casing vertically and horizontally and a mobile device provided with the two-axis hinge.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Figure 1:
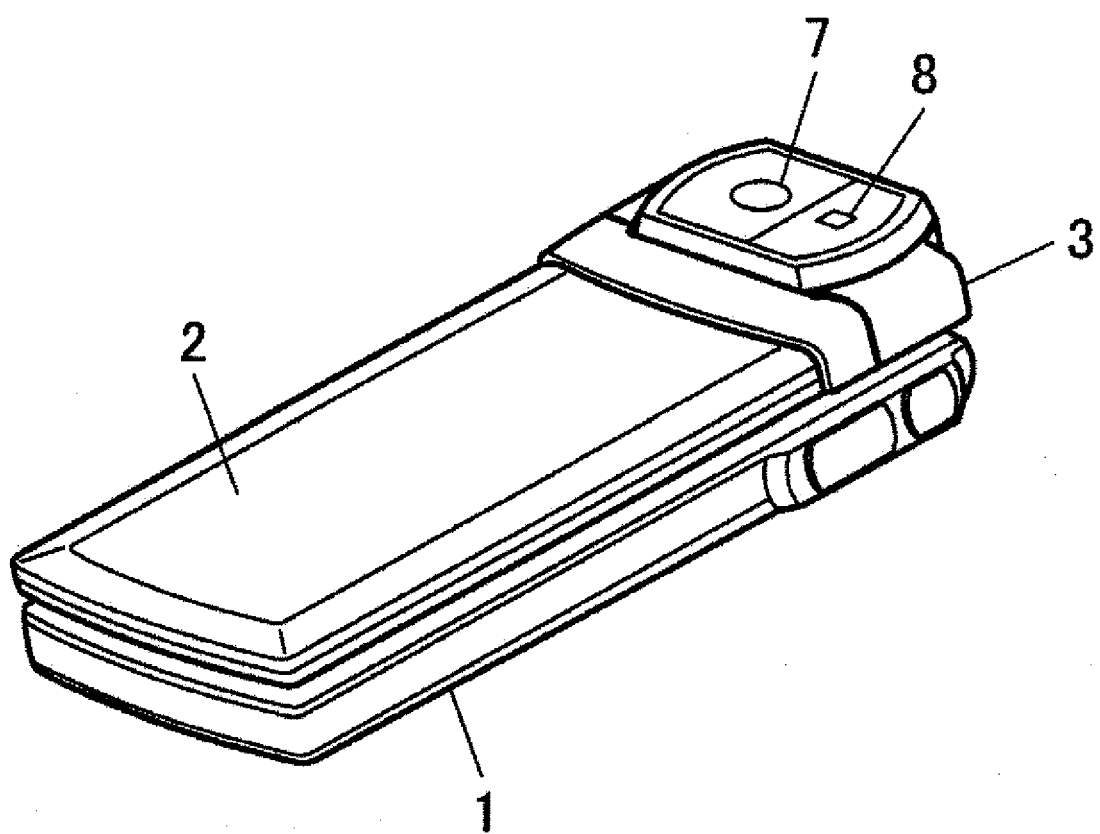
FIG. 1 is an oblique view showing the composition of a mobile device according to an embodiment of the present invention, and shows the folded style of a mobile phone.

FIGS. 1 to 4 show a mobile phone as the composition of a first embodiment of the present invention. This mobile phone is primarily composed of a first casing 1, a second casing 2, a third casing 3, an operation unit 4, a display unit 5, an antenna 6, a movie camera (photography unit) 7 and an illumination unit 8.

As shown in the drawing, the first casing 1, the second casing 2 and the third casing 3 of the mobile phone are joined via a below-described two-axis hinge unit 10. The operation unit 4 is provided in the first casing 1. The display unit 5 and the antenna 6 are provided in the second casing 2. The movie camera 7, which functions as the photography unit, and the illumination unit 8 are provided in the third casing 3.

Figure 5:
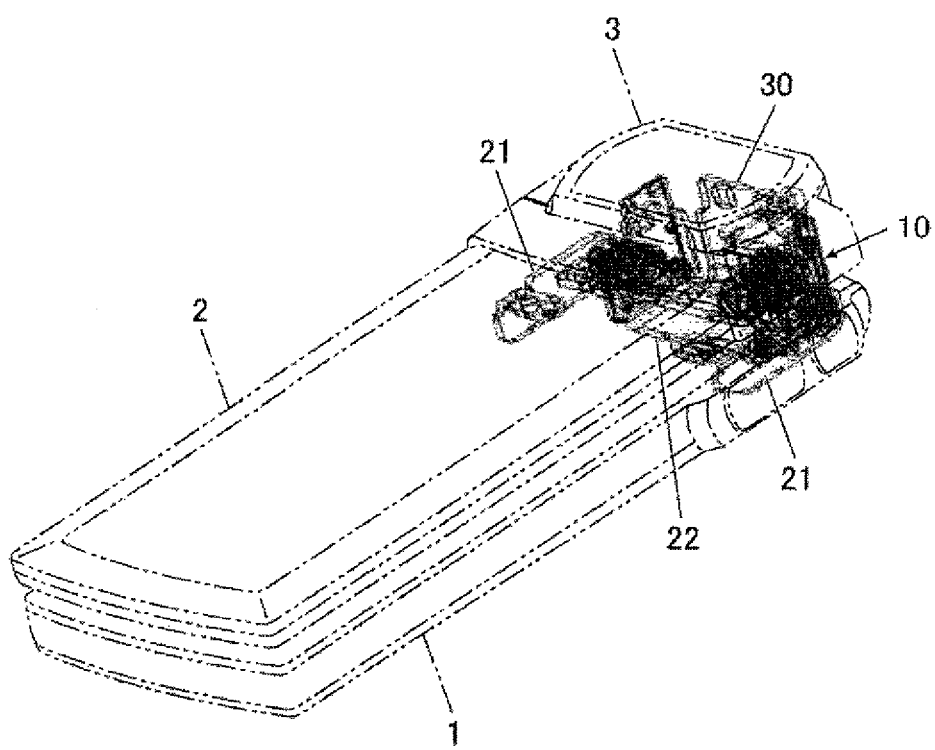
FIG. 5 is a drawing showing a hinge unit in the folded style shown in FIG. 1.
Figure 8:
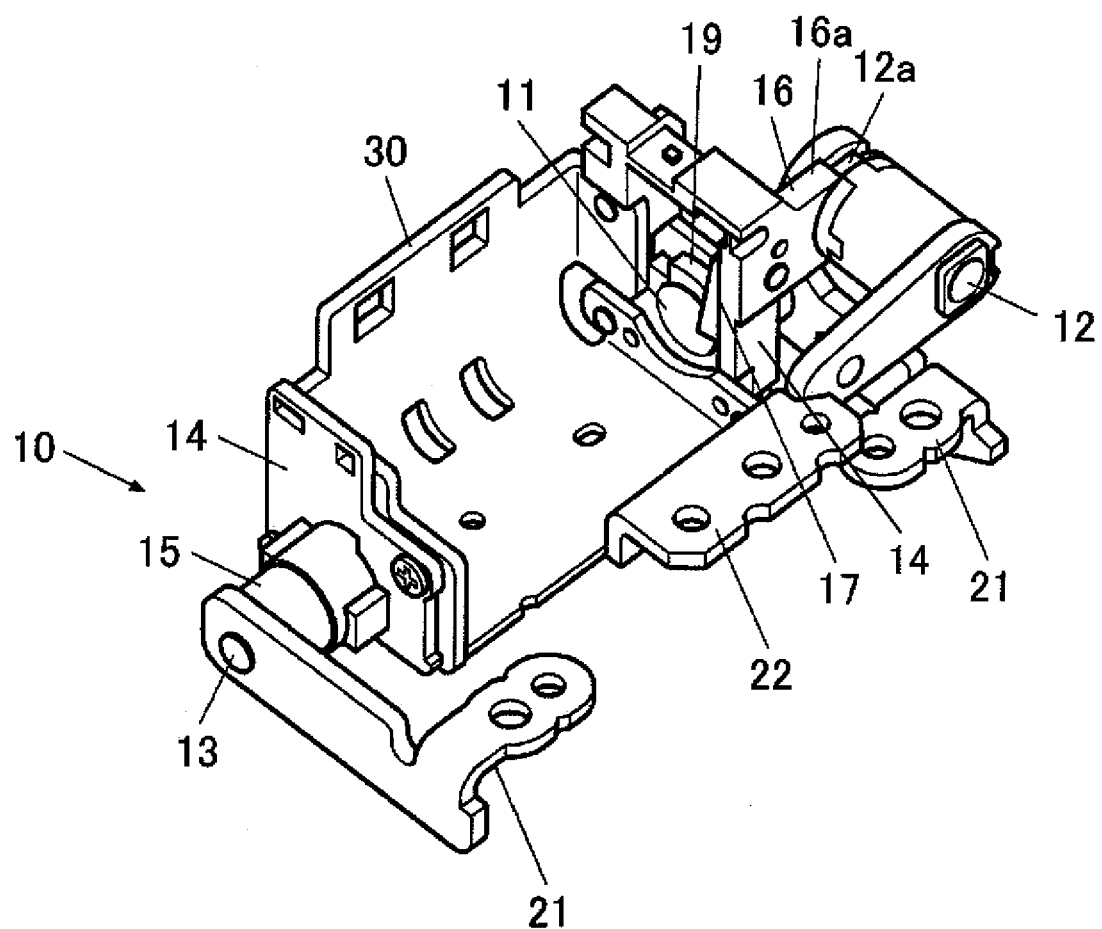
FIG. 8 is an oblique view showing the hinge unit in the folded style shown in FIG. 7.

FIGS. 5 and 8 show the two-axis hinge unit 10 incorporated inside the third casing 3.

As shown in FIG. 8, the two-axis hinge unit 10 is composed of a frame 30 for the third casing 3, a first rotating shaft 11 positioned to the right side of the frame 30 in FIG. 8, a second rotating shaft 12 positioned to the right side of the first rotating shaft 11, a third rotating shaft 13 positioned to the left side of the frame 30 in FIG. 8, a pair of first attachment members 21 provided respectively on the left and right first rotating shaft 11 and third rotating shaft 13, and a second attachment member 22 provided on the second rotating shaft 12. The second rotating shaft 12 is provided in a direction perpendicular to the first rotating shaft 11. In addition, the first attachment members 21 extend in a direction alongside the first casing 1 and the second attachment member 22 extends in a direction alongside the second casing 2.

The left and right first rotating shaft 11 and third rotating shaft 13 are positioned on the same axis, this axis extending in the left-right direction, and are hollow. Two brackets 14 are fastened by screws to the two outside surfaces of the frame 30. The first rotating shaft 11 is formed integrally with the lower portion of the right bracket 14 in FIG. 8 so as to be free to rotate via bearings. In addition, the third rotating shaft 13 on the left side in FIG. 8 is formed integrally with the lower portion of the left bridge 14 so as to be free to rotate via bearings 15. The bearings 15 have a composition that conveys to the user a click sensation at predetermined angles such as 90 degrees or the like.

One end of the two first attachment members 21 extending in a direction orthogonal to the axis of the first rotating shaft 11 and third rotating shaft 13 are pressure inserted onto the first rotating shaft 11 and the third rotating shaft 13 and integrally formed. The first attachment members 21 are formed in an arm shape bending in an "L" shape to the inside of the first casing 1. The other end of each of the first attachment members 21 is anchored by screws to the inside of the first casing 1. The first attachment members 21 are limited for example to 180 degrees of rotation through the interlocking structure of the bearings of the first rotating shaft 11 and the bearings 15 of the third rotating shaft 13.

Furthermore, the second rotating shaft 12 is on an axis extending in the lengthwise direction of the second casing 2 and is hollow. A protrusion 16 is integrally formed on the top of the outside surface of the bracket 14 on the right side surface in FIG. 8. The second rotating shaft 12 is integrally formed with the protrusion 16 so as to be free to rotate via bearings. One end of the second attachment member 22 extending in a direction orthogonal to the axis of the second rotating shaft 12 is formed integrally with second rotating shaft 12 by being pressure inserted onto the second rotating shaft 12. The other end of the second attachment member 22 is anchored by screws to the inside of the second casing 2. In addition, a groove 12a is formed in the outer circumference of the second rotating shaft 12 and an interlocking piece 16a that interlocks with the groove 12a is formed on the protrusion 16.

The angle of rotation of the second attachment member 22 is limited by the interlocking piece 16a interlocking into the groove 12a.

Figure 6:
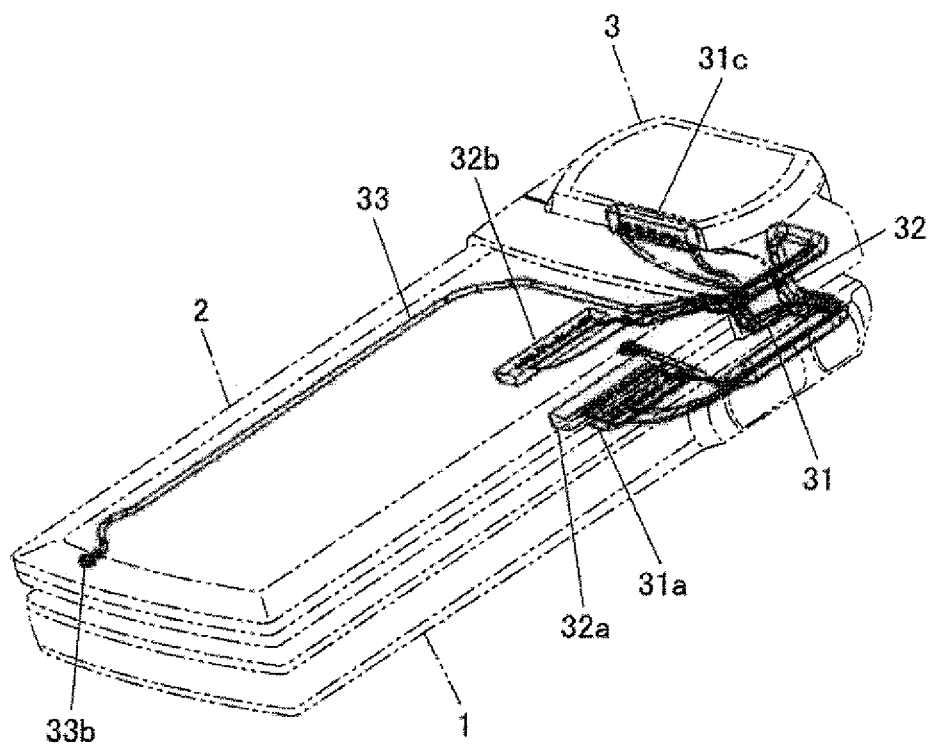
FIG. 6 is a drawing showing a wiring in the folded style shown in FIG. 1.
Figure 7:
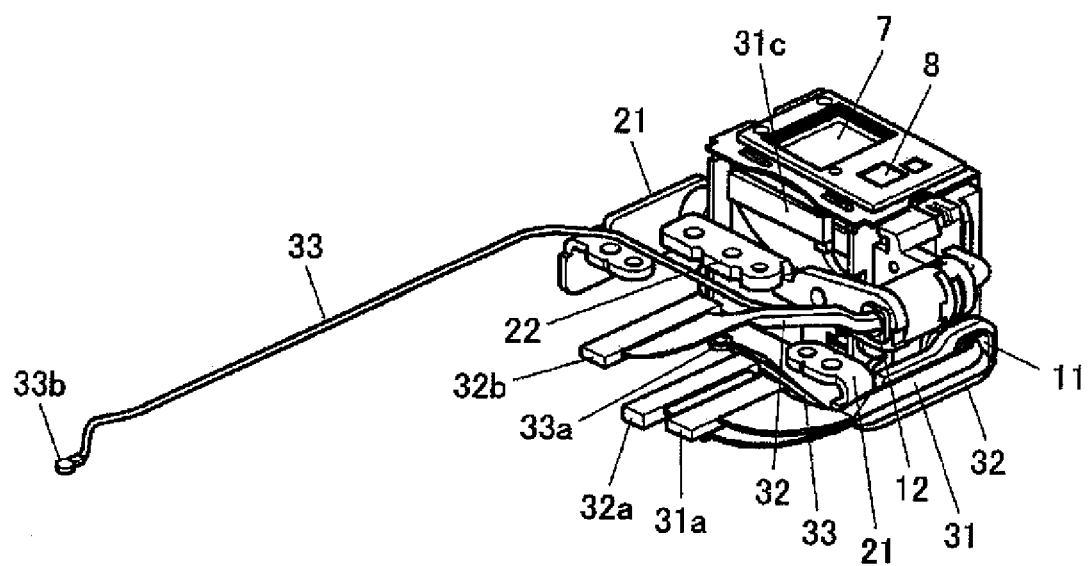
FIG. 7 is an enlarged oblique drawing combining the hinge unit shown in FIG. 5 with the wiring shown in FIG. 6.

FIG. 6 shows a first wiring 31 and a second wiring 32, and FIG. 7 is a drawing of the first wiring 31 and the second wiring 32 combined with the two-axis hinge unit 10.

The first wiring 31 is a coaxial cable provided on one end with a connector 31a that connects to a circuit board inside the first casing 1 and provided on the other end with a connector 31c that connects to a circuit board inside the third casing 3. The first wiring 31 is connected from the connector 31a inside the first casing 1 to the connector 31c inside the third casing 3 by passing through the hollow interior of the first rotating shaft 11 on the right side in FIG. 7.

Furthermore, the second wiring 32 is a coaxial cable provided on one end with a connector 32a that connects to a circuit board inside the first casing 1 and provided on the other end with a connector 32b that connects to a circuit board inside the second casing 2. The second wiring 32 is connected from the connector 32a inside the first casing 1 to the connector 32b inside the second casing 2 by passing through the hollow interior of the first rotating shaft 11 on the right side in FIG. 7, passing through the inside of the third casing 3, passing through a hole 81a in a below-described holding member 81 and passing through the hollow interior of the second rotating shaft 12.

In addition, an antenna wire 33 is provided on one end with a terminal 33a connected to a circuit board inside the first casing 1 and is provided on the other end with a terminal 33b connected to a circuit board inside the second casing 2. The antenna wire 33 is connected from the terminal 33a inside the first casing 1 to the terminal 33b inside the second casing 2 by passing through the hollow interior of the first rotating shaft 11 on the right side in FIG. 7, passing through the inside of the third casing 3, passing through the hole 81a of the below-described holding member 81 and passing through the hollow interior of the second rotating shaft 12.

Figure 9:
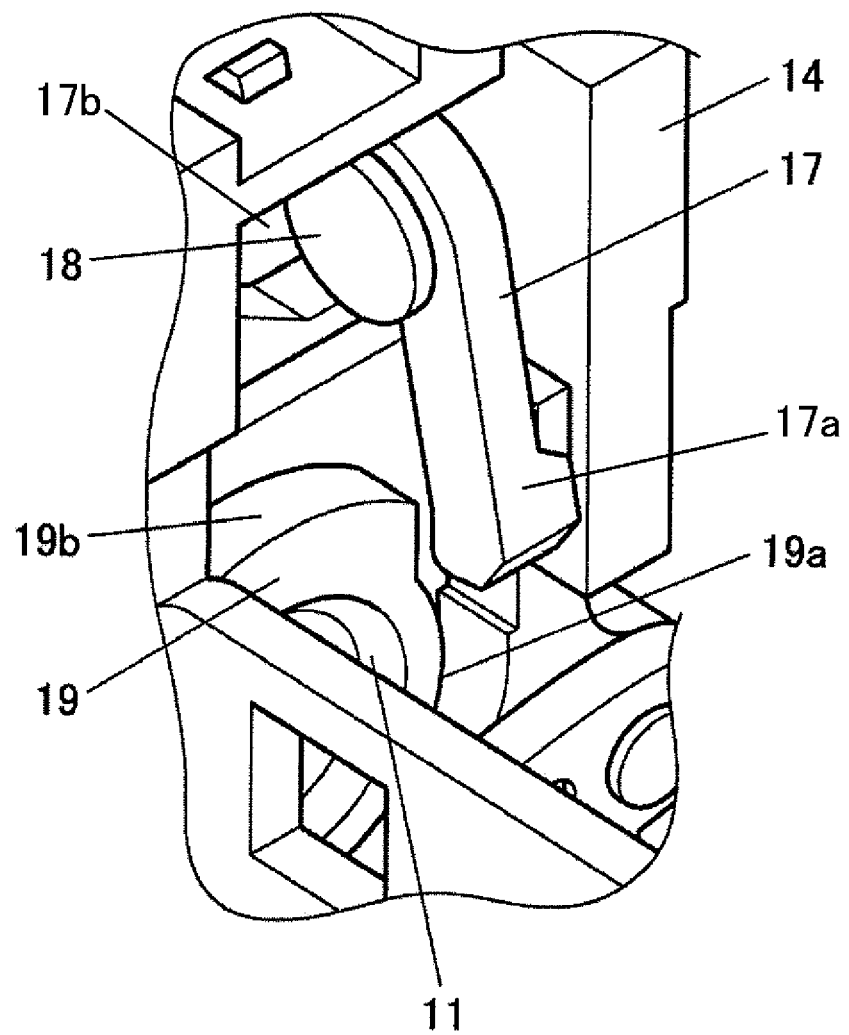
FIG. 9 is an enlarged diagram showing a restriction member of the hinge unit shown in FIG. 8.
Figure 10:
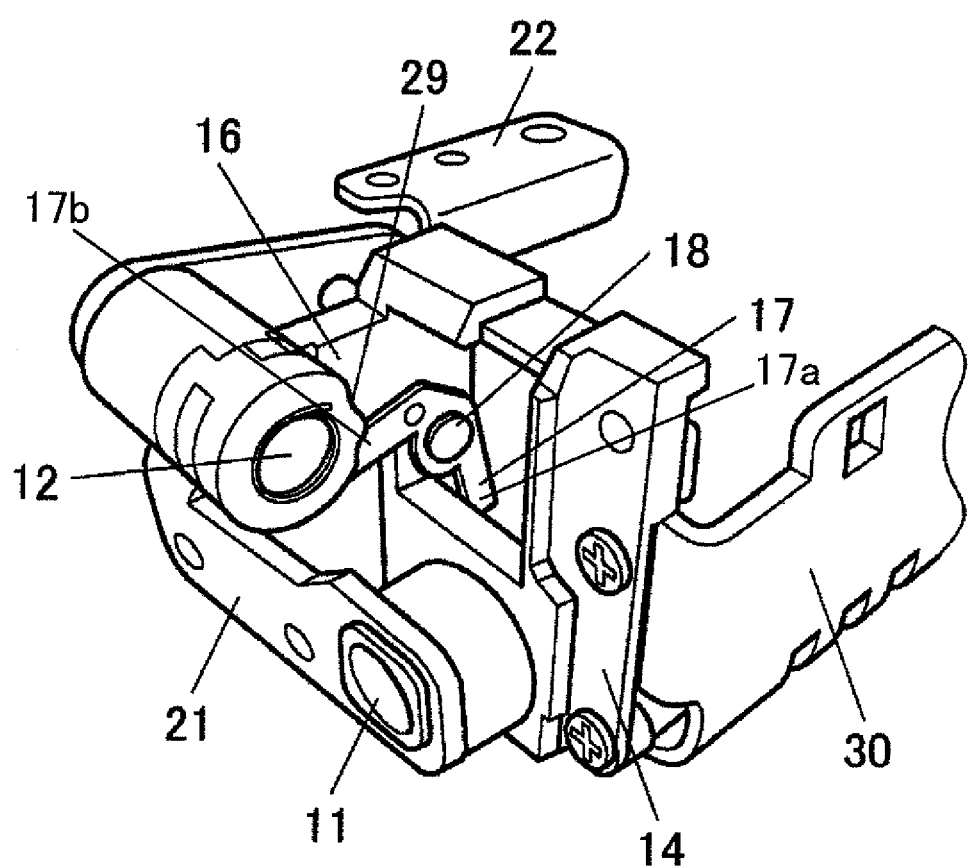
FIG. 10 is a drawing showing the restriction member of the hinge unit shown in FIG. 8 as viewed from a different direction.

Next, the restriction member that restricts the action of the various rotating shafts in the two-axis hinge unit will be described. FIG. 9 shows an enlargement of the restriction unit of the two-axis hinge unit 10, and FIG. 10 shows the restriction unit of the two-axis hinge unit 10 of FIG. 8 as viewed from a different direction. The two-axis hinge unit 10 is provided with a restriction plate 17, a pin 18 and a first cam 19.

As shown in FIGS. 9 and 10, the restriction plate 17 extends upwards from a bottom end 17a positioned inside the frame 30 and is formed in an L shape reaching to a side end 17b abutting the second rotating shaft. The restriction plate 17 is assembled on a side surface of the protrusion 16 positioned on top of the bracket 14 so as to be capable of swinging by the pin 18 directed parallel to the second rotating shaft 12. The restriction plate 17 is formed so that the bottom end 17a thereof abuts the outer perimeter of the first cam 19 formed on the end perimeter of the first rotating shaft 11 and the side end 17b abuts the outer perimeter of a second cam 29 formed on the end perimeter of the second rotating shaft 12.

Figure 11:
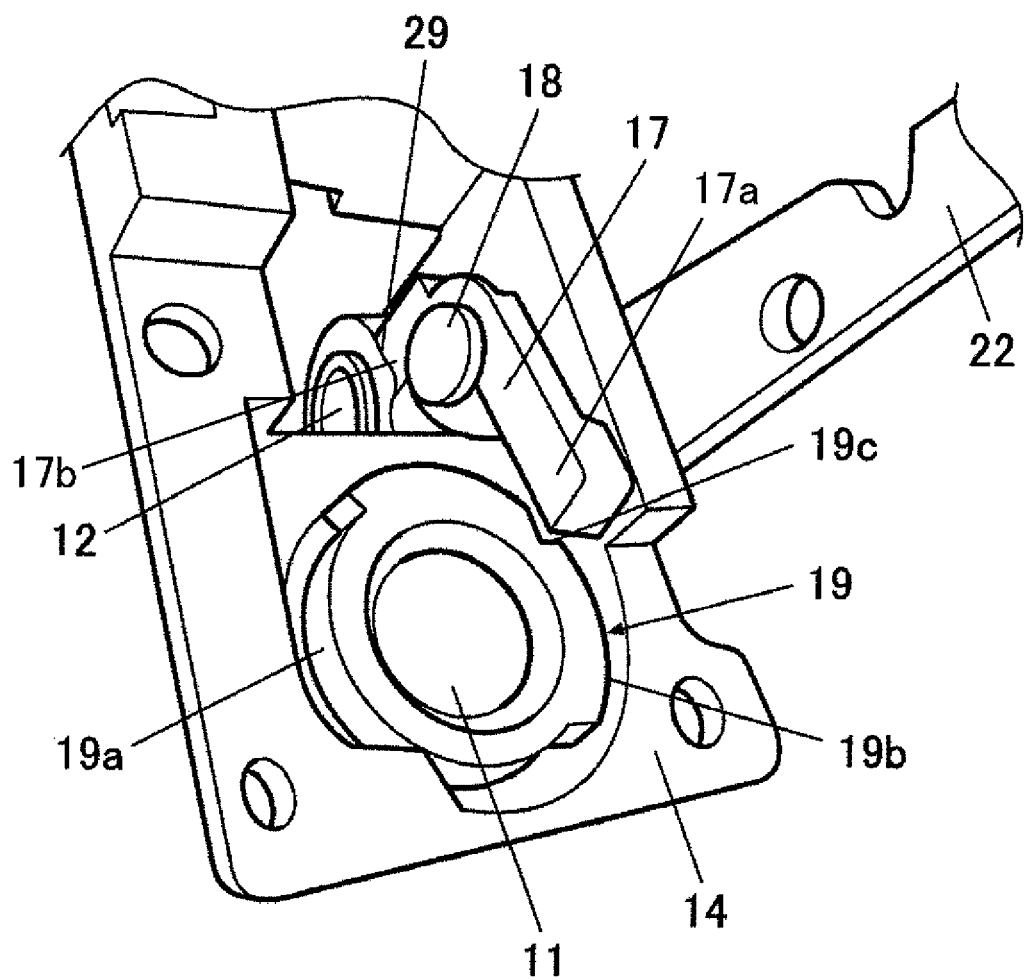
FIG. 11 is an enlarged diagram showing the state when the restriction is released by the restriction member shown in FIG. 10.
Figure 12:
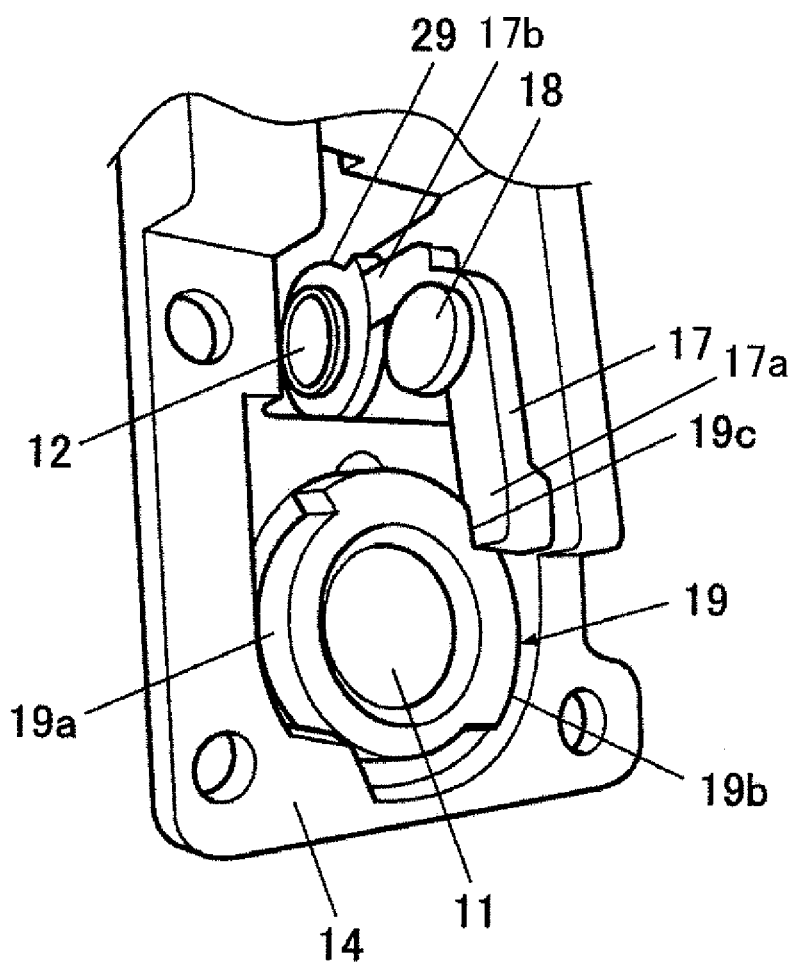
FIG. 12 is an enlarged diagram showing the restriction operation state of the restriction member shown in FIG. 10.

The first cam 19 formed on the end perimeter of the first rotating shaft 11 is composed of a small-diameter part 19a formed into an extended semicircle on the first rotating shaft 11, a large-diameter part 19b similarly formed into a shortened semicircle and a notch 19c formed in the center of that large-diameter part 19b, as shown in FIGS. 11 and 12. When the first casing 1 and the third casing 3 are in an overlapping state (in folded style or book style), the lower end 17a of the restriction plate 17 is placed in a position opposing the small-diameter part 19a of the first cam 19. In addition, when the device is in the normal open style with the first casing 1 and the third casing 3 separated by rotating relative to each other, the lower end 17a of the restriction plate 17 is placed at a position opposite the large-diameter part 19b of the first cam 19. In addition, in the case of the movie style when the first casing 1 and the third casing 3 are in a state separated by rotation relative to each other, the lower end 17a of the restriction plate 17 is placed at a position opposite the notch 19c of the large-diameter part 19b of the first cam 19.

The second cam 29 formed at the end perimeter of the second rotating shaft 12 has on its perimeter surface indentations and protrusions formed with predetermined heights and widths. When the center axis of the second casing 2 and the center axis of the third casing 3 are collinear (normal open style or movie style), the indentation of the second cam 29 and the side end 17b of the restriction plate 17 abut. On the other hand, when the center the second casing 2 and the third casing 3 are not coaxially provided, the protrusion of the second cam 29 and the side end 17b of the restriction plate 17 abut.

When the side end 17b is abutting the indentation on the second cam 29, the restriction plate 17 permits rotation of the first rotating shaft 11 by the bottom end 17a being separated in the vertical direction from the first cam 19 on the end outer perimeter of the first rotating shaft 11, as shown in FIG. 11.

In addition, when the side end 17b is abutting the protrusion on the second cam 29 and the bottom end 17a is protruding into the difference in levels between the small diameter part 19a and the large diameter part 19b of the first cam 19, or when the bottom end 17a is engaging with the notch 19c in the first cam 19, as shown in FIG. 12, the restriction plate 17 restricts rotation of the first rotating shaft 11.

Figure 13:
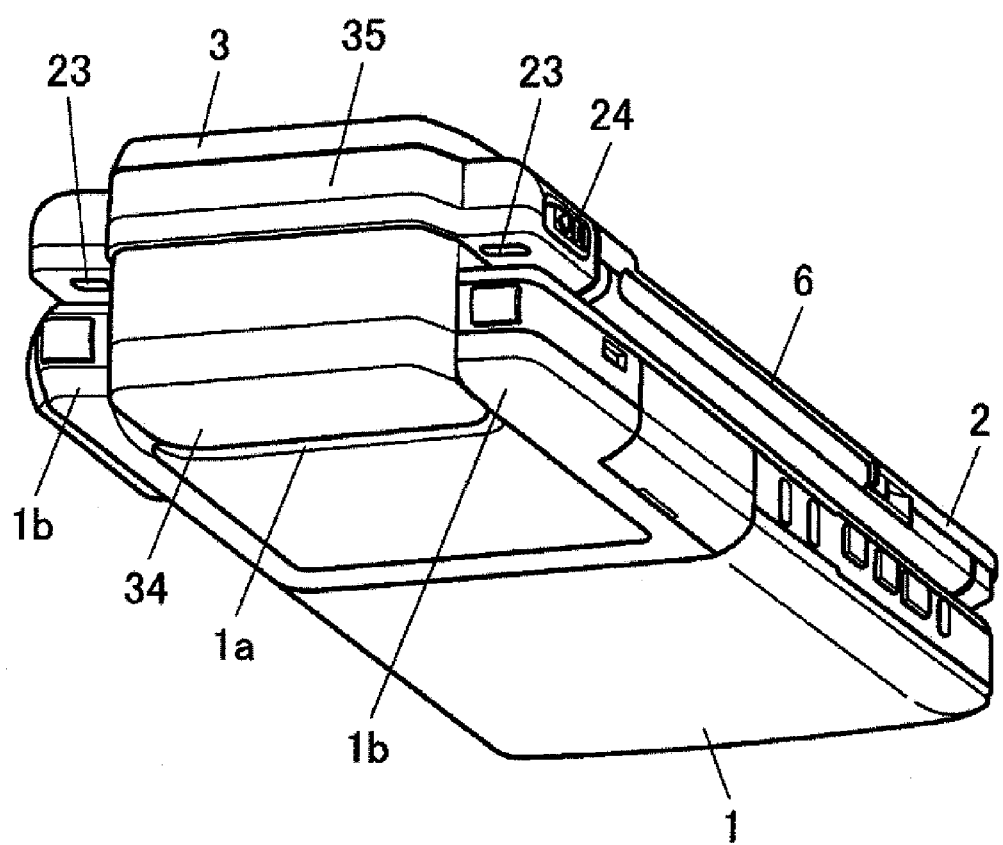
FIG. 13 is an enlarged diagram of the folded-style mobile phone of FIG. 1 as viewed from a third casing side.

A mobile phone provided with the above-described two-axis hinge unit is described below. FIG. 13 shows an enlargement of the folding-style mobile phone of FIG. 1 as viewed from the third casing 3 side. The third casing 3 is composed of a bottom case 34 and a top case 35. The lower case 34, which is narrower than the top case 35, is positioned in an indentation 1a formed in the end of the first casing 1. This lower case 34 and protrusions 1b positioned on both sides of the indentation 1a in the first casing 1 are rotatably connected via the first rotating shaft 11 and the third rotating shaft 13. Through this, the second casing 2 and the third casing 3 can open and close with respect to the first casing 1 in the vertical direction about the first rotating shaft 11 and the third rotating shaft 13.

In addition, in the folded style, the top case 35 is positioned on an extension of the second casing 2, as shown in the drawing. A portion of the side of this top case 35 and a portion of the side of the second casing 2 are rotatably connected via the second rotating shaft 12. Through this, the second casing 2 can open and close with respect to the third casing 3 in the horizontal direction about the second rotating shaft 12.

Figure 14:
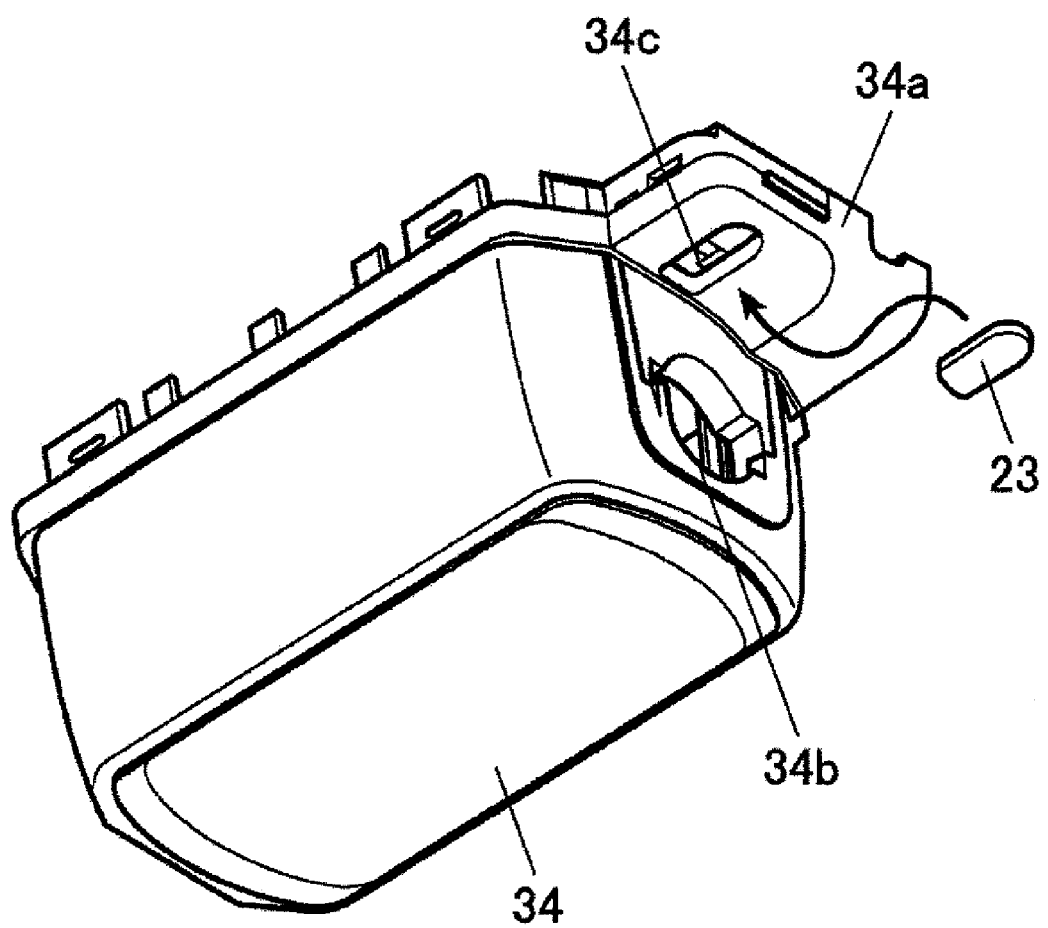
FIG. 14 is an oblique view showing bumpers and the third casing of the mobile phone of FIG. 13.

Furthermore, a protrusion 34a formed in a planar shape and extending in the left-right direction, is formed on the top of the lower case 34, as shown in FIG. 14. The protrusion 34a serves the function of closing the release of the top case 35, and a bumper 23 made of rubber or some other soft, shock-absorbing material, is provided on the bottom surface of the protrusion 34a. A below-described pass-through hole 34c formed on the bottom surface of the protrusion 34a, and the bumper 23 also serves the function of plugging the pass-through hole 34c. A hole 34b into which the first rotating shaft 11 is inserted is formed on the right side of the lower case 34 in FIG. 14, and a hole into which the third rotating shaft 13 is inserted is formed on the left side.

In addition, when the lower case 34 is made of resin, the pass-through hole 34c formed in the bottom surface of the protrusion 34a remains in order to form a slit 34d due to a protrusion provided in the bottom mold (unrepresented).

Figure 15:
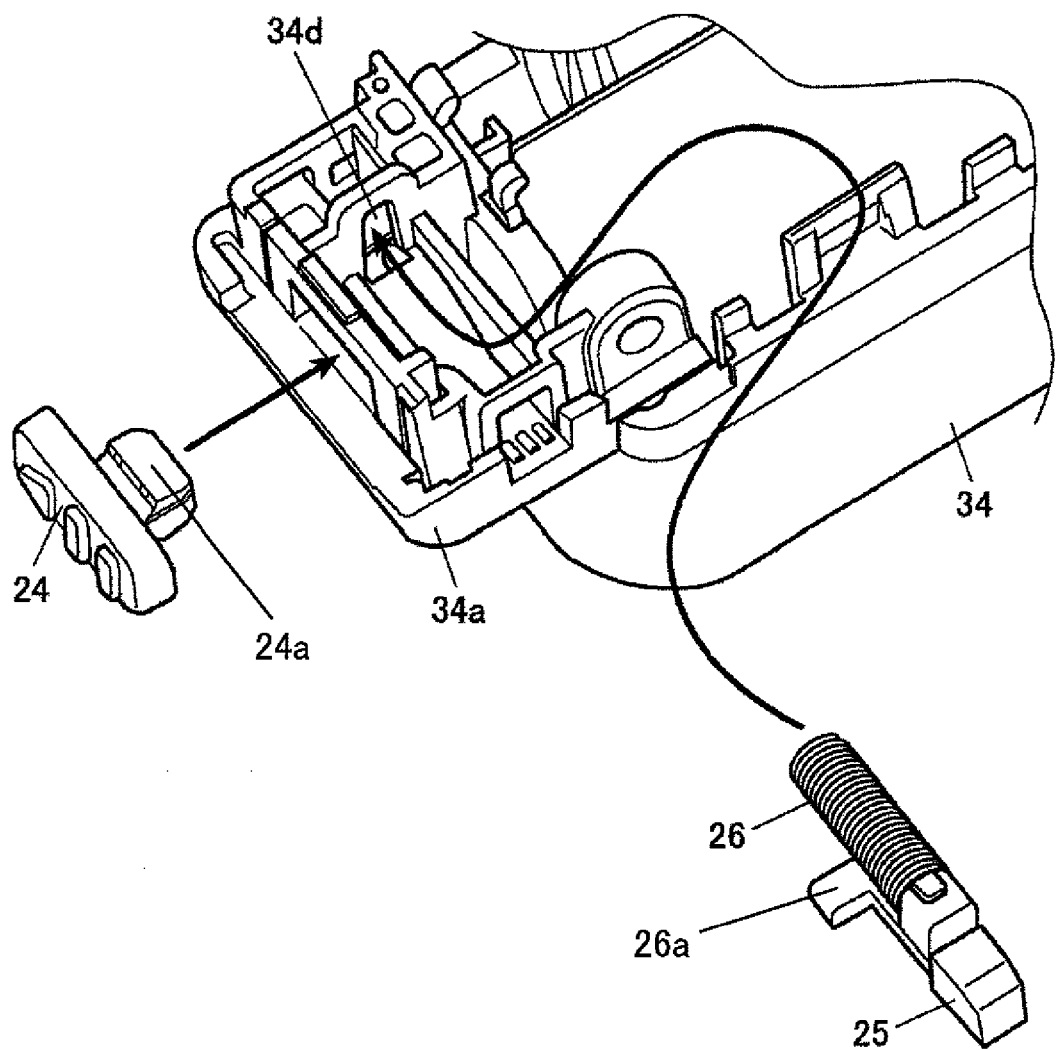
FIG. 15 is an exploded oblique diagram of a switch incorporated into the side surface of a bumper assembly of FIG. 14.

Furthermore, a lock release button 24 is incorporated into the third casing 3 on the side opposite the second rotating shaft 12 between the top surface of the side of the protrusion 34a of the lower case 34 and the bottom surface of the side of the top case 35, as shown in FIGS. 13 and 15. The lock release button 24 has an arm 24a that protrudes into the third casing 3, as shown in FIG. 15. In addition, a slit 34d is formed in the top surface of the side of the protrusion 34a of the lower case 34. A lock clasp 25 is positioned on top of the protrusion 34a and is incorporated so as to engage with the slit 34d and freely slide in the direction of the second casing 2. In addition, a coil spring 26 is mounted on the lock clasp 25 and is incorporated so as to abut the member in which the slit 34d is formed. The lock clasp 25 is urged by the coil spring 26 in the direction of protruding from the end of the third casing 3. Furthermore, the arm 24a of the lock release button 24 engages integrally with an arm 26a of the lock clasp 25.

That is to say, the lock clasp 25 engages with an indentation (unrepresented) formed in the end of the second casing 2 through the urging force of the coil spring 26. The opening and closing action of the second casing 2 through rotation of the second rotating shaft 12 is restricted through the engagement of the lock clasp 25 and the indentation formed in the end surface of the second casing 2. In other words, the mobile phone is restricted from going from the folded style to the below-described book style. In addition, in the below-described movie style, the mobile phone is restricted from going to a high angle style and a low angle style. The lock release button 24 that engages with the lock clasp 25 is positioned to the side of the second casing 2 in the natural state.

On the other hand, when the lock release button 24 is slid by the user in a direction separating from the second casing 2, the engagement between the lock clasp 25 and the indentation formed in the end surface of the second casing 2 is released. When the engagement between the lock clasp 25 and the indentation formed in the end surface of the second casing 2 is released, the actions of opening and closing the second casing 2 through rotation of the second rotating shaft 12 is permitted. In other words, the mobile phone is permitted to go from the folded style to the below-described book style. In addition, in the movie style the mobile phone is permitted to go to the high angle style and the low angle style.

FIGS. 1 and 13 show the state with the second casing 2 and the third casing 3 overlapping the first casing 1 (the folded style). FIG. 8 shows the two-axis hinge unit 10 in this folded style. This is a state in which the first attachment members 21 and the second attachment member 22 are positioned parallel to the frame 30.

In this state, the side end 17b of the restriction plate 17 abuts the indentation in the second cam 29. At this time, the bottom end 17a of the restriction plate 17 is in a position separated in the vertical direction from the small diameter part 19a of the first cam 19, as shown in FIG. 9, and thus does not interfere with the first cam 19. Consequently, the restriction plate 17 permits rotation of the first rotating shaft 11 and rotation of the second rotating shaft 12.

Figure 16:
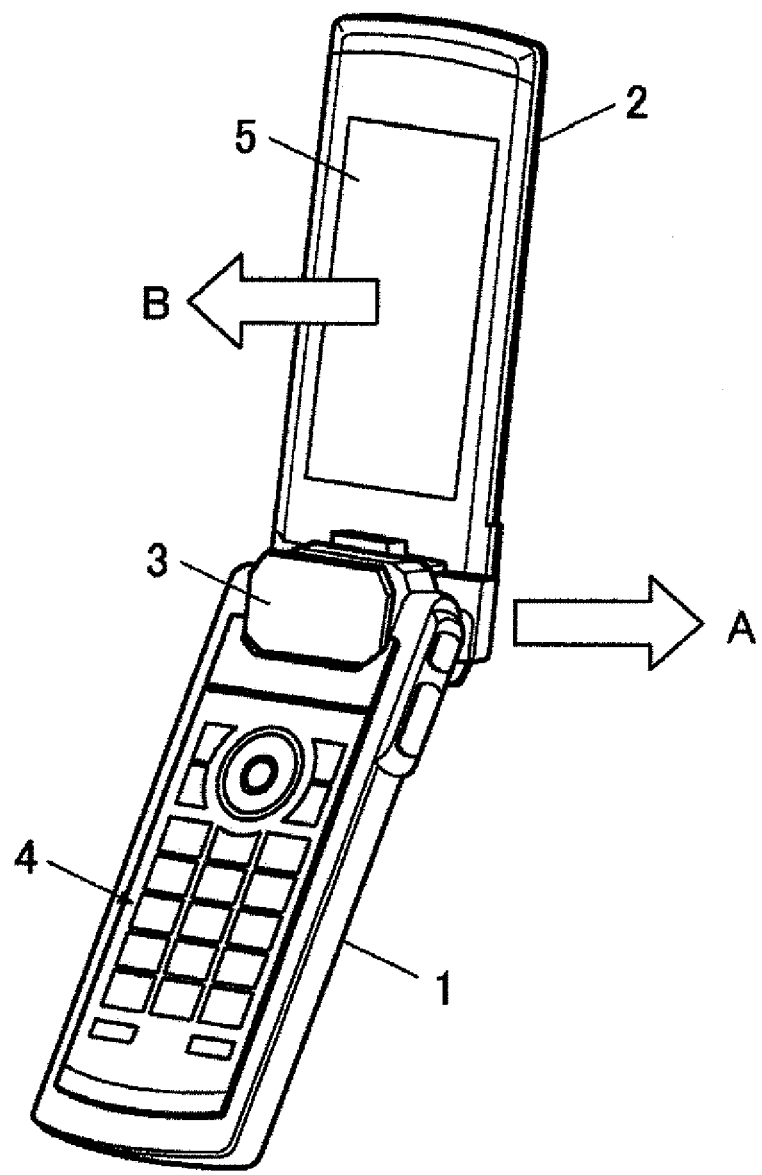
FIG. 16 is a drawing showing the screen and camera directions in the normal open style of FIG. 2.
Figure 17:
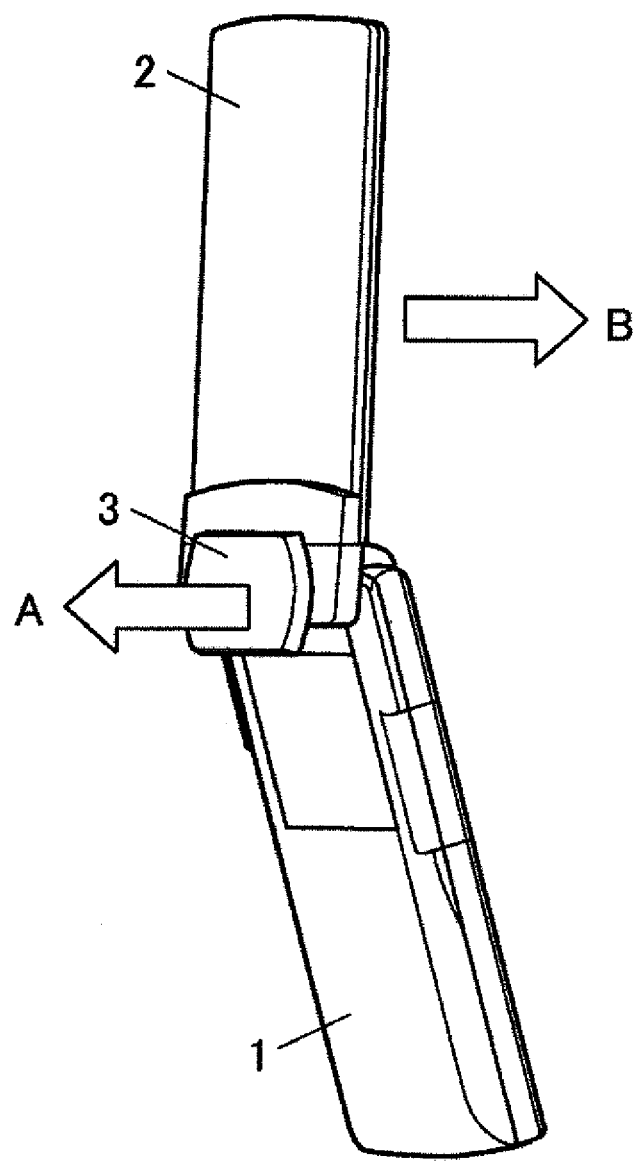
FIG. 17 is the mobile phone of FIG. 16 as viewed from a different direction.
Figure 18:
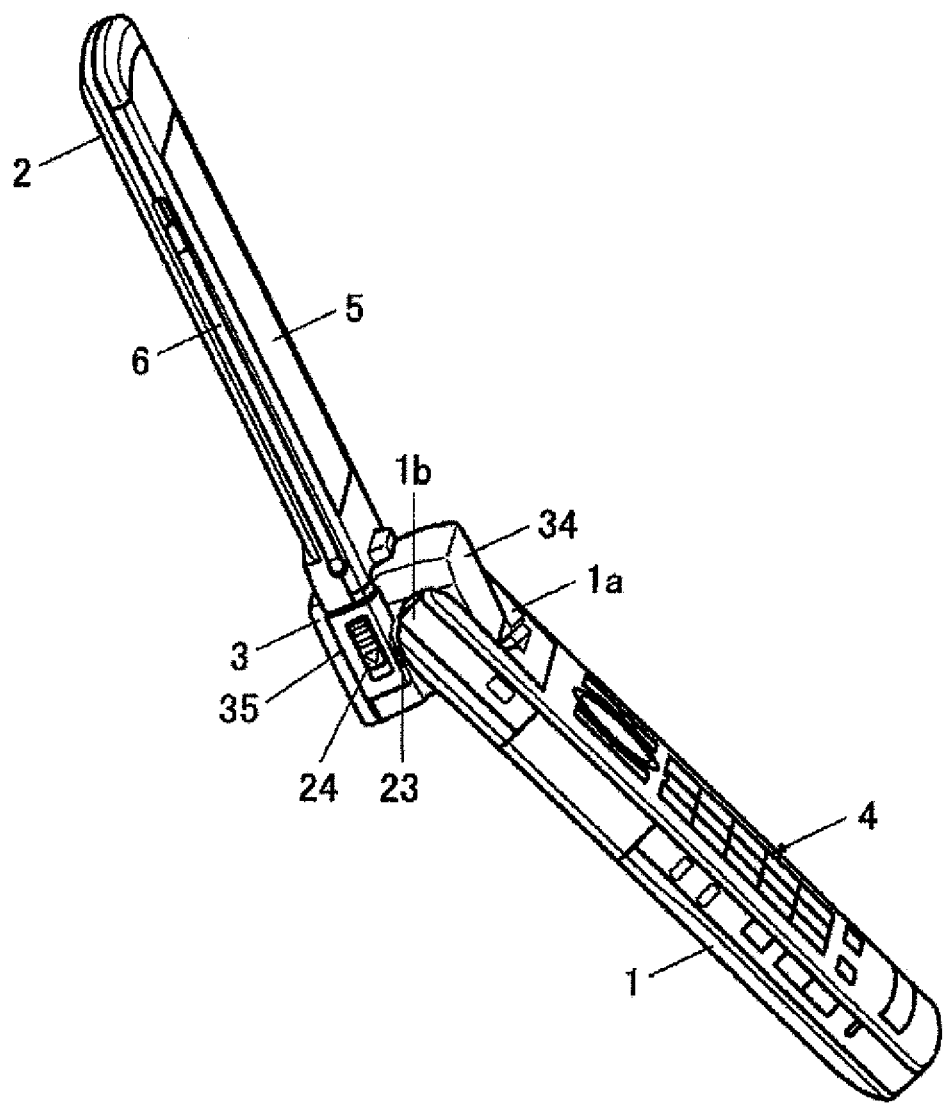
FIG. 18 is the mobile phone of FIG. 16 as viewed from a different direction.
Figure 21:
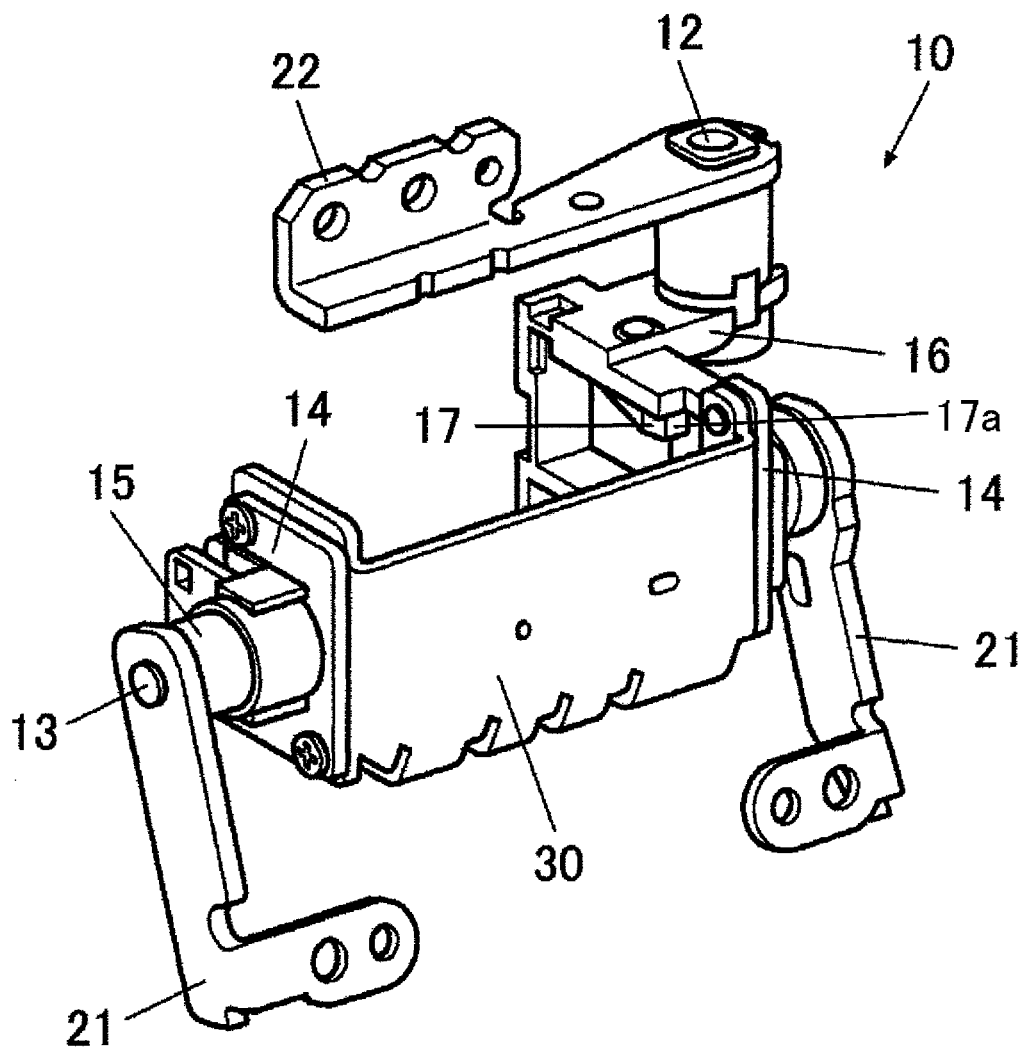
FIG. 21 is a drawing showing the hinge unit of FIG. 8 in normal open style.

Next, FIG. 2 and FIGS. 16 through 18 show the normal open style in which the second casing 2 and the third casing 3 are opened in the vertical direction with respect to the first casing 1 about the first rotating shaft 11 and the third rotating shaft 13. In FIGS. 16 and 17, the direction indicated by the arrow A in a direction orthogonal to the third casing 3 is the orientation of the movie camera 7. In addition, the direction indicated by the arrow B in a direction orthogonal to the second casing 2 is the orientation of the screen of the display unit 5. Furthermore, FIG. 21 shows the two-axis hinge unit 10 in this normal open style. This normal open style is a state in which the first rotating shaft 11 and the third rotating shaft 13 integrally connected to the left and right first attachment members 21 are rotated 180 degrees from the angle in the folded style.

Figure 22:
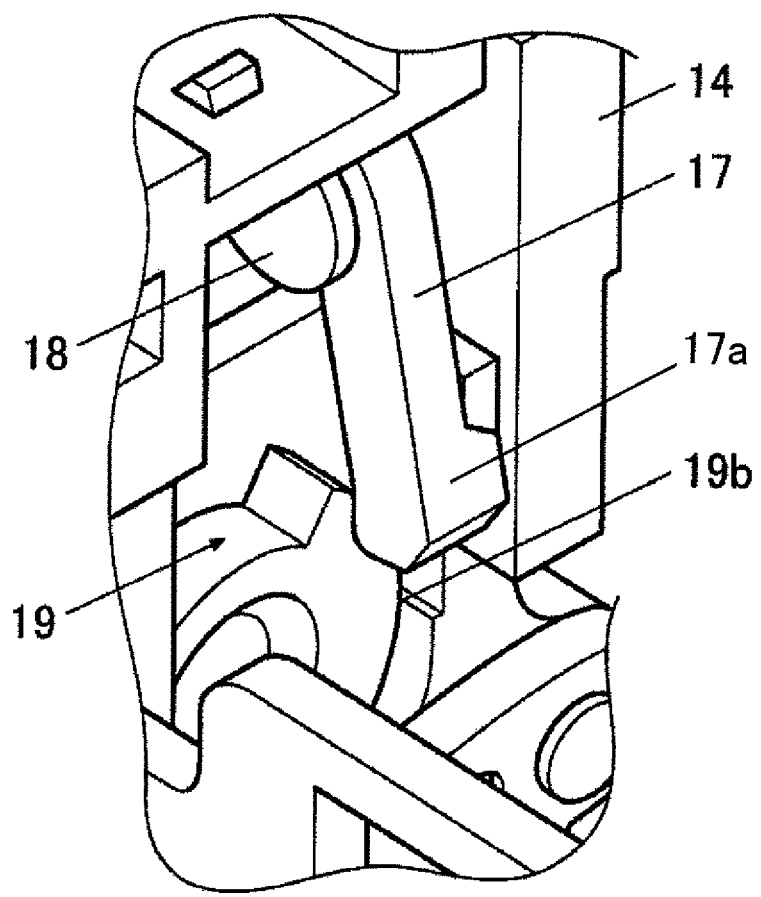
FIG. 22 is an enlarged view of the restriction member of the hinge unit of FIG. 21.

At this time, rotation of the first rotating shaft 11 is permitted because the bottom end 17a of the restriction plate 17 is separated in the vertical direction from the large diameter part 19b of the first cam 19, as shown in FIG. 22. On the other hand, rotation of the second rotating shaft 12 is restricted because the side end 17b abuts the protrusion of the second cam 29 formed on the end perimeter of the second rotating shaft 12 and the bottom end 17a abuts the large diameter part 19b of the first cam 19, as shown in FIG. 10.

Figure 19:
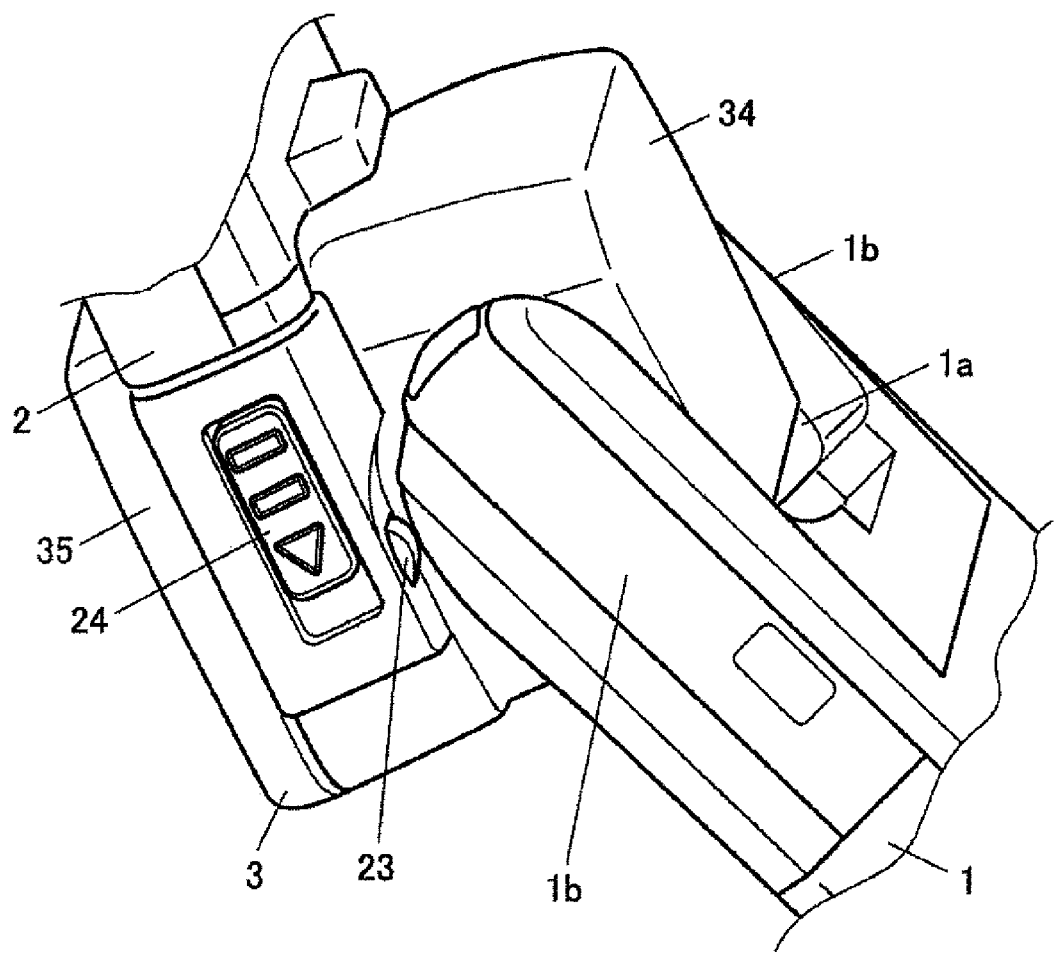
FIG. 19 is an enlarged view of a portion of the bumper of the mobile phone of FIG. 18.

Thus, by opening the second casing 2 and the third casing 3 to the maximum in the vertical direction with respect to the first casing 1 about the first rotating shaft 11 and the third rotating shaft 13, the mobile phone changes from the folded style to the normal open style. When changing styles in this manner, the back surface of the protrusion 1b of the first casing 1 and the third casing 3 abut, applying a shock. In order to soften the shock of the protrusion 1b of the first casing 1 and the third casing 3 abutting, the bumper 23 is formed in the inner surface of the third casing 3, as shown enlarged in FIG. 19.

Thus, the bumper 23, which functions as a shock-absorbing material in the normal open style, is positioned in a place not visible from the outside in a position inside the third casing 3 when in the folded style out of design considerations. In addition, the bumper 23 also has the function of plugging the pass-through hold 34c, as discussed above.

Figure 20:
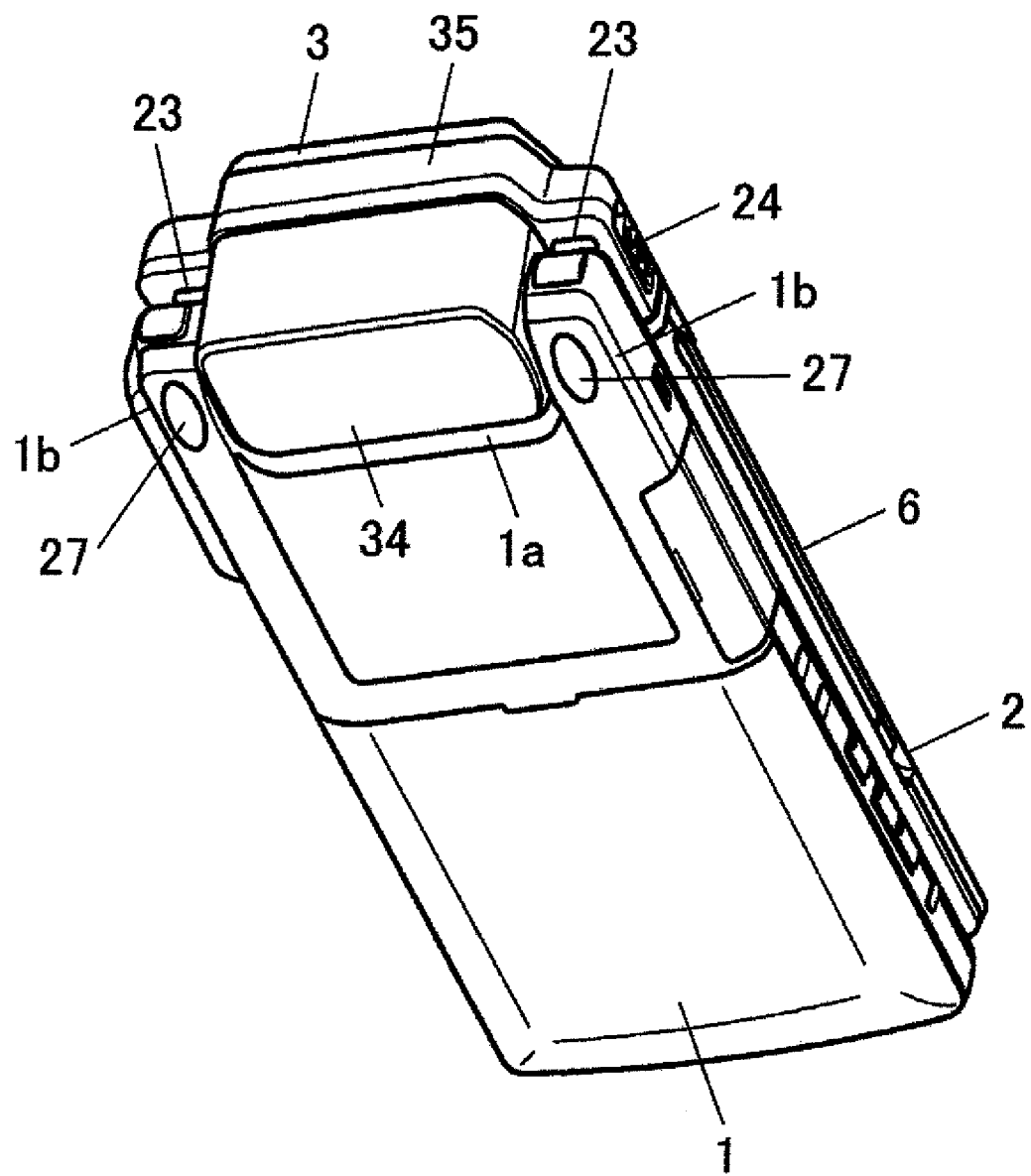
FIG. 20 is a drawing showing an example of a bumper attached to the side of the first casing of the mobile phone of FIG. 13.

A bumper (shock-absorbing material) 27 may also be provided on the rear surface of the protrusion 1b of the first casing 1, as shown in FIG. 20. This bumper 27 can absorb the impact when the rear surface of the protrusion 1b of the first casing 1 and the third casing 3 abut when the mobile phone is opened in the vertical direction, can absorb the impact when the mobile phone is placed on a desk or the like and can prevent damage from friction to other surfaces of the first casing 1. Furthermore, the bumper 27 can also be used as a means of concealing the screws that anchor the lower case and the upper case comprising the first casing 1.

Figure 3:
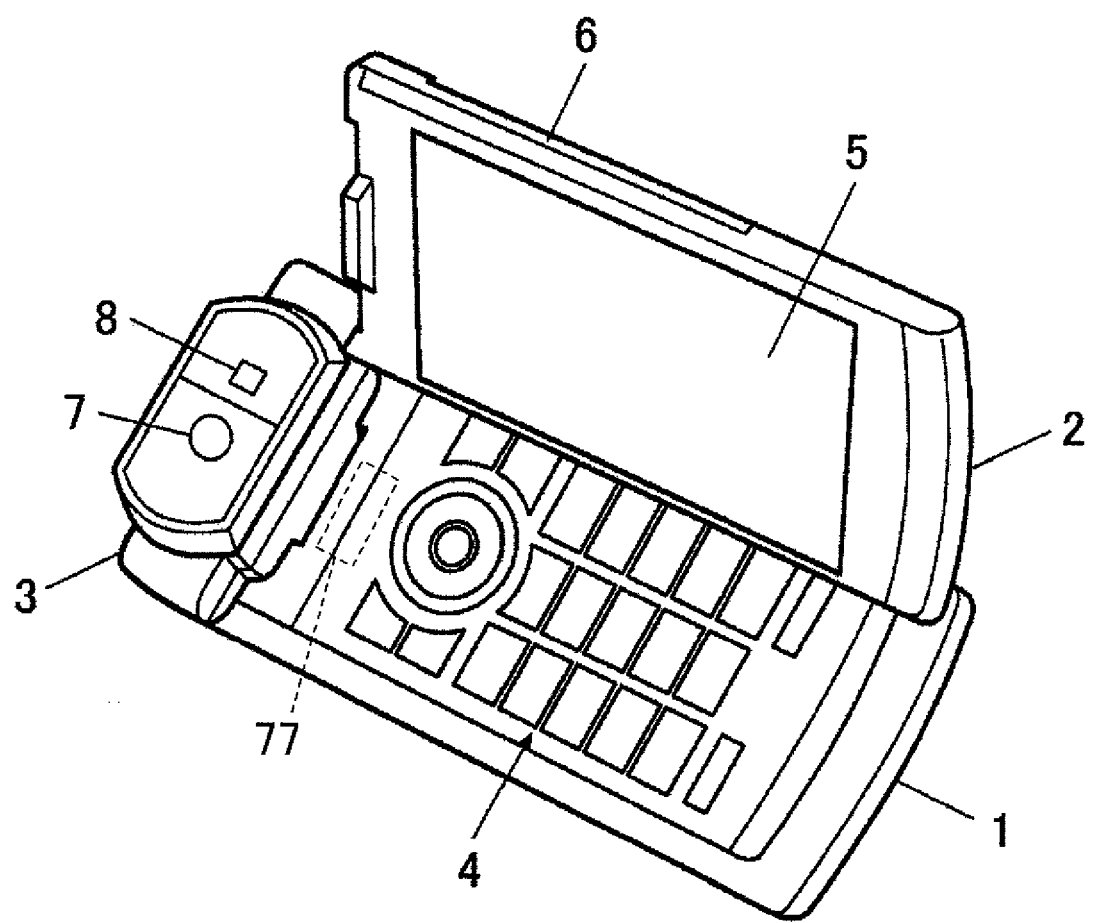
FIG. 3 is an oblique view showing the mobile phone shown in FIG. 1 in book style, opened in the horizontal direction.
Figure 4:
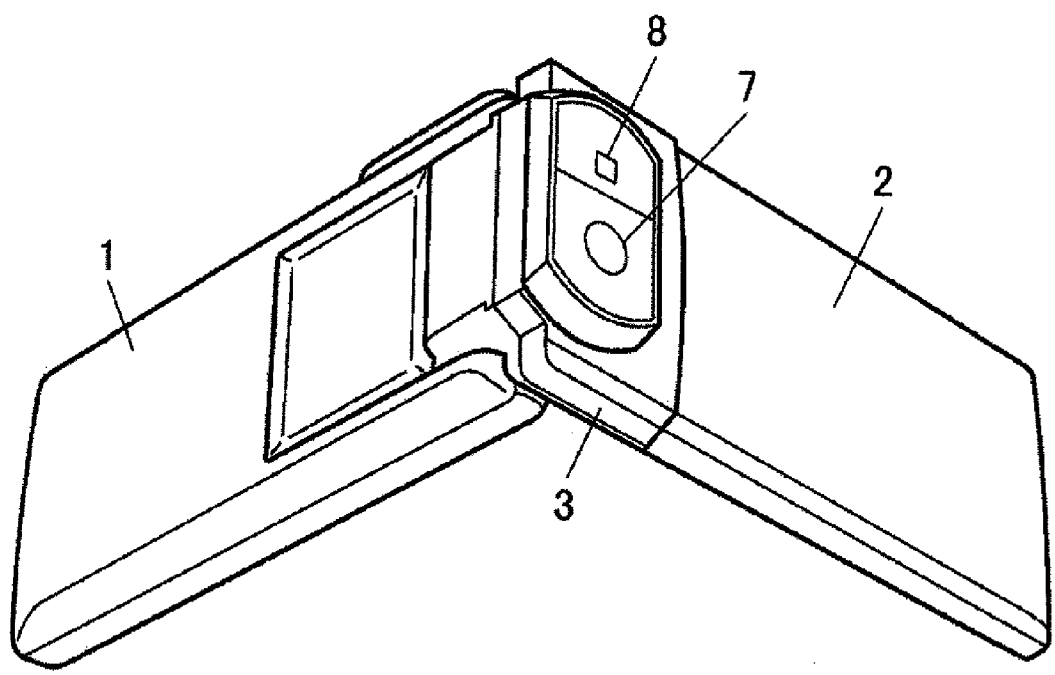
FIG. 4 is an oblique view showing the movie style of the mobile phone shown in FIG. 1.
Figure 23:
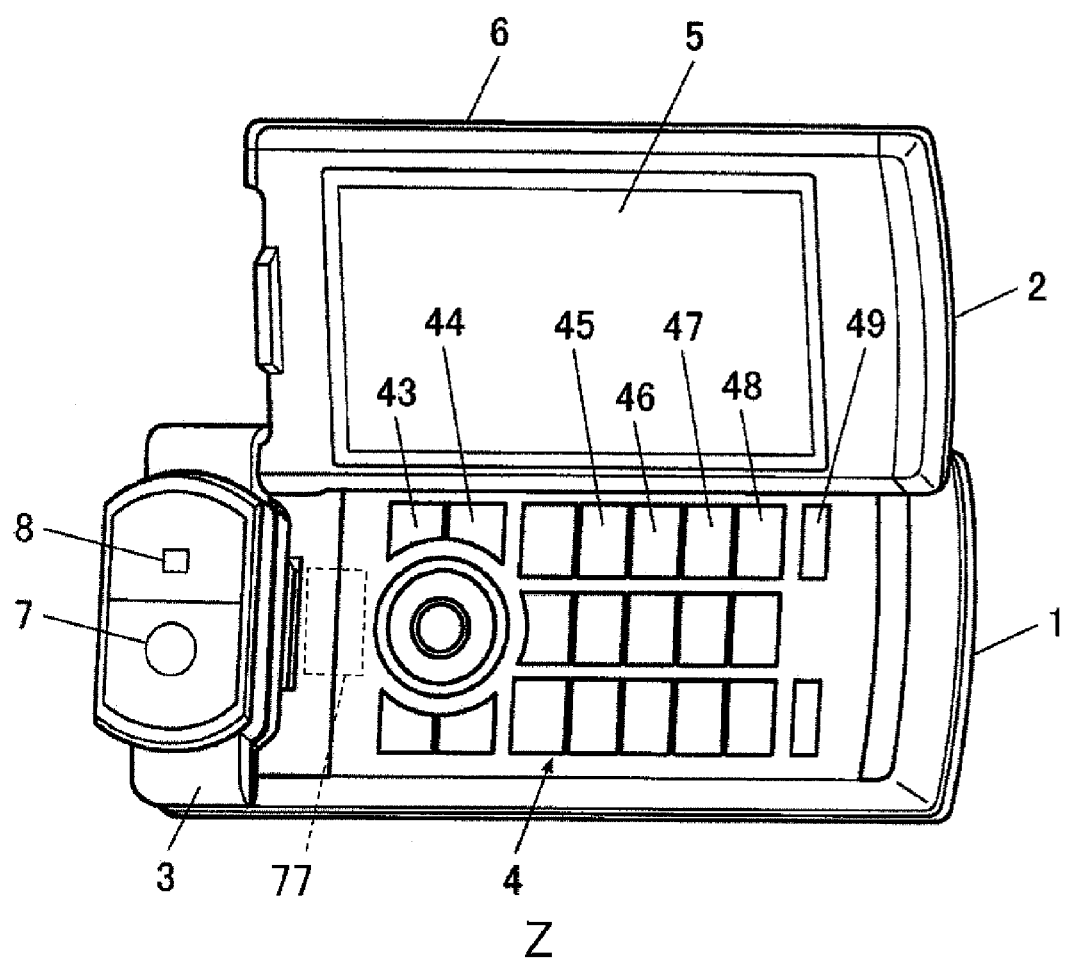
FIG. 23 is a drawing showing the book-style mobile phone shown in FIG. 3 as viewed from a different angle.
Figure 24:
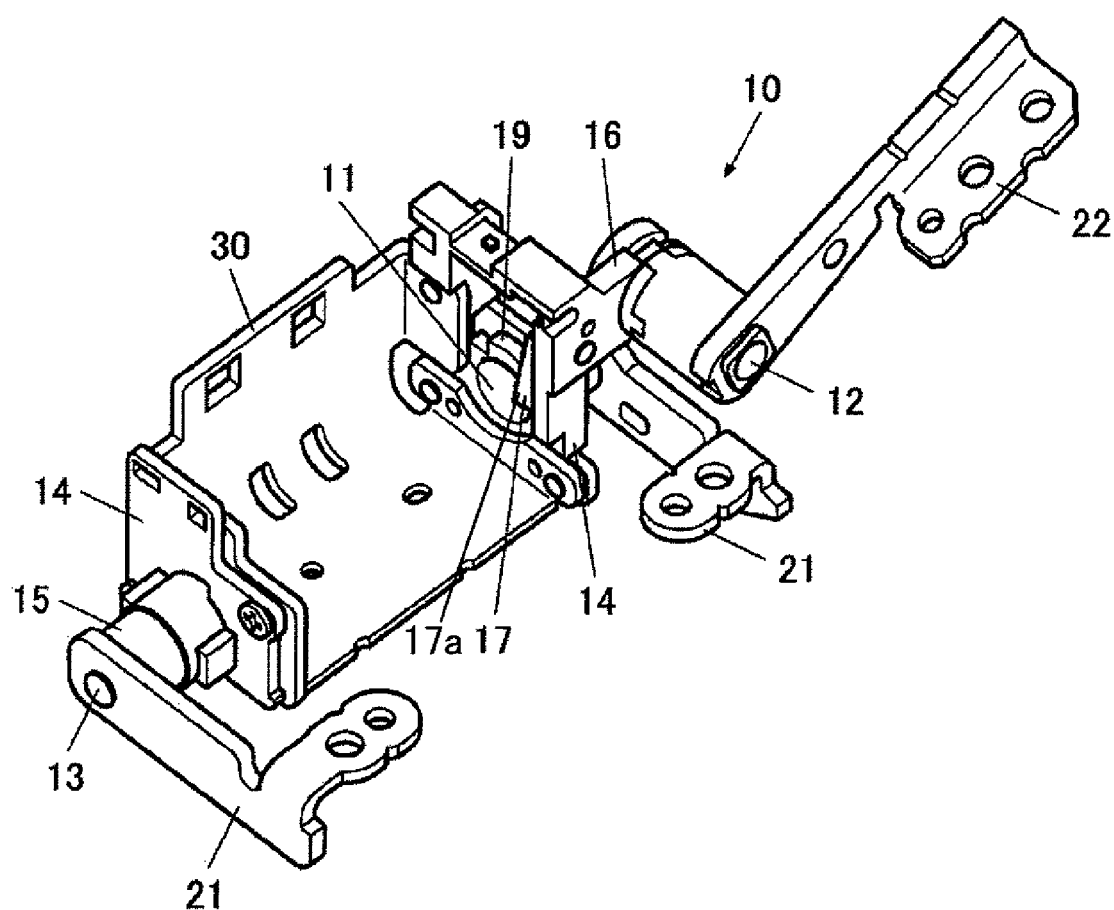
FIG. 24 is a drawing showing the hinge unit of FIG. 8 in book style.

FIGS. 3 and 23 show the book style in which the display unit 5 becomes a landscape-oriented screen by the second casing 2 opened in the horizontal direction about the second rotating shaft 12 with respect to the first casing 1 and the third casing 3. FIG. 24 shows the two-axis hinge unit 10 in this book style. This book style is a state in which the second rotating shaft 12 integrally connected to the second attachment member 22 is rotated 150 degrees toward the side from the angle in the folded style.

Figure 25:
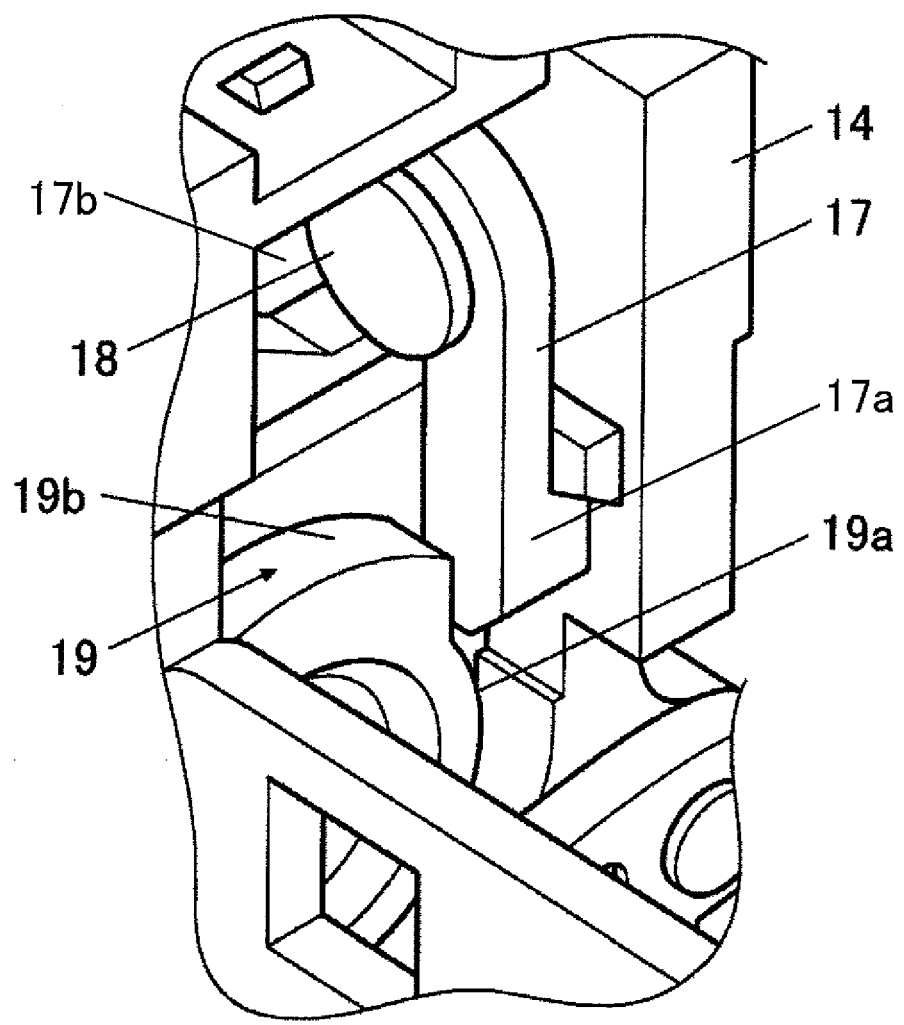
FIG. 25 is an enlarged view of the restriction member of FIG. 24.

At this time, the side end 17b of the restriction plate 17 abuts the outer perimeter of the second cam 29 and the second rotating shaft 12 is restricted from rotating in the horizontal direction more than this angle. On the other hand, the bottom end 17a abuts the different-level part of the first cam 19 where there is a difference in level between the small-diameter part 19a and the large-diameter part 19b, as shown in FIG. 25, so rotation of the first rotating shaft 11 is restricted.

Figure 26:
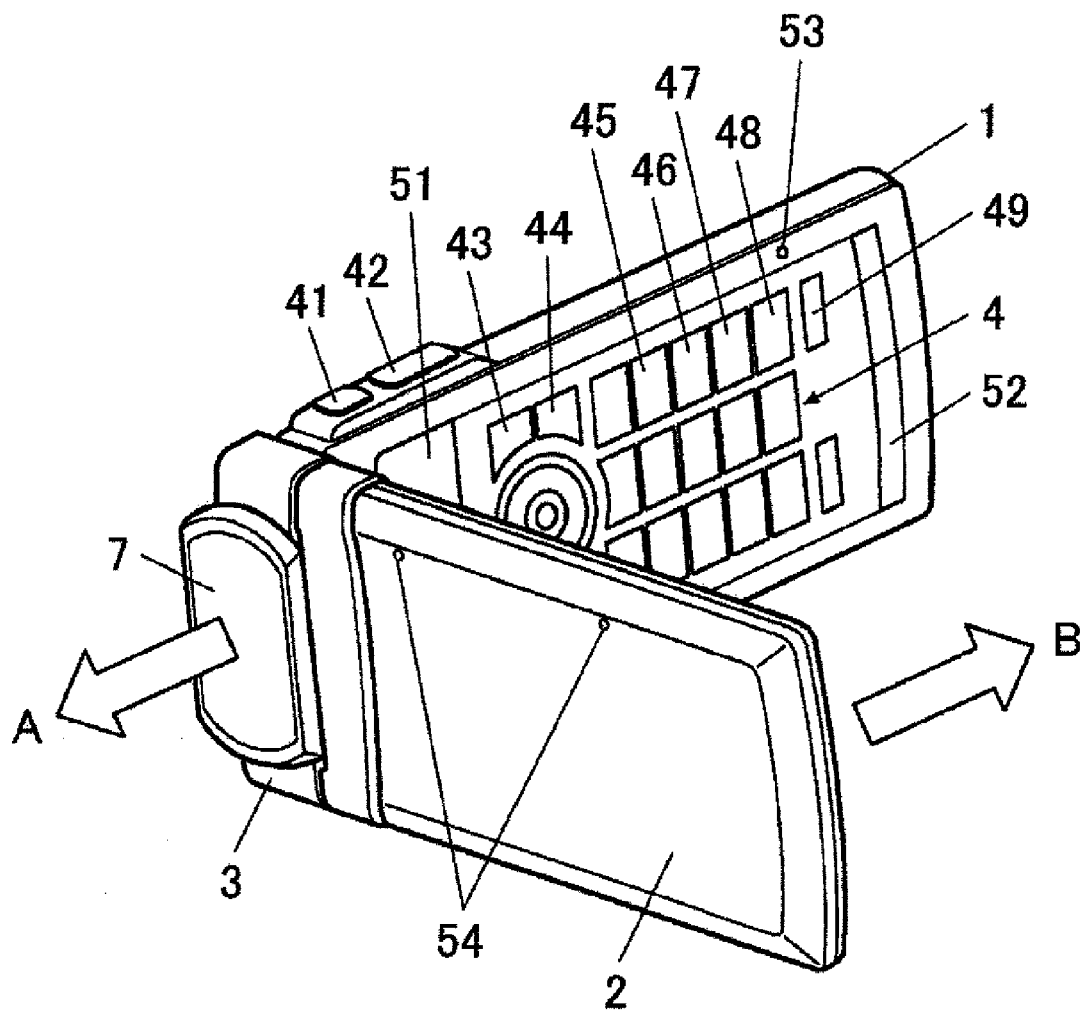
FIG. 26 is a drawing showing the screen and camera directions in the movie style of FIG. 4.
Figure 27:
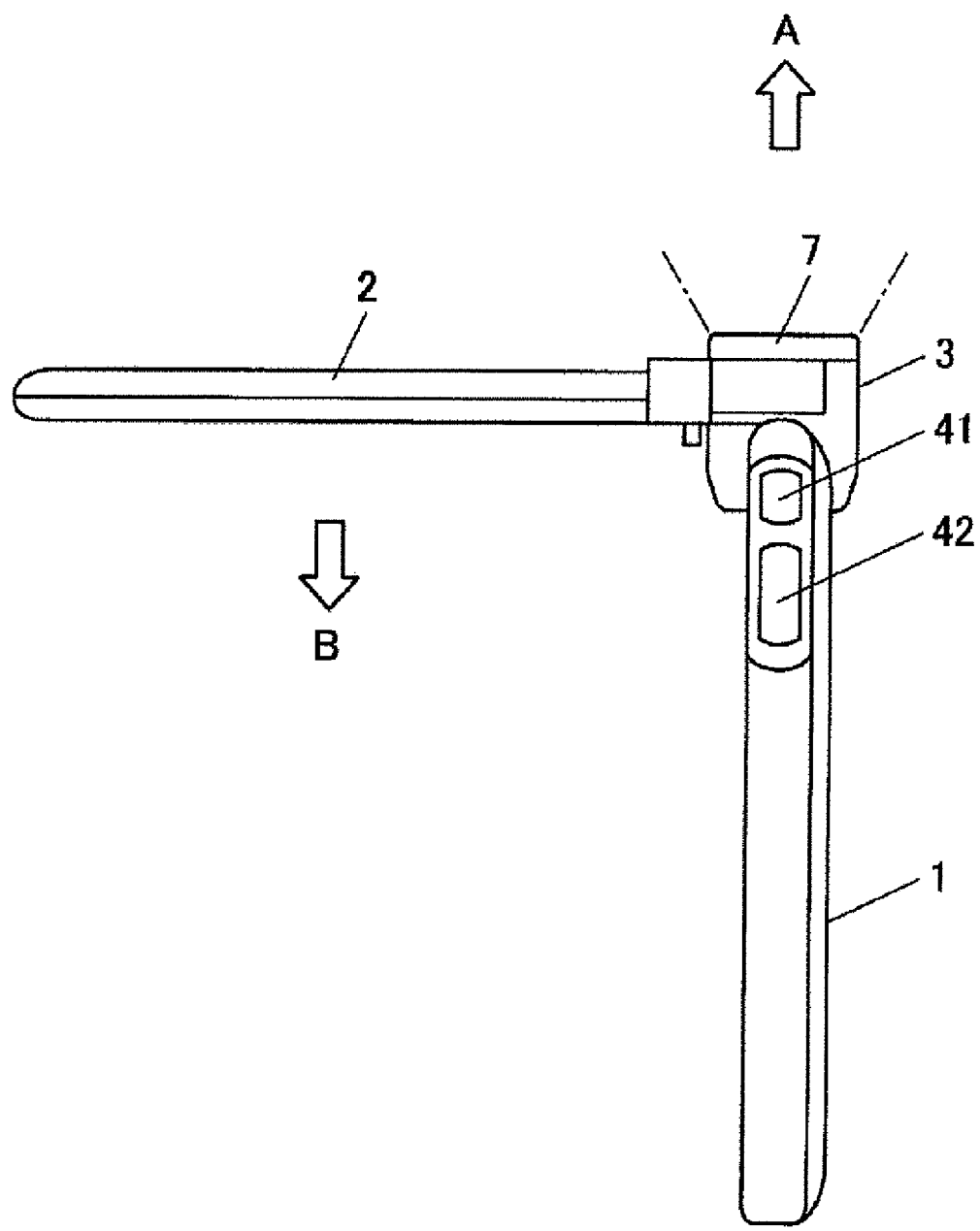
FIG. 27 is a planar diagram of the mobile phone of FIG. 26 as viewed from above.

Next, FIG. 4 and FIGS. 26 through 28 show the movie style in which the display unit 5 becomes a landscape-oriented screen with the second casing 2 and the third casing 3 rotated 90 degrees with respect to the first casing 1 about the first rotating shaft 11 and the third rotating shaft 13. In FIGS. 26 and 27, the orientation of the movie camera 7 is the direction indicated by the arrow A, which is a direction orthogonal to the third casing 3. In addition, the orientation of the screen of the display unit 5 is the direction indicated by the arrow B, which is a direction orthogonal to the second casing 2. Furthermore, FIG. 29 shows the two-axis hinge unit 10 in this movie style. The movie style is a state in which the first rotating shaft 11 and the third rotating shaft 13 integrally connected to the left and right first attachment members 21, respectively, are rotated 90 degrees from the angle in the folded style.

Figure 30:
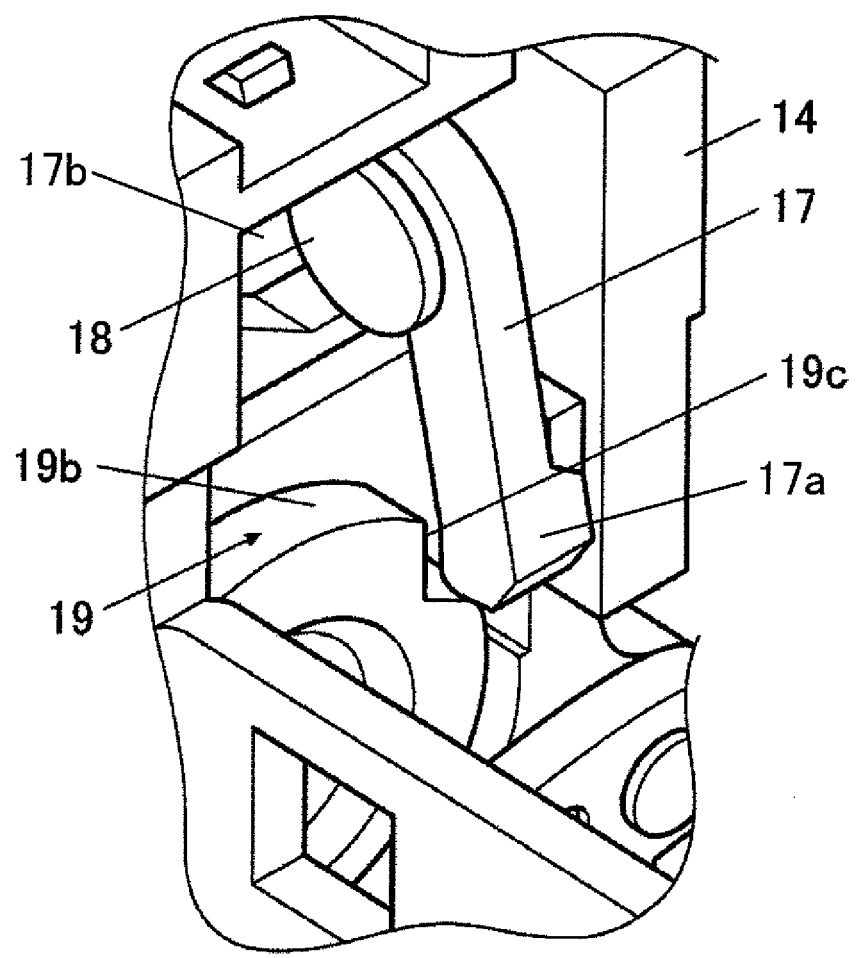
FIG. 30 is an enlarged view of the restriction member of the hinge unit of FIG. 29.

At this time, rotation of the second rotating shaft 12 is permitted because the bottom end 17a of the restriction plate 17 is separated from the notch 19c in the large-diameter part 19 of the first cam 19, as shown in FIG. 30. Accordingly, it is possible to alter the angle of rotation of the second casing 2 (the display unit 5) about the second rotating shaft 12 with respect to the third casing 3. In other words, freedom in picture taking is increased because the angle of the display unit 5 about the second rotating shaft 12 can be altered so as to be a comfortable orientation for the user confirming images shown on the display unit 5 with the orientation of the movie camera 7 fixed on the subject of photography.

Figure 28:
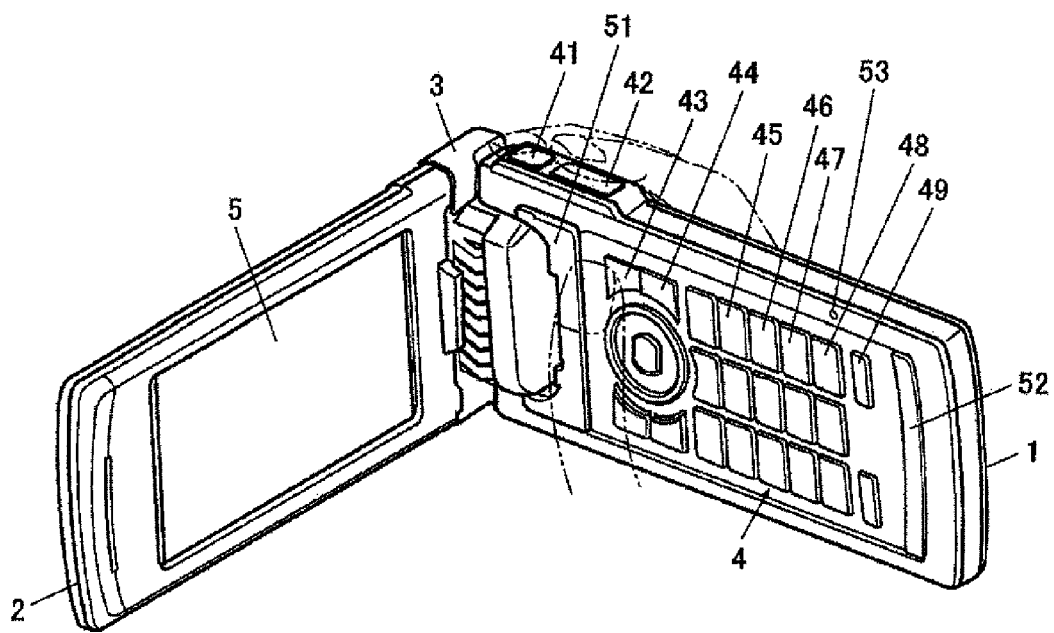
FIG. 28 is a drawing showing the manner of holding the mobile phone of FIG. 26.
Figure 29:
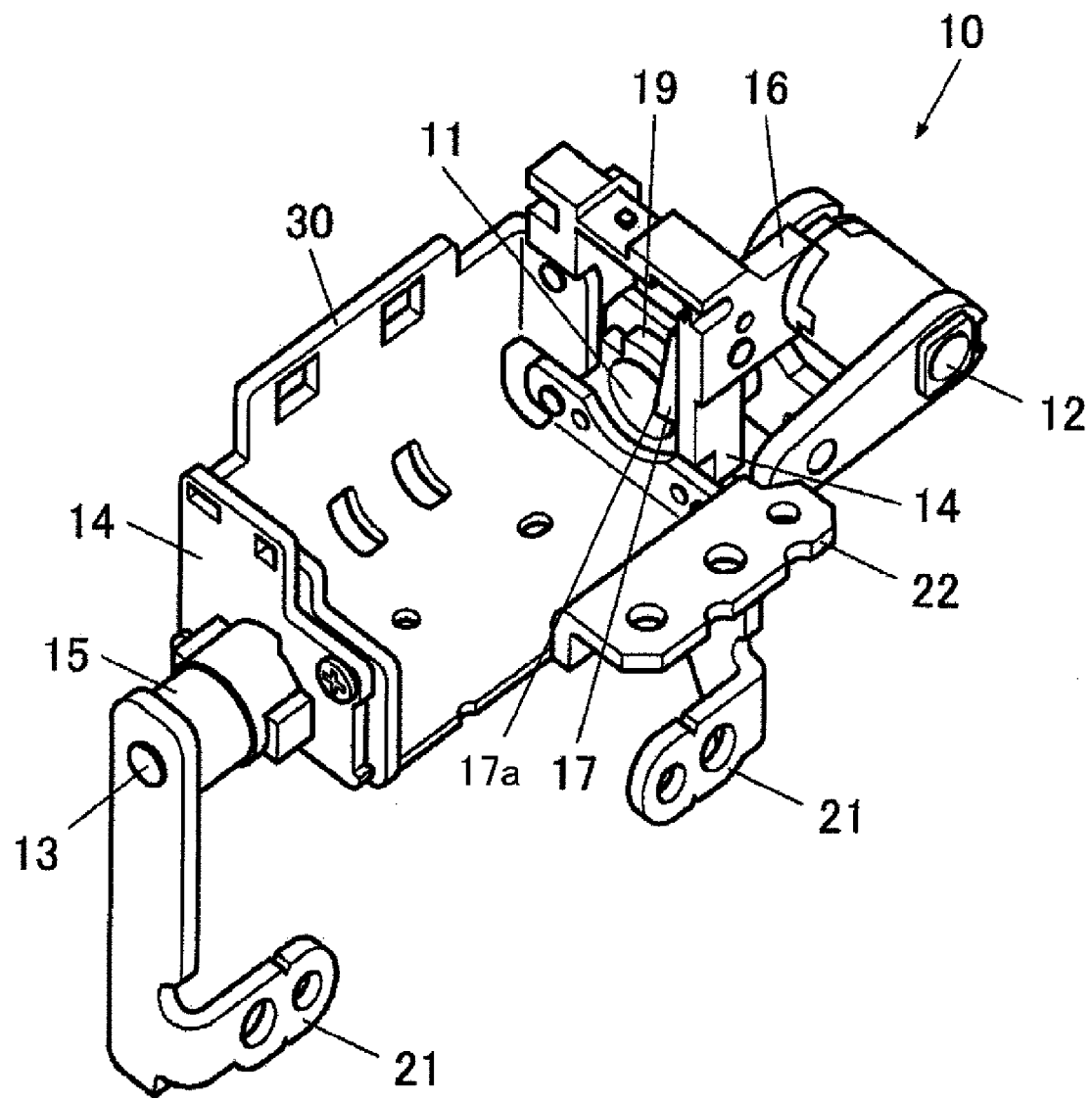
FIG. 29 is a drawing showing the hinge unit of FIG. 8 in movie style.

Furthermore, as shown in FIGS. 26 through 28, in the movie style it is possible to use a shutter key 41 and a zoom key 42 provided close to the third casing 3 on the top surface of the first casing 1 in FIGS. 26 and 28, and similarly to use a submenu key 43, an image display switch key 44, an audio zoom on/off key 45 (for recording remote audio related to the zoom key 42), a face detection on/off key 46, a reverse lighting compensation key 47, a white balance key 48 and a photography standby key 49, all lined up on the top side of the operation unit 4 on the inside surface of the first casing 1.

Above the submenu key 43, the image display switch key 44, the audio zoom on/off key 45, the face detection on/off key 46, the reverse lighting compensation key 47, the white balance key 48 and the photography standby key 49, marks or names indicating those functions can be printed.

In addition, to the front and rear of the operation unit 4 on the inside surface of the first casing 1, bumpers 51 and 52 are provided so as to extend in the up-and-down direction (the shortwise direction of the first casing 1) in FIG. 26. These bumpers 51 and 52 absorb the impact that occurs when the inside surface of the first casing 1 abuts the second casing 2 and the third casing 3 when folding the mobile phone. Furthermore, the bumpers 51 and 52 can be used to conceal screws anchoring the top case and the bottom case comprising the first casing 1.

In the above movie style, it is possible to hold the mobile phone with the right hand by placing the thumb along the bumper 51, the index finger on the zoom key 42 and the middle finger on the shutter key 41, as indicated by the long dashed double-short dashed lines in FIG. 28. By so doing, it is possible to realize a movie style easy to hold with the right hand alone because a sense of grip can be obtained. Bumps are provided on the surface of the bumper 51 on the side nearest the third casing 3 to function as a means of preventing the thumb from slipping.

Above the white balance key 48 on the first casing 1 in FIG. 28, a microphone hole 53 is provided. Furthermore, a left and right pair of microphone holes 54 is provided on the top of the front surface, which is the side opposite the display unit 5, in the second casing 2, as shown in FIG. 26.

Next, when the mobile phone is in the above movie style, the second casing 2 can be rotated in a direction separating from the third casing 3 and the first casing 1 with the second rotating shaft 12 as the fulcrum. By so doing, it is possible to use the display unit 5 as a finder in a style viewing the mobile phone obliquely from below (high angle style). On the other hand, the second casing 2 can be rotated in a direction approaching the third casing 3 and the first casing 1 with the second rotating shaft 12 as the fulcrum. By so doing, it is possible to use the display unit 5 as a finder in a style viewing the mobile phone obliquely from above (low angle style).

In addition, in the above-described high angle style and low angle style, the protrusion on the second cam 29 abuts the restriction plate 17 and the bottom end 17a of the restriction plate 17 is inserted into the notch 19c of the large-diameter part 19b of the first cam 19. Through this, rotation of the first rotating shaft 11 is restricted.

In the book style, as shown in FIGS. 3 and 23, the marks or names printed above the submenu key 43, the image display switch key 44, the audio zoom on/off key 45, the face detection on/off key 46, the reverse lighting compensation key 47, the white balance key 48 and the photography standby key 49 are covered by the second casing 2 and are difficult to see. For this reason, when in the book style a control unit 77 may accomplish control so that displays corresponding to the respective keys are shown on the bottom part of the display unit 5 positioned above the submenu key 43, the image display switch key 44, the audio zoom on/off key 45, the face detection on/off key 46, the reverse lighting compensation key 47, the white balance key 48 and the photography standby key 49.

In addition, in the folded style the first attachment members 21 and the second attachment member 22 are provided parallel in the same direction from the frame 30 of the two-axis hinge unit 10 and screw stoppers are formed in the ends of the first attachment members 21 and the second attachment member 22 corresponding to the first casing 1 and the second casing 2, as shown in FIG. 8. In other words, the first attachment members 21 and the second attachment member 22, and the first casing 1 and the second casing 2, are fastened together by screws from the above of both in the figure. Because the first attachment members 21 and the second attachment member 22 are thus formed, it is easy to tune (or repair) misalignment of the first casing 1 and the second casing 2 in the folded style after assembly procedures.

Figure 31:
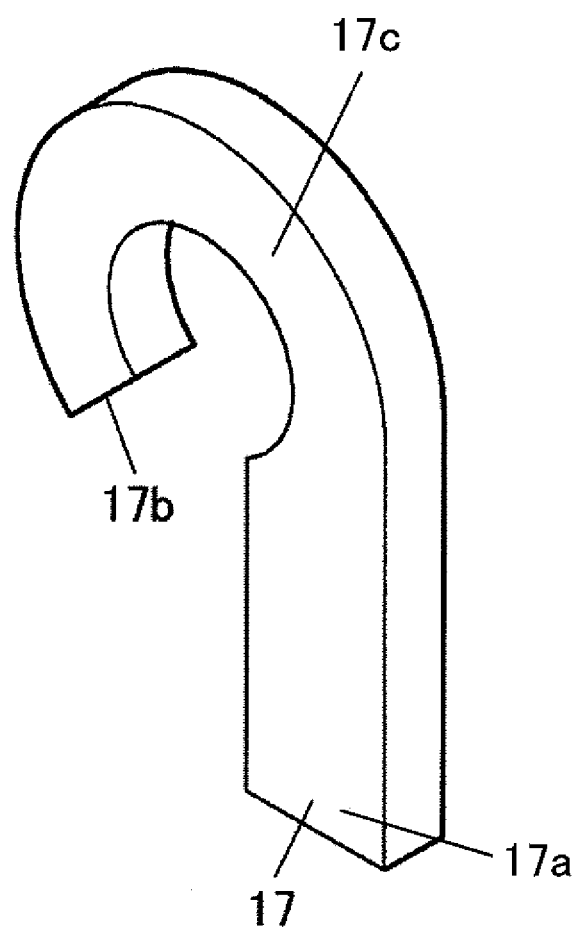
FIG. 31 is an enlarged oblique view of a restriction plate of the restriction member of FIG. 30.

Next, FIG. 31 shows an enlarged view of the restriction plate 17 shown in FIG. 30. As shown in this figure, the restriction plate 17 has a support unit 17c positioned around the pin 18 assembled so as to be moveable, and a side end 17b formed continuously with the support unit 17c and formed facing downward.

Accordingly, when rotation of the first rotating shaft 11 is restricted by the bottom end 17a of the restriction plate 17 entering the notch 19c in the large-diameter part 19b of the first cam 19 on the end perimeter of the first rotating shaft 11, as shown in FIG. 12, that is to say in the state with the second casing 2 rotated 90 degrees to the side toward the third casing 3 about the second rotating shaft 12 on top in the movie style of FIG. 28, as discussed above, even if pressure is excessively applied to the second casing 2 and the third casing 3 in the direction of folding toward the first casing 1 side, the support unit 17c positioned on the perimeter of the pin 18 of the restriction plate 17 temporarily spreads as a result of the presence of the side end 17b facing downward, so it is possible to avoid damage to the pin 18 caused by loads in the lift direction by the notch 19c in the large-diameter part 19b of the first cam 19 with respect to the bottom end 17a of the restriction plate 17.

A mobile phone according to the above-described embodiment is provided with a casing structure in which the first rotating shaft 11 and the third rotating shaft 13 which cause the first casing 1 having the operation unit 4 and the second casing 2 having the display unit 5 to move relative to each other from a folded and overlapping state so as to open in the vertical direction, and a second rotating shaft 12 that similarly causes the casings to open in the horizontal direction, are housed in the third casing 3 along with the movie camera 7. With this kind of structure, when the first casing 1 and the second casing 2 are opened in the vertical direction, the third casing 3 moves along with the second casing 2, and in addition, when the casings are opened in the horizontal direction, only the third casing 3 moves. In other words, by changing from the normal open style to the movie style or the book style as needed, it is possible to view the screen of the display unit 5 sideways.

Furthermore, when in the movie style, it is possible for the second casing 2 having the display unit 5 to rotate about the central second rotating shaft 12 with respect to the third casing 3 having the movie camera 7. By so doing, it is possible to achieve a high angle style in which the display unit 5 is viewed obliquely from below as the finder when shooting movies, or a low angle style in which the display unit 5 is viewed obliquely from above.

Furthermore, the first rotating shaft 11, the second rotating shaft 12 and the third rotating shaft 13 are attached to the high-strength frame 30 of the third casing 3. Furthermore, the first attachment members 21 are assembled integrally with the first rotating shaft 11 and the third rotating shaft 13 in the first casing 1, and the second attachment member 22 is assembled integrally with the second rotating shaft 12, and consequently the two-axis hinge unit 10 has high total strength.

Furthermore, the first wiring 31 has one end anchored inside the first casing 1, passes through the hollow interior of the first rotating shaft 11 and has the other end anchored inside the third casing 3. In addition, the second wiring 32 has one end anchored inside the first casing 1, passes through the hollow interior of the first rotating shaft 11 and the hollow interior of the second rotating shaft 12 and has the other end anchored inside the second casing 2. In this manner, the first rotating shaft 11 and the second rotating shaft 12 have hollow interiors, so it is possible to supply electrical power in a stable manner inside the three casings regardless of whether the mobile phone is changed to normal open style, book style or movie style.

In addition, the two-axis hinge unit 10 is provided with the restriction plate 17 positioned between the first rotating shaft 11 and the second rotating shaft 12. At a predetermined rotational position of one of the rotating shafts, this restriction plate 17 is pressed by this one rotating shaft and engages with the other rotating shaft, restricting the rotation of this other rotating shaft. Consequently, even when the first rotating shaft 11 and the second rotating shaft 12, which open the first casing 1 and the second casing 2 vertically and horizontally, are separated as in this embodiment, it is possible to restrict rotation of one shaft as necessary in the above-described normal open style, book style and movie style.

Embodiment 2

Figure 32:
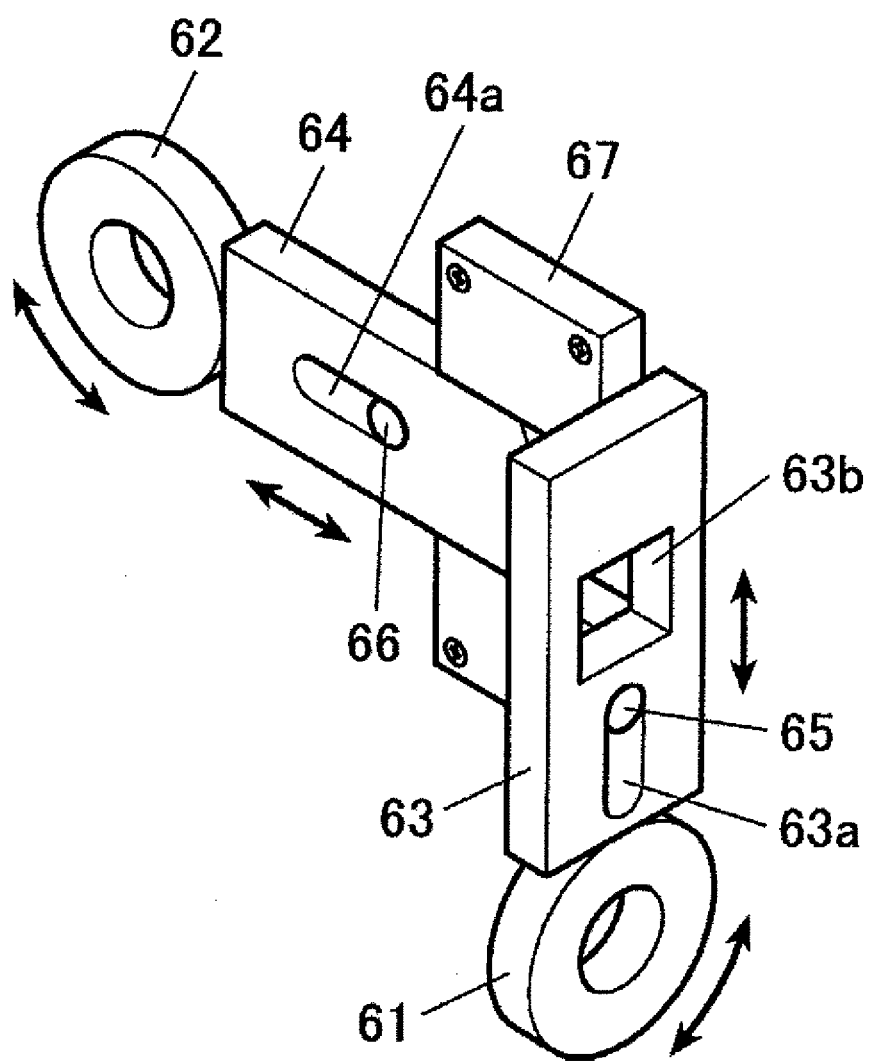
FIG. 32 is an oblique drawing showing the composition of a restriction member according to a second embodiment.
Figure 33A:
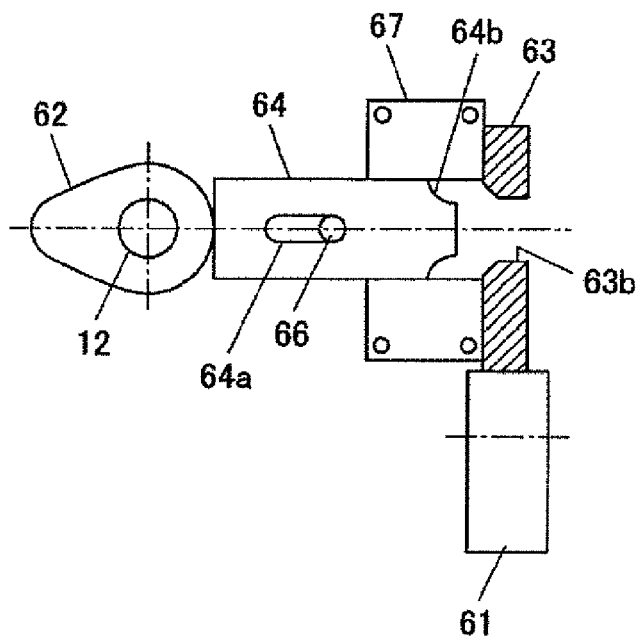
FIG. 33A is a frontal view of restriction member constituent parts of FIG. 32 in the folded style.
Figure 33B:
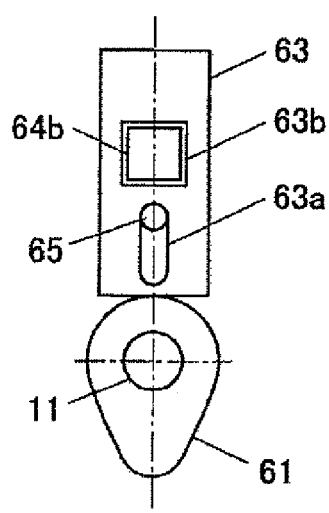
FIG. 33B is a side view of the restriction member constituent parts of FIG. 32 in the folded style.

Next, FIGS. 32, 33A and 33B show the composition of the restriction member of the second embodiment. The restriction member of the second embodiment is provided with a first cam 61, a second cam 62, a first restriction plate (first member) 63, a second restriction plate (second member) 64, a first anchoring pin 65, a second anchoring pin 66 and a sliding support plate 67.

The first cam is formed integrally on the end of the first rotating shaft 11 and is formed of a disc cam shaped such that the distance from the center to the perimeter surface is not constant. Similarly, the second cam is formed integrally on the end of the second rotating shaft 12 and is formed of a disc cam shaped such that the distance from the center to the perimeter surface is not constant. In addition, the first restriction plate 63 is formed in a board shape and the lower surface thereof in FIG. 32 abuts the perimeter surface of the first cam 61. Similarly, the second restriction plate 64 is formed in a board shape and the side surface thereof in FIG. 32 abuts the perimeter surface of the second cam 62.

The first restriction plate 63 has a guide hole 63a formed in the vertical direction with which the first anchoring pin 65 engages, and above that has a restriction hole 63b. The second restriction plate 64 has a guide hole 64a formed in the sideways direction with which the second anchoring pin 66 engages. Furthermore, the second restriction plate 64 has, at its end part in the side facing the restriction hole 63b, a restriction protrusion 64b tapered to narrow toward the tip end. The slide support plate 67 abuts the side surface of the first restriction plate 63 and guides movement thereof in the vertical direction, and also abuts the top and bottom surfaces of the second restriction plate 64 and guides movement thereof in the horizontal direction.

FIGS. 32, 33A and 33B schematically show the restriction member constituent parts in the folded style. As shown in these figures, the bottom surface of the first restriction plate 63 abuts the perimeter surface of the base of the first cam 61 (the part of a disc cam in which the length connecting the perimeter and the center of rotation is the smallest radius), and the side surface of the second restriction plate 64 abuts the perimeter surface of the base of the second cam 62. As shown in FIG. 33A, in this state the second restriction plate 64 is not positioned above the upward track of the first restriction plate 63, so the first restriction plate 63 can move upward. In other words, the first cam 61 abutting the first restriction plate 63 can rotate, and hence the first rotating shaft 11, which is formed integrally with the first cam 61, can rotate. Consequently, the second casing 2 and the third casing 3 can rotate in a direction separating from the first casing 1 via the first attachment members 21 attached to the first rotating shaft 11. In other words, the user can change the mobile phone from folded style to normal open style or movie style.

On the other hand, because the restriction hole 63b of the first restriction plate 63 is positioned on the sideways track of the second restriction plate 64, the second restriction plate 64 can move in the sideways direction without progress being impeded by the first restriction plate 63. In other words, because the second cam 62 abutting the second restriction plate 64 can rotate, the second rotating shaft 12, which is formed integrally with the second cam 62, can rotate. Hence, the second casing 2 can rotate in a direction separating from the first casing 1 and the third casing 3 via the second attachment member 22 attached to the second rotating shaft 12. That is to say, the user can change the mobile phone from the folded style to the book style.

Figure 34A:
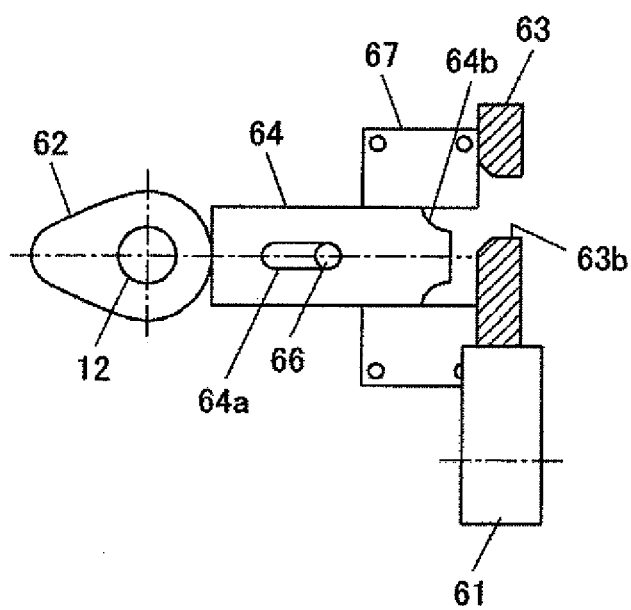
FIG. 34A is a frontal view of the restriction member constituent parts of FIG. 32 in the normal open style.
Figure 34B:
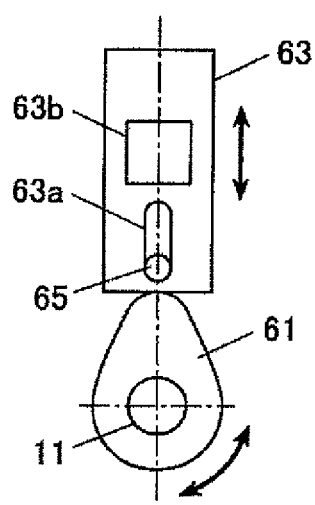
FIG. 34B is a side view of the restriction member constituent parts of FIG. 32 in the normal open style.

FIGS. 34A and 34B schematically show the restriction member constituent parts in the normal open style. The first rotating shaft 11 and the third rotating shaft 13 rotate 180 degrees from the angle in the folded style of FIG. 33A and FIG. 33B, and as shown in FIGS. 34A and 34B, the first restriction plate 63 is pressed upward by the cam top (in a disc cam, the part where the length connecting the perimeter and the axis of rotation is the maximum radius) of the first cam 61. Through this, the restriction protrusion 64b of the second restriction plate 64 becomes unable to enter the restriction hole 63b of the first restriction plate 63. In other words, although a small amount of rotation of the second cam 62 and the second rotating shaft 12 is tolerated until the restriction protrusion 64b of the second restriction plate 64 abuts the side surface of the first restriction plate 63, rotation beyond this is restricted. Accordingly, rotation of the second casing 2 in the sideways direction is restricted in the normal open style.

Figure 35A:
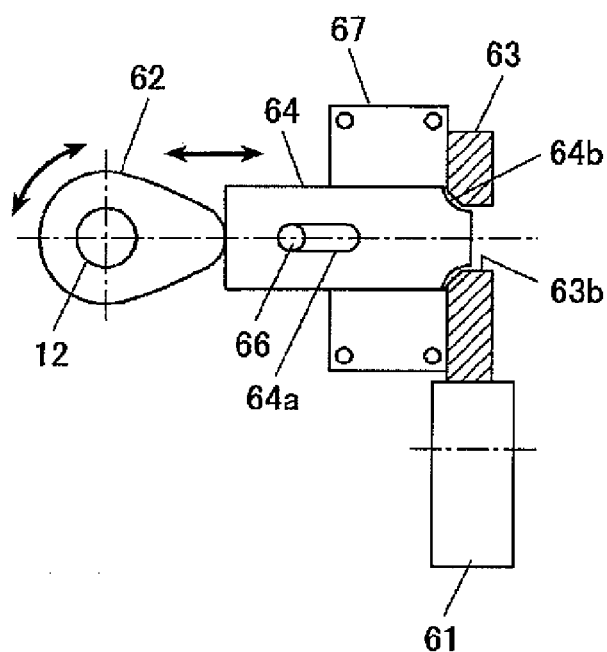
FIG. 35A is a frontal view of the restriction member constituent parts of FIG. 32 in the book style.
Figure 35B:
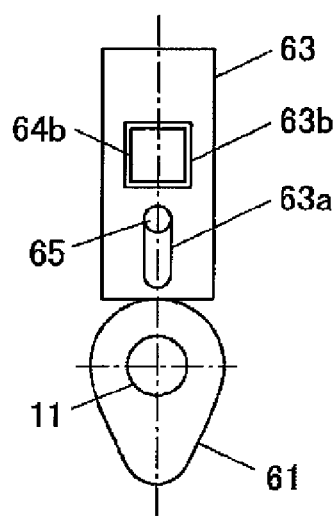
FIG. 35B is a side view of the restriction member constituent parts of FIG. 32 in the book style.

FIGS. 35A and 35B schematically show the restriction member constituent parts in the book style. The second rotating shaft 12 rotates 180 degrees from the angle in the folded style of FIG. 33A and FIG. 33B, and as shown in the figures, the second restriction plate 64 is pressed by the cam top of the second cam 62 and advances toward the restriction protrusion 64b. When this occurs, the restriction protrusion 64b at the tip of the second restriction plate 64 is press-inserted into the restriction hole 63b of the first restriction plate 63. Accordingly, upward and downward movement of the first restriction plate 63 is restricted by the restriction protrusion 64b. When this occurs, because the perimeter of the base of the first cam 61 abuts the bottom surface of the first restriction plate 63, rotation of the first cam 61 is restricted and thus rotation of the first rotating shaft 11 is restricted. Accordingly, forcible rotation of the second casing 2 in the vertical direction in book style is restricted.

Figure 36:
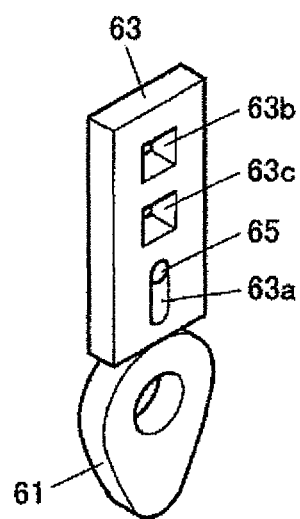
FIG. 36 is an oblique view of a corresponding example of the movie style of the restriction member constituent parts of FIG. 32.

Next, FIG. 36 shows a corresponding example of the restriction member constituent parts in movie style. As shown in this figure, a restriction hole 63c, which is positioned facing the restriction protrusion 64b in movie style, is formed between the guide hole 63a and the restriction hole 63b in the first restriction plate 63.

Figure 37:
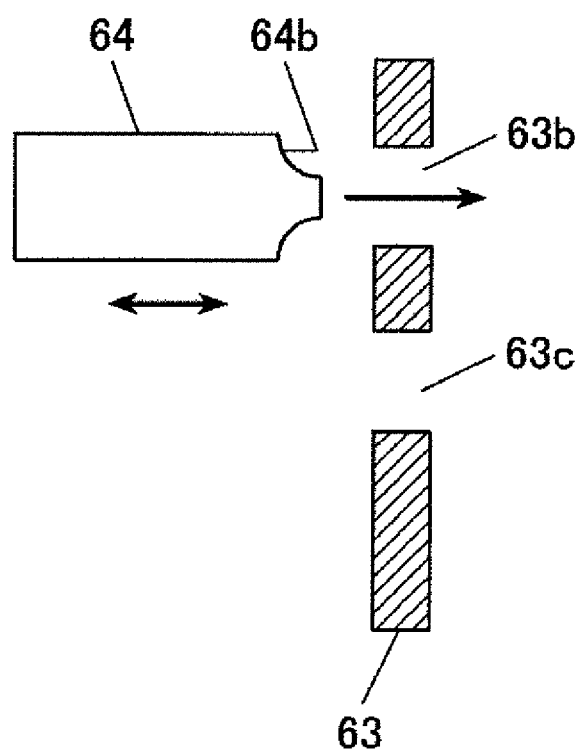
FIG. 37 is a side view of the restriction member constituent parts of FIG. 36 in the folded style.

FIG. 37 shows the restriction member constituent parts in folded style, and as shown in this figure, the restriction hole 63b is positioned in front of the second restriction plate 64.

Figure 38:
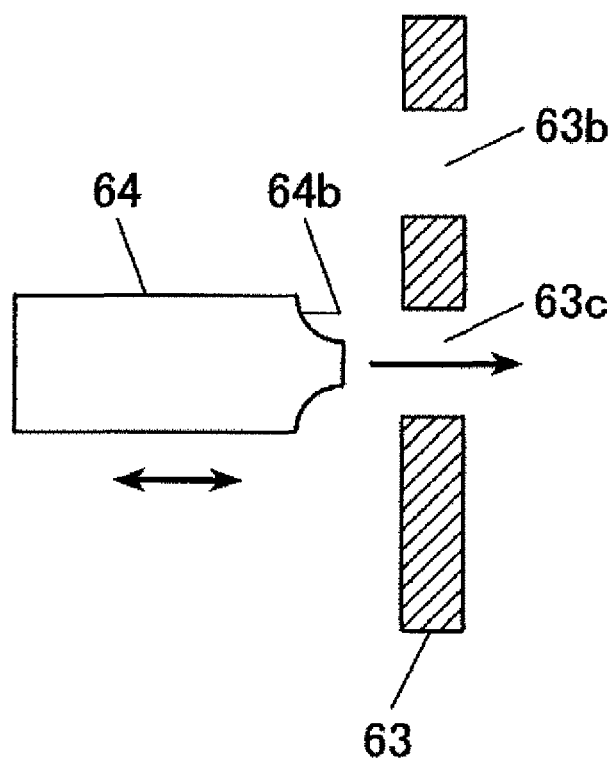
FIG. 38 is a side view of the restriction member constituent parts of FIG. 36 in the movie style.

FIG. 38 shows the restriction member constituent parts in movie style. By rotating the first rotating shaft 11 90 degrees from the angle in the folded state, the first restriction plate 63 is pressed upward by the first cam 61, and as shown in the figure, the restriction hole 63c is positioned in front of the second restriction plate 64.

When the second rotating shaft 12 rotates 90 degrees in this state, the second restriction plate 64 is pressed by the second cam 62 and advances forward, as shown in the figure, and the restriction protrusion 64b at the tip thereof is press-inserted into the restriction hole 63c of the first restriction plate 63. Through this, rotation of the first rotating shaft 11 is restricted. Accordingly, unreasonable rotation of the second casing 2 in the vertical direction centered about the first rotating shaft 11 is restricted in a state with the second casing 2 rotated 90 degrees about the second rotating shaft 12 in movie style. That is to say, when the mobile phone is in high angle style or low angle style, rotation of the third casing 3 with respect to the first casing 1 is prevented, so a stable posture can be maintained.

Figure 39:
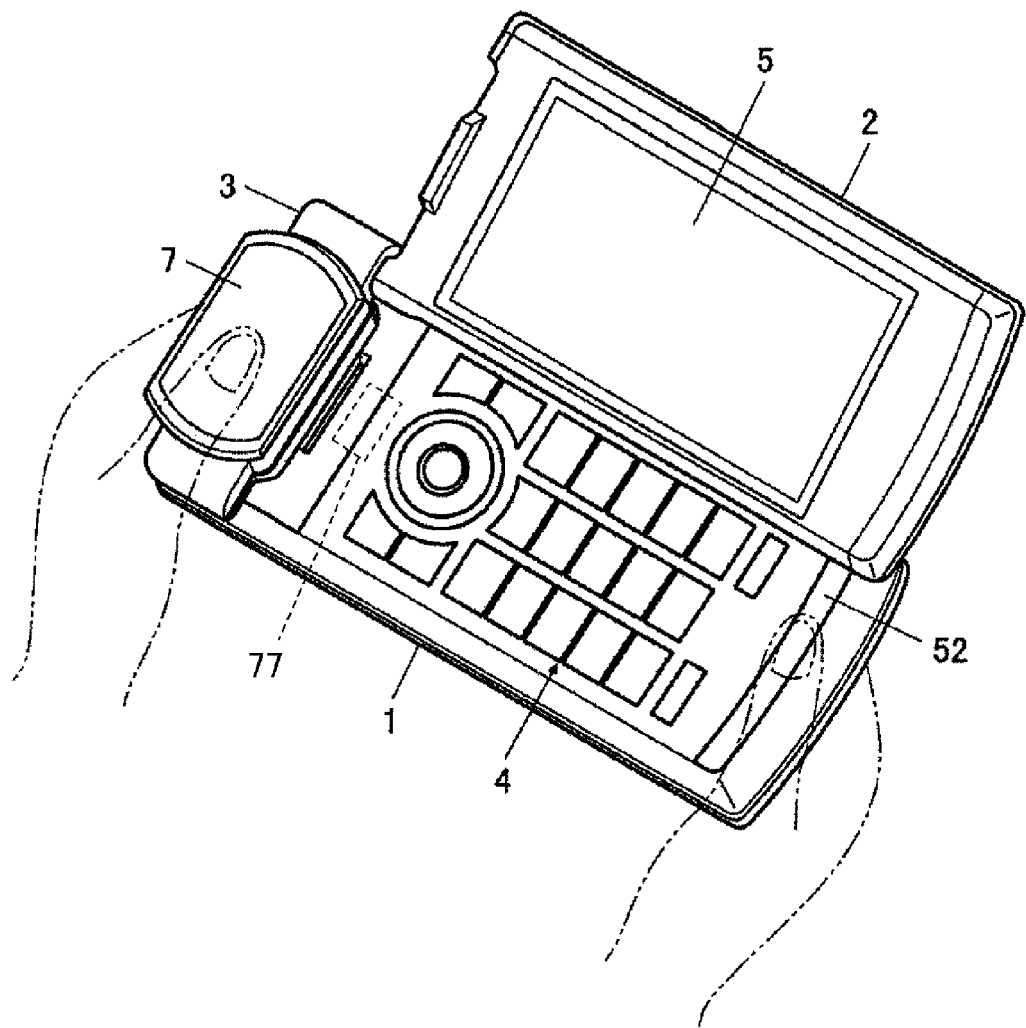
FIG. 39 is an oblique view showing an example of use in the book style.

Next, FIG. 39 shows an example of using the mobile phone in book style. As shown in this figure, when the mobile phone is gripped with two hands when in book style, the right thumb is naturally positioned on the bumper 52 part of the end of the first casing 1 and the left thumb is naturally positioned on the third casing, which protrudes more than the first casing 1 having the operation unit 4. Consequently, good grip and operability are realized.

Figure 40:
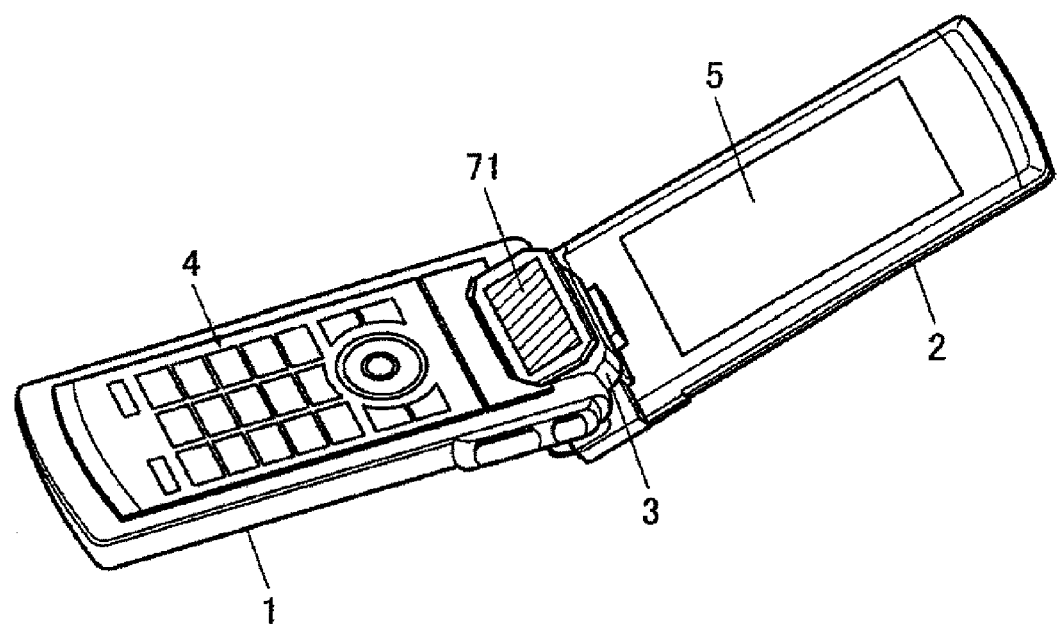
FIG. 40 is an oblique view of the normal open style in an example of the third casing with an interface unit.

FIG. 40 shows an example of an interface 71 mounted on the third casing 3, with the mobile phone in a normal open style. By mounting the interface 71 on the third casing 3 in this manner, the interface 71 is exposed to the outside and can be used whether the mobile phone is in open style or folded style. Through this, easiness of use is enhanced and it is possible to improve the mobile phone's operability.

Figure 41:
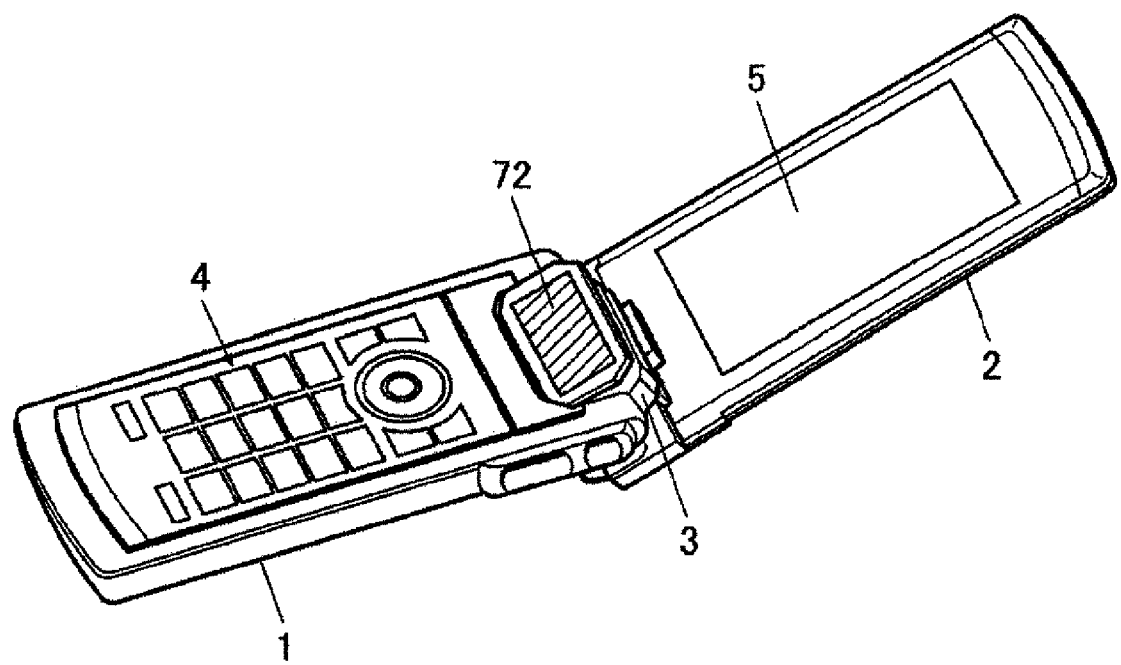
FIG. 41 is an oblique view of the normal open style in an example of the third casing with a fingerprint sensor or a touch sensor.

FIG. 41 is an example of an electronic component in which a fingerprint sensor or touch sensor 72 is mounted on the casing 3, and shows the mobile phone in the normal open style. By providing a fingerprint sensor or touch sensor 72 on the third casing 3 in this manner, it is possible to operate the main screen pointer of the display unit 5 in open style, making operation of the main screen possible.

Figure 42:
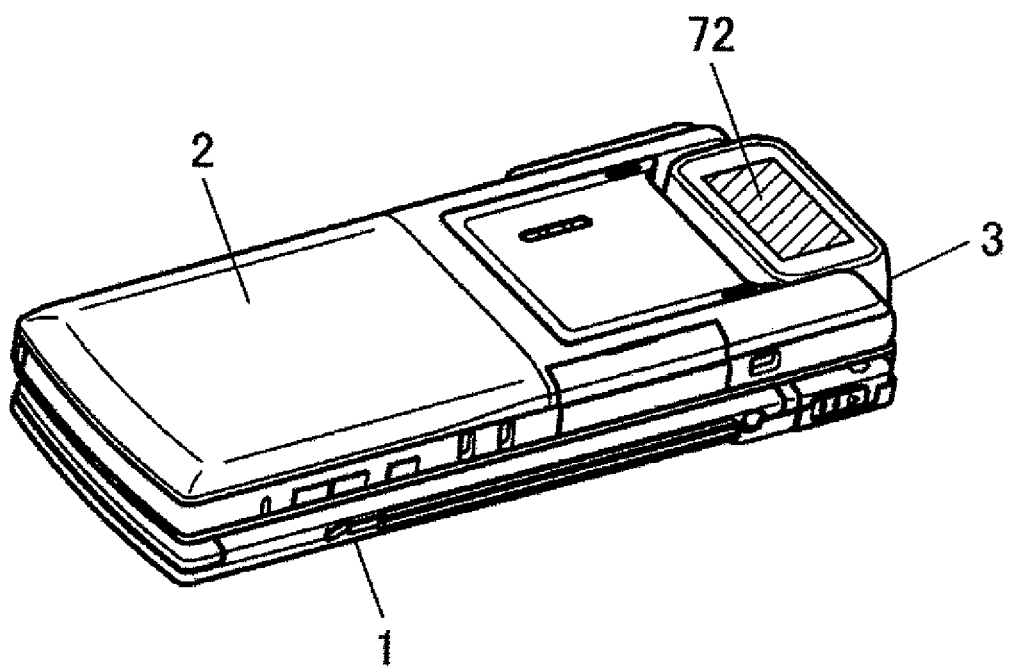
FIG. 42 is a drawing showing the folded style of the example of FIG. 41.

FIG. 42 shows the folded style of the example in FIG. 41, so that even in folded style it is possible to read fingerprints with the fingerprint sensor 72, making it possible to set or release security and enabling other abbreviated functions.

Figure 43:
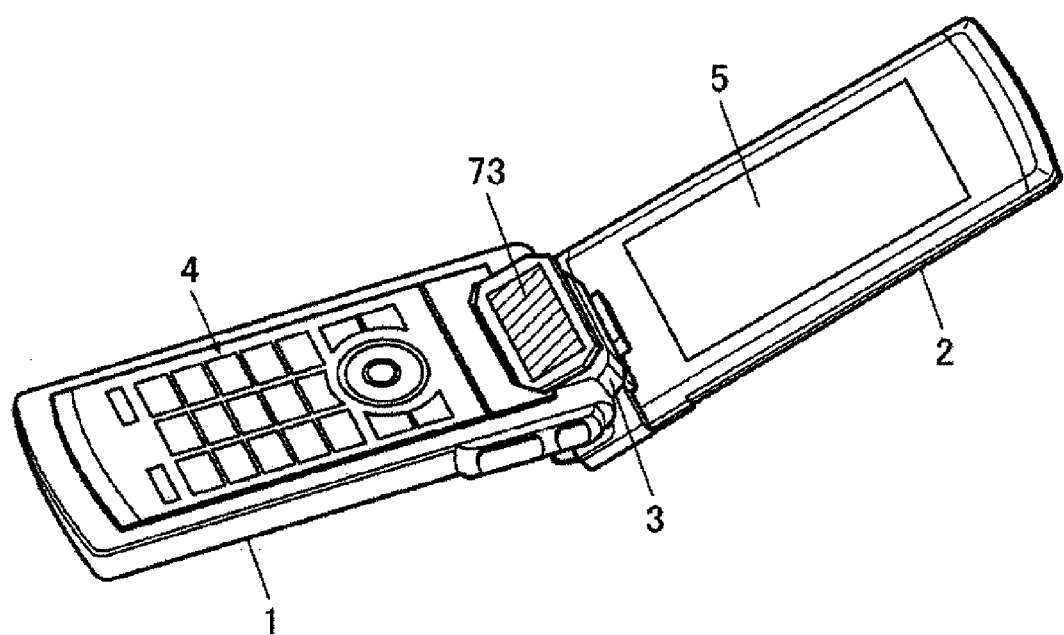
FIG. 43 is an oblique view of an example of the third casing with an incoming call lamp in the normal open style.

FIG. 43 is an example of an electronic part with an incoming call lamp 73 mounted on the third casing 3 in the normal open state. By providing the incoming call lamp 73 on the third casing 3 in this manner, it is possible to add an announce function when the phone rings and an illumination function for other actions, in the open style.

Figure 44:
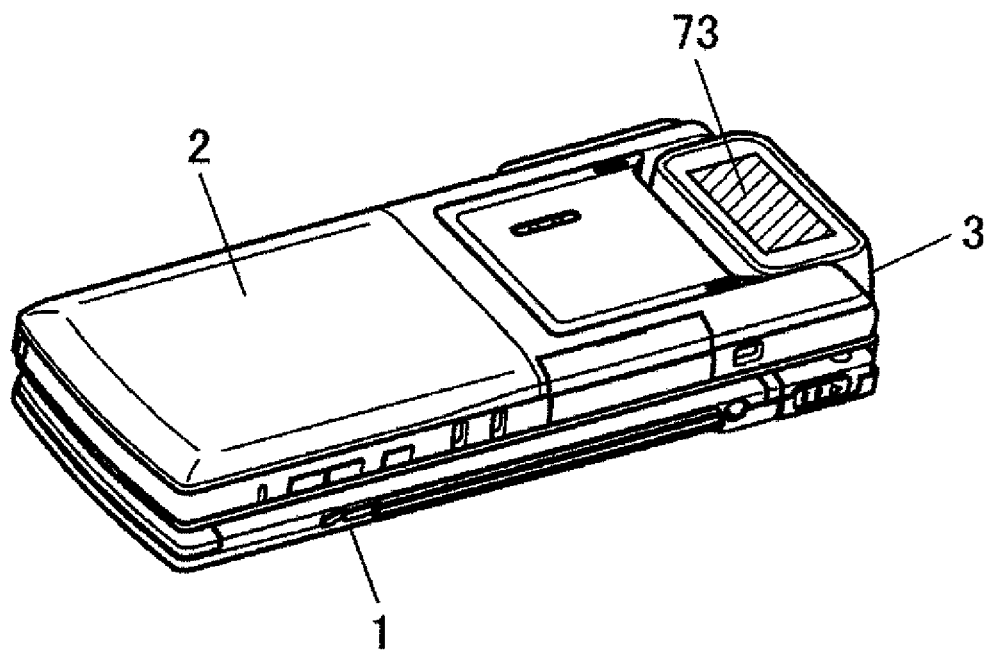
FIG. 44 is a drawing showing the folded style of the example of FIG. 43.

FIG. 44 shows the folded style of the example in FIG. 43, so that even in the closed style, it is possible to add an announce function for when the mobile phone rings and illumination functions for other operations (for example, an operation that pays through a credit card function).

Figure 45:
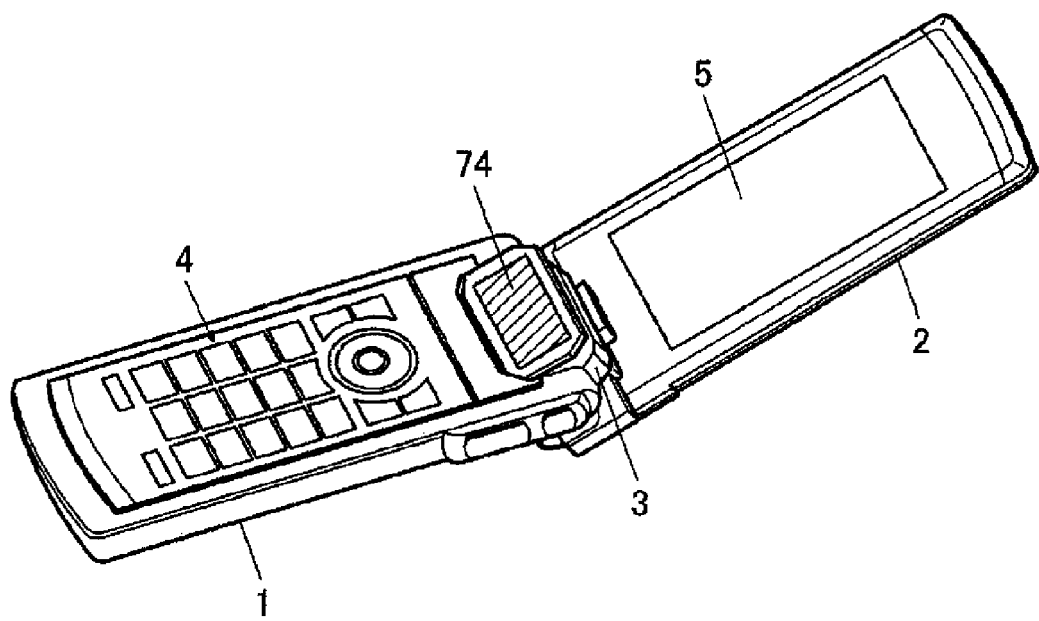
FIG. 45 is an oblique view of an example of the third casing with a submonitor and a touch panel in the normal open style.

FIG. 45 is an example of electronic parts with a submonitor and a touch panel 74 mounted on the third casing 3, and shows the normal open style. By providing a submonitor and a touch panel 74 on the third casing 3 in this manner, it is possible to display various information, to operate the pointer of the main screen of the display unit 5 and to similarly operate the main screen.

Figure 46:
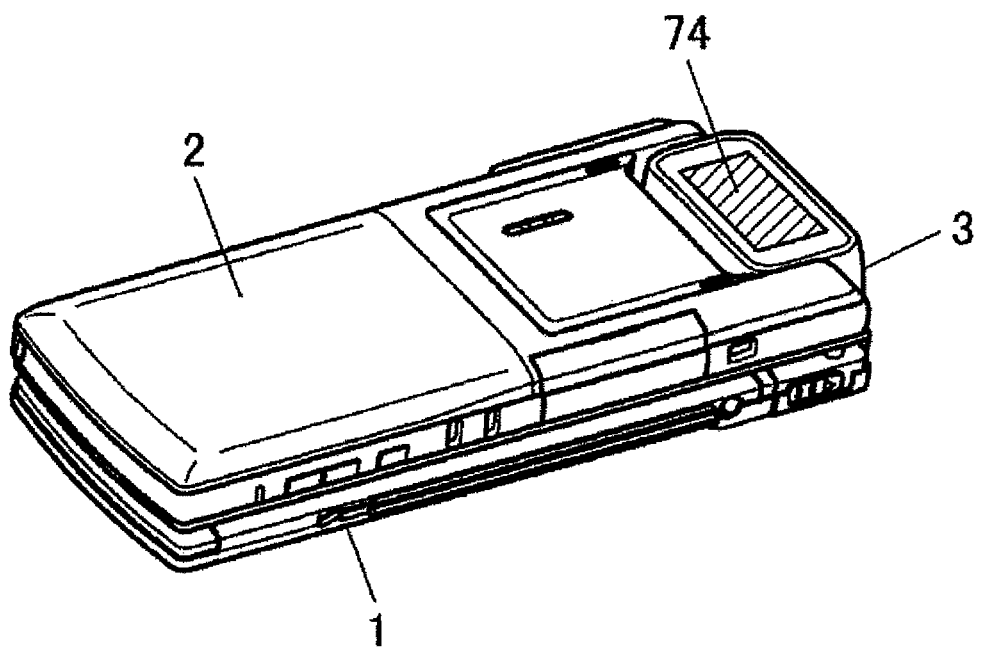
FIG. 46 is a drawing showing the folded style of the example of FIG. 45.

FIG. 46 shows the folded style of the example of FIG. 45, so that in the closed style as well, it is possible to display various information, to display a logo, to read fingerprints or the like, to set and release security and to accomplish other abbreviated functions.

Figure 47:
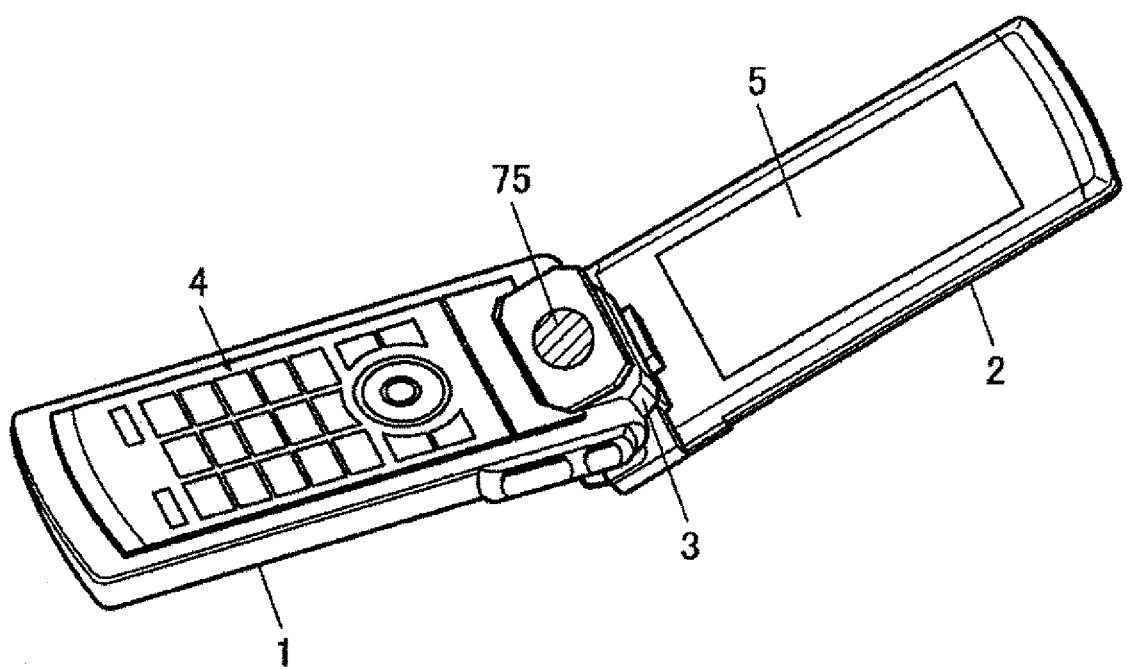
FIG. 47 is an oblique view of an example of the third casing with an inner camera in the normal open style.

FIG. 47 show the normal open style for an example of electronic parts with an inner camera 75 mounted on the third casing 3. By providing an inner camera 75 on the third casing 3 in this manner, in the open style TV telephony becomes possible, operation of the pointer of the main screen of the display unit 5 becomes possible and similarly operation of the main screen becomes possible.

Figure 48:
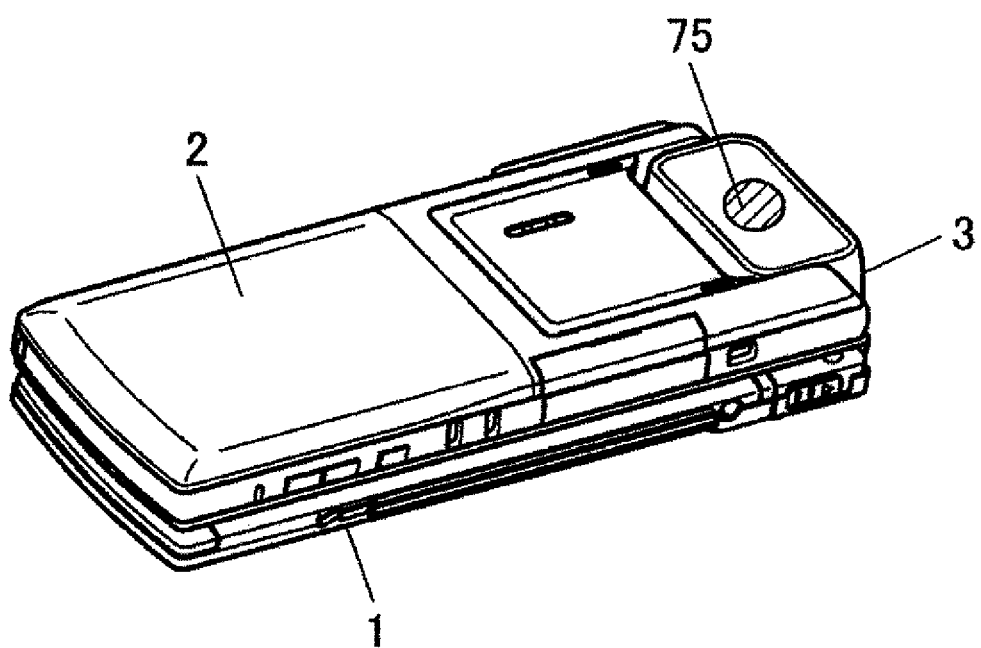
FIG. 48 is a drawing showing the folded style of the example of FIG. 47.

FIG. 48 shows the folded style of the example in FIG. 47, so that in closed style, it is possible to read fingerprints, set and release security and accomplish other abbreviated functions.

Figure 49:
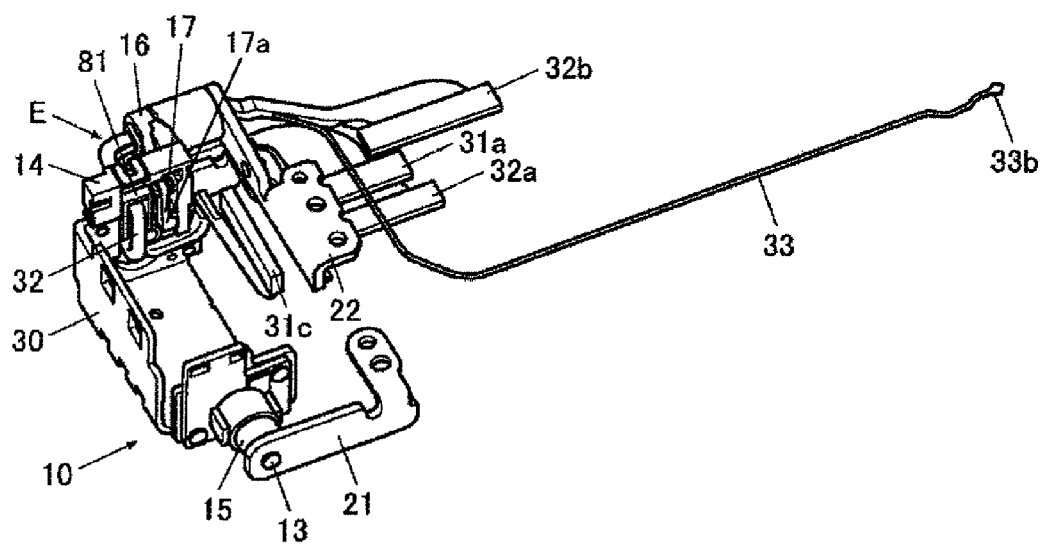
FIG. 49 is a drawing of the two-axis hinge unit and the wiring of FIG. 7 as viewed from a different direction.
Figure 50:
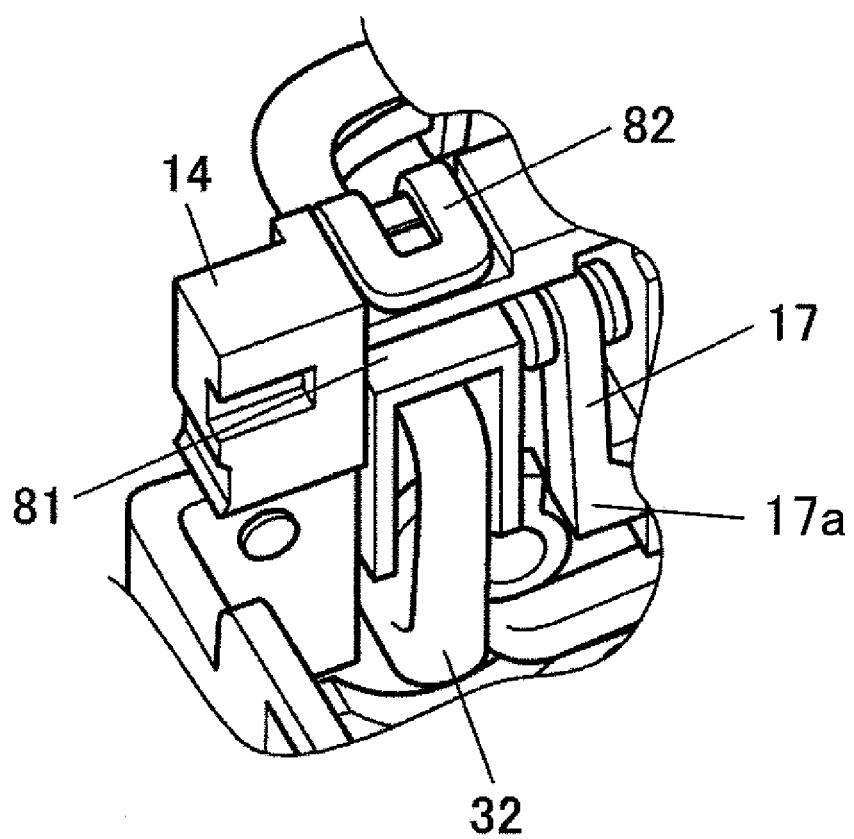
FIG. 50 is an enlarged view of the holding member and the wiring of FIG. 49 as viewed from the direction indicated by arrow E in FIG. 49.
Figure 51:
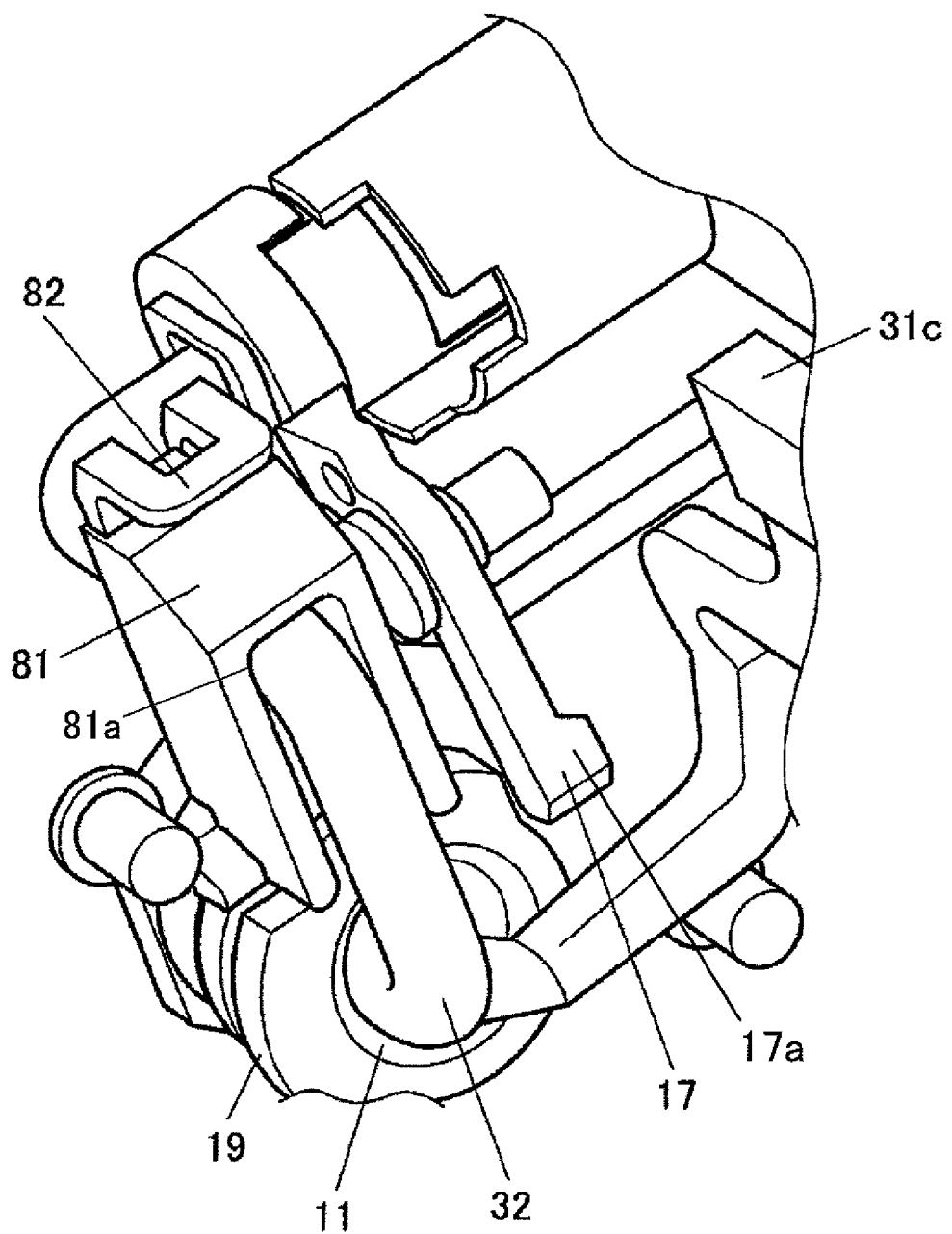
FIG. 51 is a drawing showing the relationship between the wiring and the holding member thereof in FIG. 50.
Figure 52:
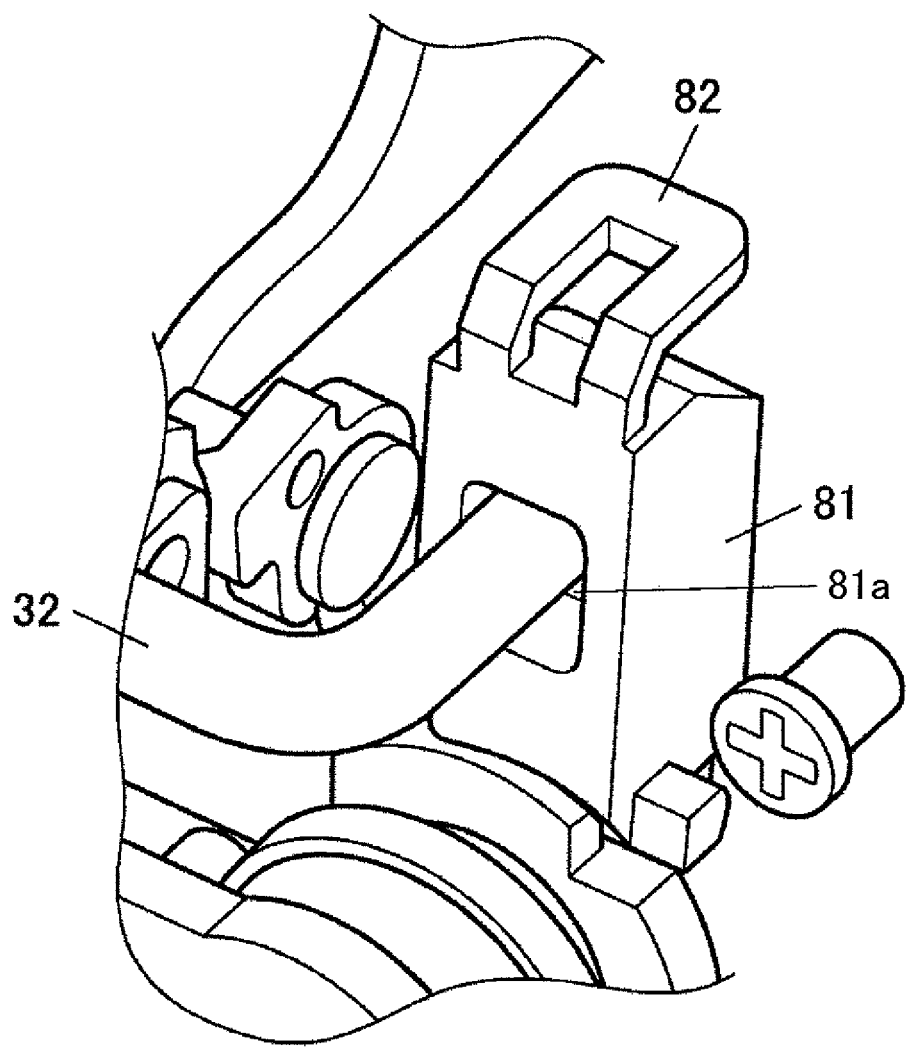
FIG. 52 is a drawing of the holding member of FIG. 51 as viewed from a different direction.

Next, FIG. 49 shows the two-axis hinge unit 10 and the second wiring 32 of FIG. 7 as viewed from a different direction. In addition, FIG. 50 shows an enlargement of the part of FIG. 49 indicated by the arrow E. In addition, FIG. 51 shows the second wiring 32 of FIG. 50 and the relationship of this to the holding member 81 thereof. In addition, FIG. 52 shows the holding member 81 of FIG. 51 as viewed from a different direction.

Figure 53:
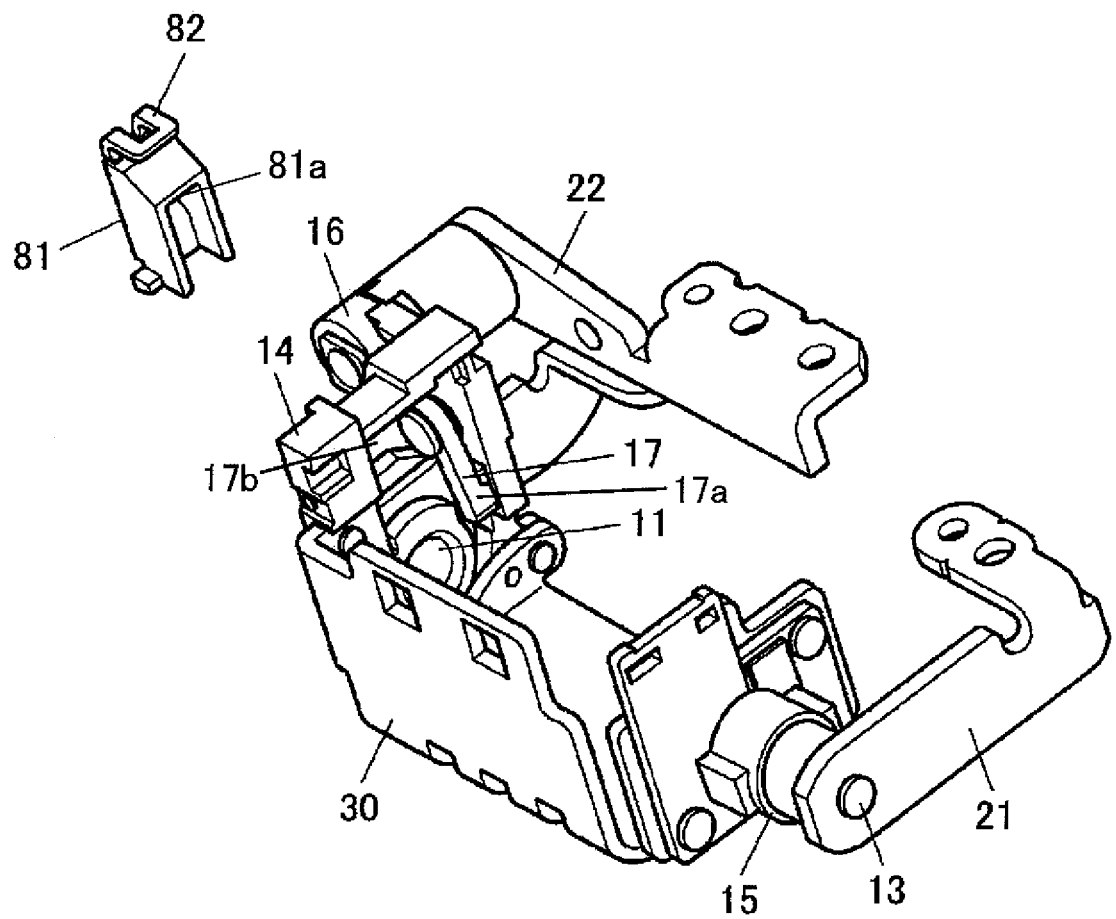
FIG. 53 is an exploded view of FIG. 49 showing the method of assembling the holding member into the two-axis hinge unit.

The antenna wire 33 and the second wiring 32, which are coaxial cables that pass through the hollow part of the first rotating shaft 11 and pass through the hollow part of the second rotating shaft 12, pass through and are held by the pass-through hole 81a of the resin holding member 81. This holding member 81 has a pass-through hold 81a through which pass the second wiring 32 and the antenna wire 33, as shown in FIGS. 51, 52, and 53, and has on the top surface thereof a clasp 82 having an L-shaped cross-section. The holding member 81 is positioned at the hole in the bracket 14 on the side surface of the frame 30, this is fastened to the bracket 14 by the clasp 82.

By having this separate holding member 81 mounted on the bracket 14 on the side surface of the frame 30 in this manner, it is easy to hold and guide through the wiring path the antenna wire 33 and the second wiring 32, which are coaxial cables passing inside the frame 30. Through the functions of this holding member 81, the second wiring 32 and the antenna wire 33 can be stably held without being cut even when the style of the mobile phone is changed. Further, the holding member 81 can prohibit the second wiring 32 and the antenna wire 33 from being an obstacle in the motion of the restriction plate 17.

Figure 54:
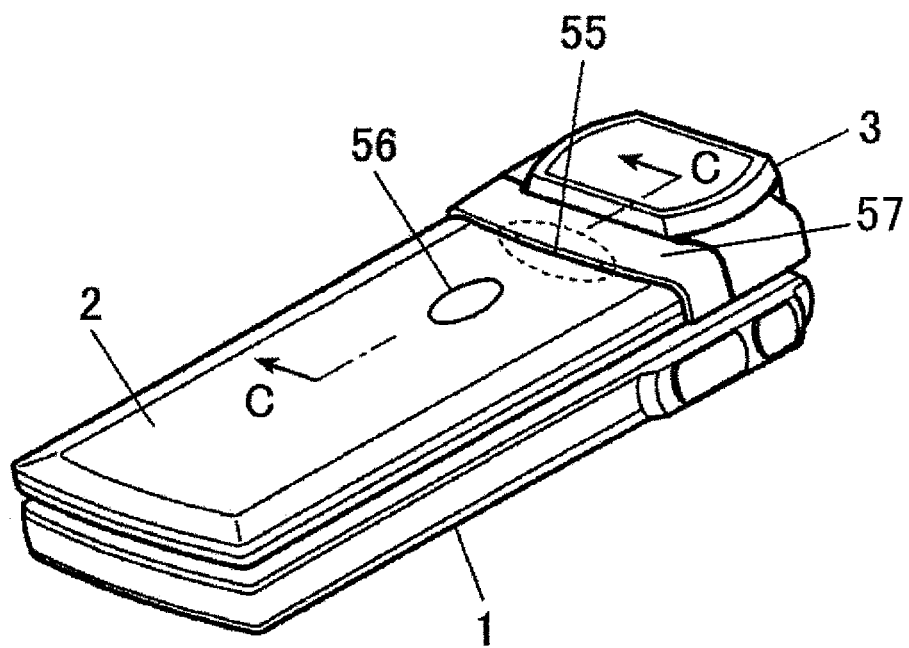
FIG. 54 is a drawing showing an incoming call lamp and the logo piece of the mobile phone in folded style of FIG. 1.

Next, FIG. 54 shows the incoming call lamp 55 and the logo piece 56 of the mobile phone of FIG. 1 in folded style. The incoming call lamp 55 and the logo piece 56, which is shown roughly oblong in shape in the drawing, are formed on the top surface of the second casing 2 in folded style.

Figure 55:
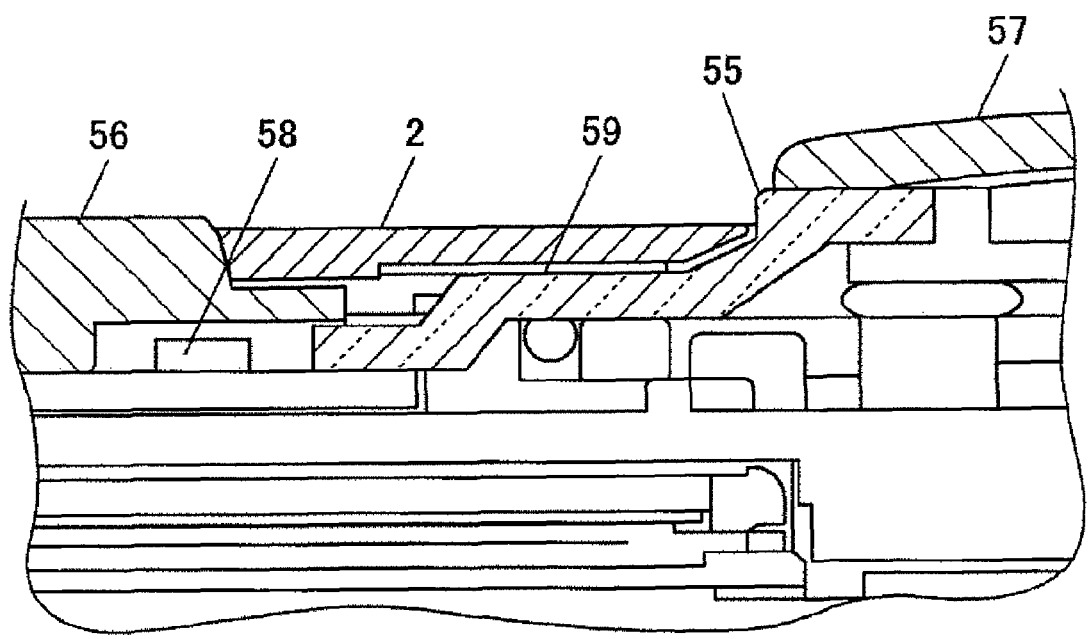
FIG. 55 is an enlarged cross-sectional view taken along line C-C in FIG. 54.

As shown in FIG. 55, the incoming call lamp 55 is formed in a slit shape between the top case and the cover 57 provided on the top surface of the end of the top case of the second casing 2. In addition, a three-color LED light source 58 is positioned below the logo piece 56 through a light-blocking member, and a light-guide member 59 is positioned toward the bottom of the cover 57 from near this three-color LED light source 58. In other words, the part of this light-guide member 59 positioned at the slit formed between the end of the top case and the cover 57 becomes the incoming call lamp 55.

Figure 56:
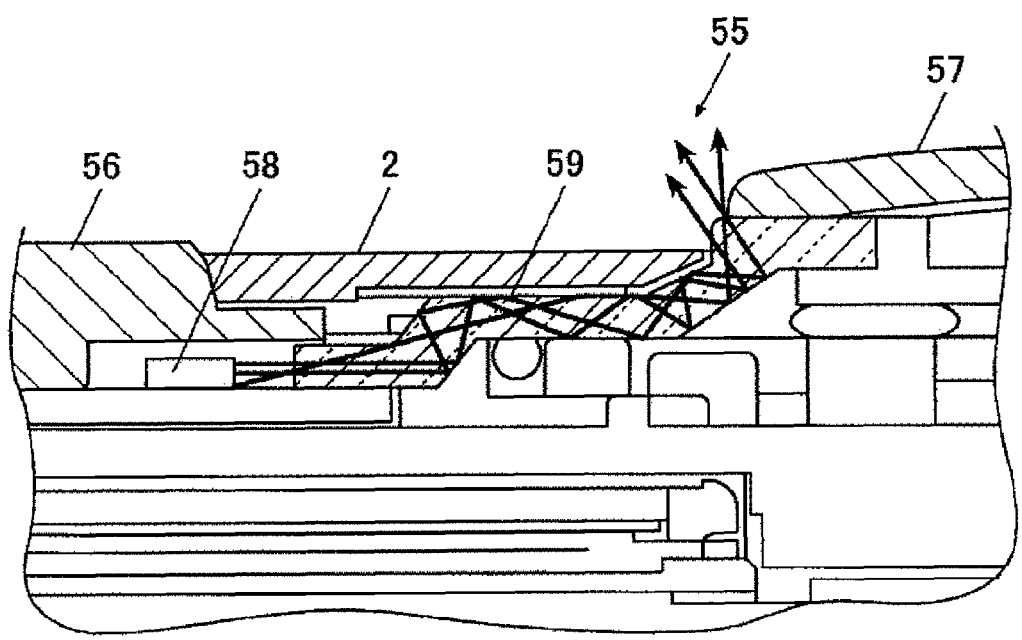
FIG. 56 is a drawing showing the path of light through the light guide member in FIG. 55.

As shown in FIG. 56, light from the three-light LED light source 58 at the time of an incoming call is emitted to the outside in a readily visible manner as the incoming call lamp 55 after passing through the light-guide member 59.

Figure 57:
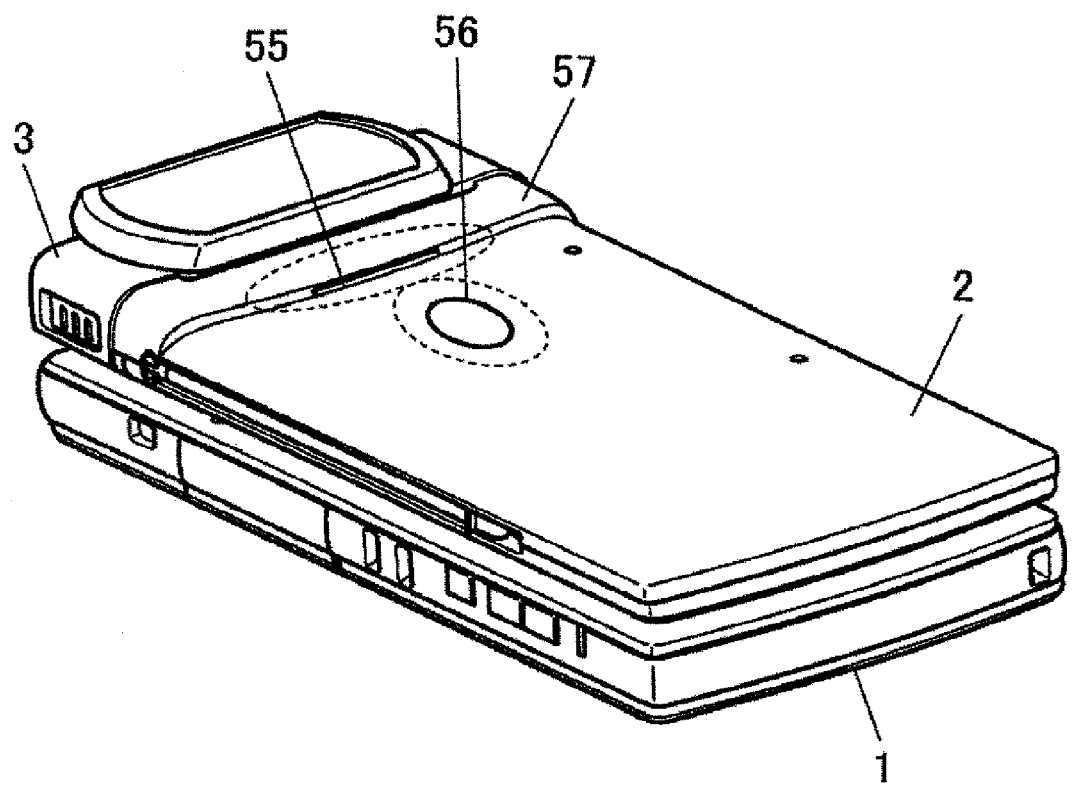
FIG. 57 is a drawing showing an example of shared illumination in the incoming call lamp and the logo piece of FIG. 54.

As shown in FIG. 57, the logo piece 56, for example, may be foamed of transparent materials. By so doing, the logo piece 56 can also give off light in a readily visible manner along with the incoming call lamp 55 at the time of incoming calls.

Figure 58:
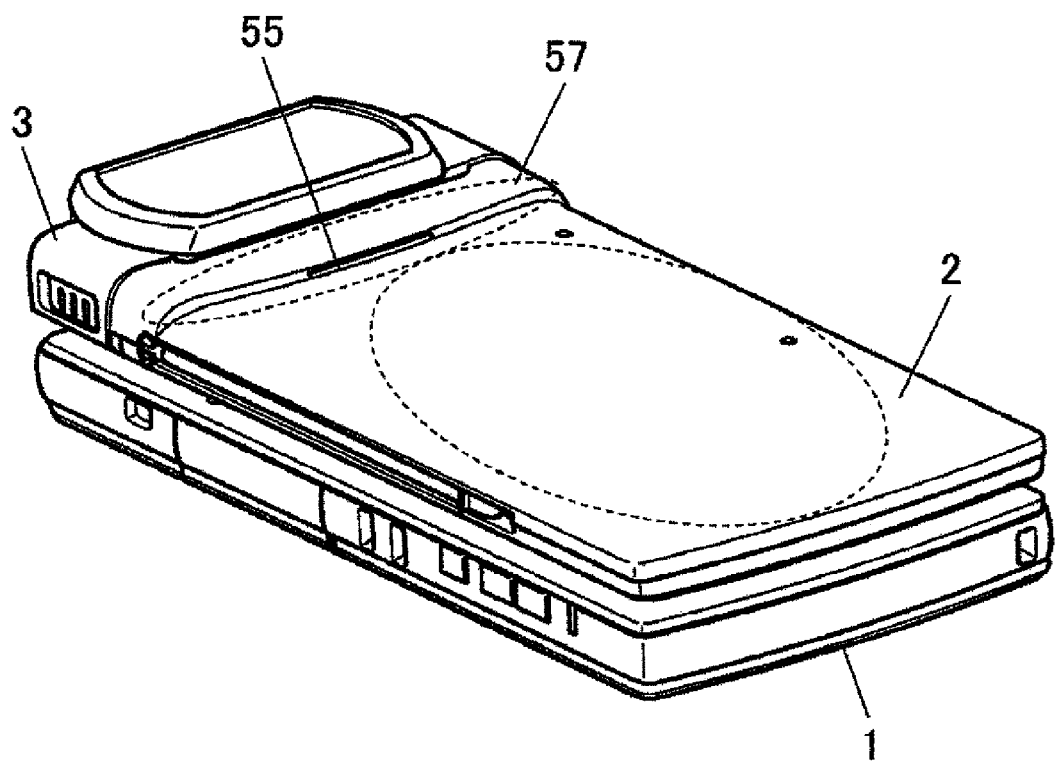
FIG. 58 is a drawing showing an example of shared illumination in the incoming call lamp and the case front surface of FIG. 54.

As shown in FIG. 58, the front surface of the top case may also be formed of a transparent material. By so doing, the front surface of the top case can also give off light in a readily visible manner along with the incoming call lamp 55 at the time of incoming calls.

Figure 59:
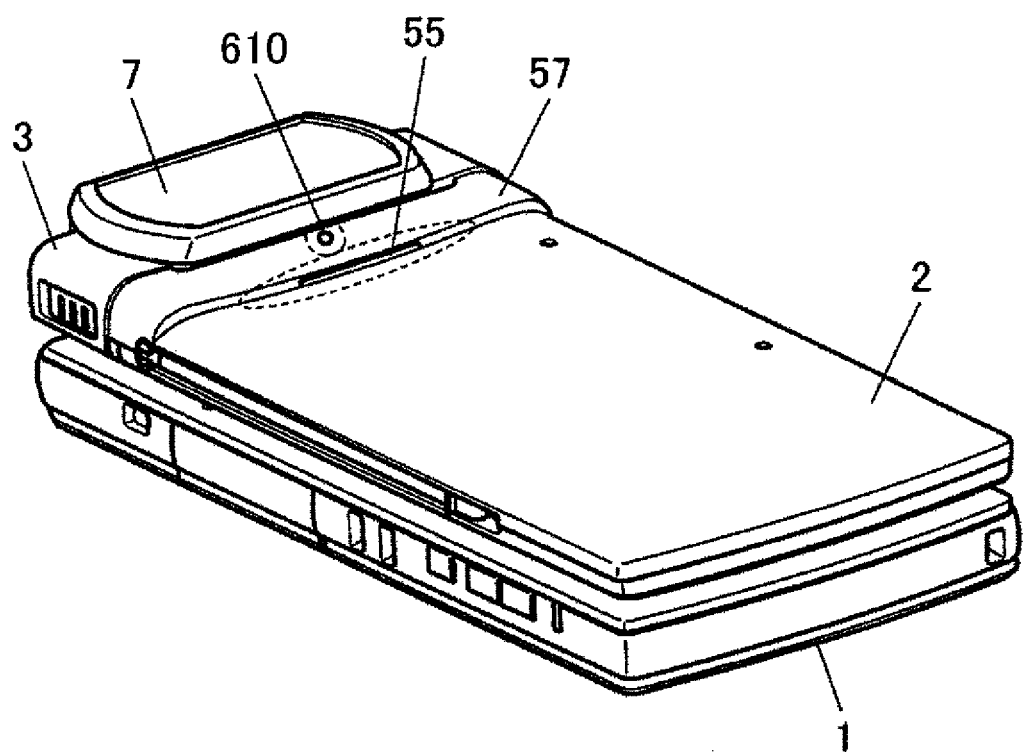
FIG. 59 is a drawing showing an example of shared illumination in the incoming call lamp and a flash of FIG. 54.

As shown in FIG. 59, a flash 610 with an LED light source may be provided at a position adjacent to the incoming call lamp 55 in the center of the cover 57. By so doing, the incoming call lamp 55 can emit light in a readily visible manner at the time of incoming calls, and furthermore, when using the camera and shooting movies, the flash 610 of the photography unit 7 can also emit light in a readily visible manner. In addition, when a call is received simultaneously with the emission of light from the flash 610, the incoming call lamp can emit light in a readily visible manner.

Figure 2:
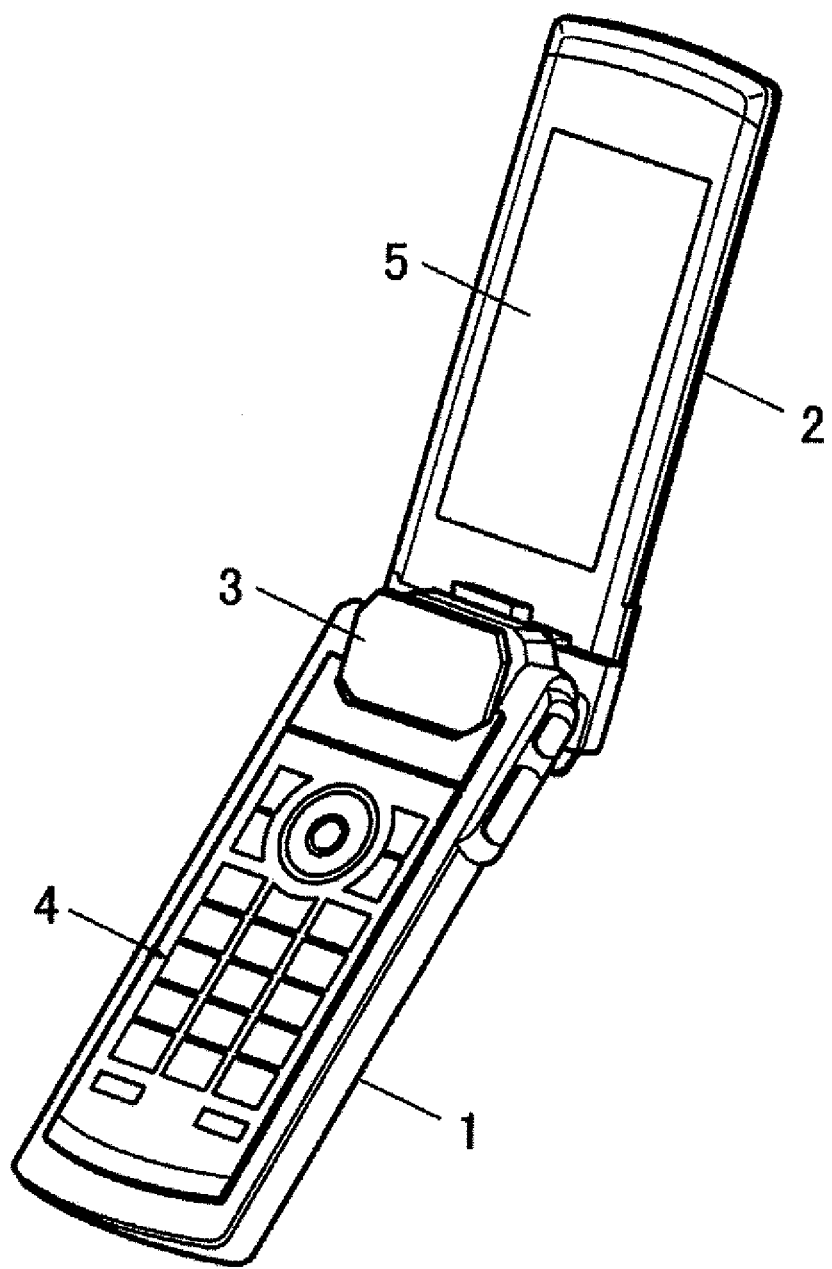
FIG. 2 is an oblique view showing the mobile shown in FIG. 1 in normal open style, opened in the vertical direction.
Figure 60:
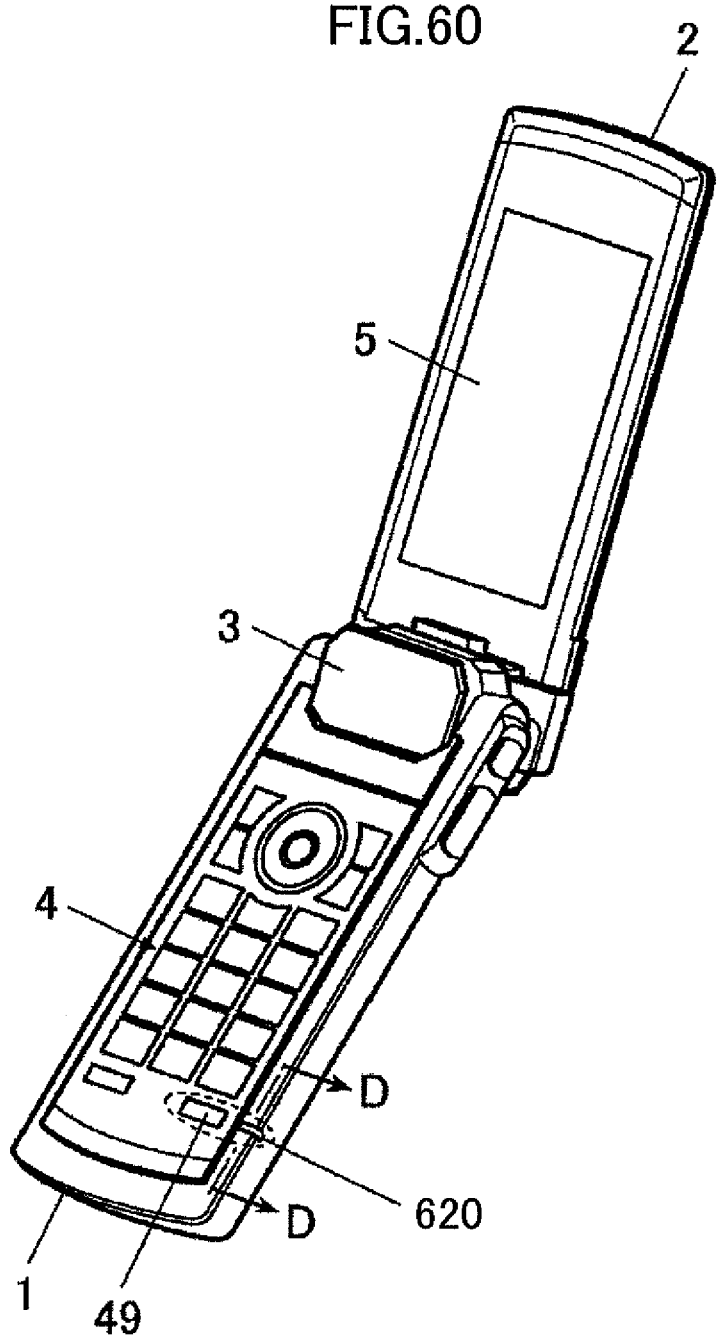
FIG. 60 is a drawing showing a charging lamp of FIG. 2 in the normal open style.

Next, FIG. 60 shows a charging lamp 620 in the normal open style of FIG. 2. As shown in this drawing, the slit-shaped charging lamp 620 is provided to the side surface and the top surface of the top case, near the photography standby key 49 in the first casing 1.

Figure 61:
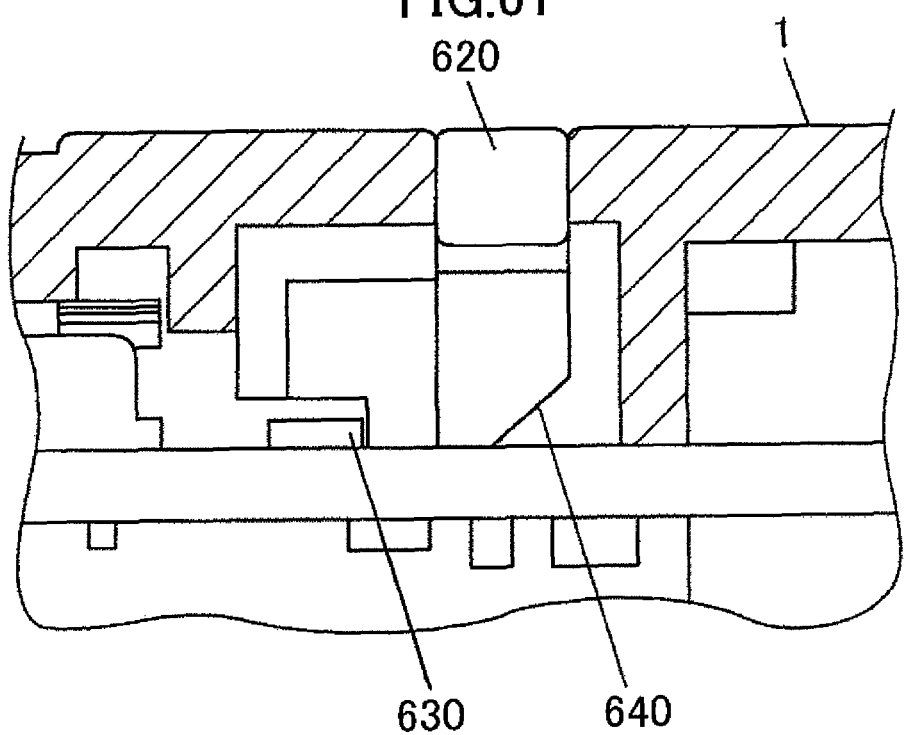
FIG. 61 is an enlarged cross-sectional view taken along line D-D in FIG. 60.

As shown in FIG. 61, the three-light LED light source 630 is positioned near the photograph standby key 49 inside the first casing 1. The light-guide member 640 is positioned to the top and side from near this three-light LED light source 630. That is to say, the portion of this light-guide member 640 positioned in the slit formed in the side surface and top surface of the top case becomes the charging lamp 620.

Figure 62:
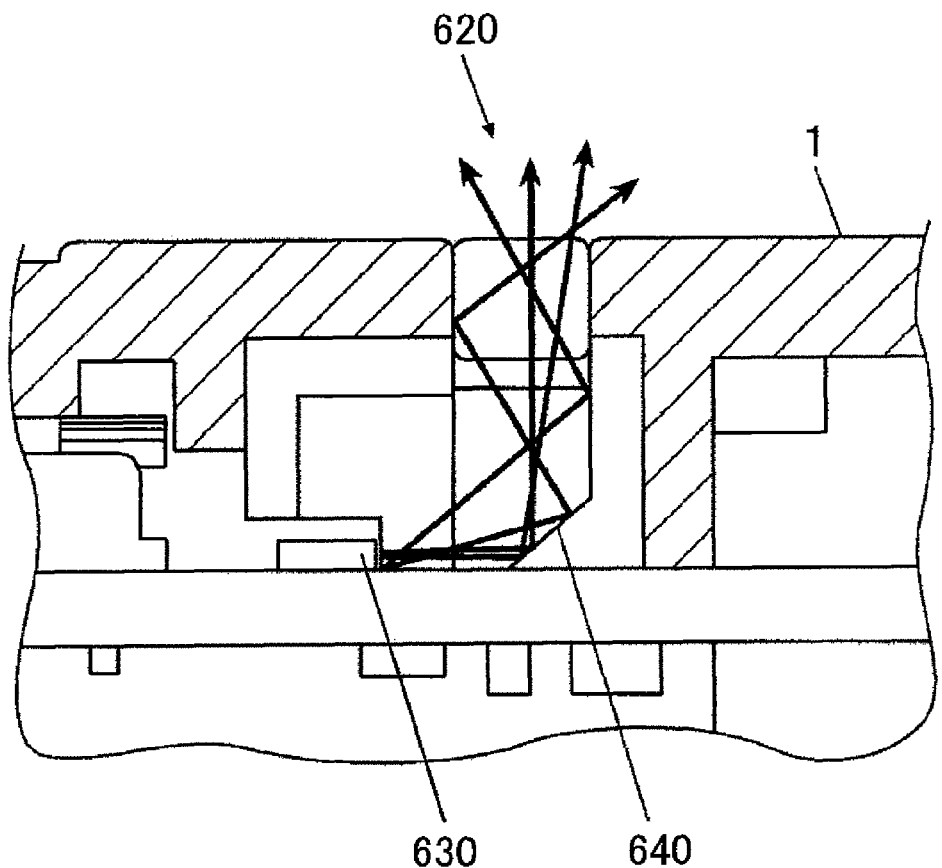
FIG. 62 is a drawing showing the path of light in the light guide member of FIG. 61.

As shown in FIG. 62, light emitted from the three-light LED light source 630 at the time of charging passes through the light-guide member 640 and is emitted to the outside in a readily visible manner as the charging lamp 620. In addition, the charging lamp 620 emits light in a readily visible manner to the outside when the photography standby key 49, which is a special key, is used. Through this, the user can visibly confirm the photography standbystate.

In addition, the light emitted by the charging lamp 620 and the photography standby key 49 may be shared, and in so doing, the charging lamp 620 and the photography standby key 49 both emit light in a readily visible manner at the time of charging, and in addition, the charging lamp 620 and the photography standby key 49 both emit light in a readily visible manner when the photography standby key 49 is used.

Figure 63:
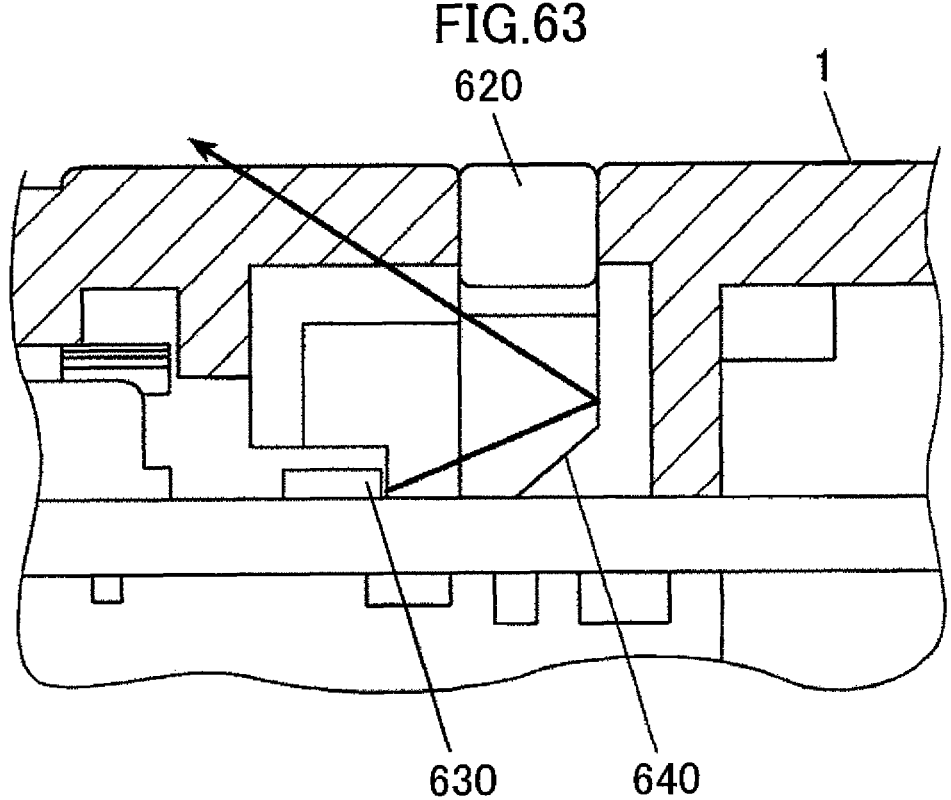
FIG. 63 is a drawing showing an example of shared illumination in the light guide member and near such in FIG. 61.

As shown in FIG. 63, by forming the part of the top case near the charging lamp 620 of transparent materials, the charging lamp 620 and the parts close thereto can emit light in a readily visible manner at the time of charging and at the time the photography standby key 49 is used.

In addition, by providing the incoming call lamp 55 on the end of the second casing 2 to the third casing 3 side, positioning the three-light LED light source 58 below the logo piece 56 provided near that incoming call lamp 55 and providing the light-guide member 59 for guiding light from this three-light LED light source 58 to the incoming call lamp 55, it is possible for the incoming call lamp 55 to emit light in a readily visible manner by emitting light from this three-light LED light source 58 at the time of incoming calls.

In addition, by providing the charging lamp 620 near the photography standby key 49 on the side of the first casing 1 separated from the third casing 3, positioning the three-light LED light source 630 on the bottom side near the photography standby key 49 and providing the light-guide member 640 to guide light from this three-light LED light source 630 to the charging lamp 620, it is possible for the charging lamp 620 to emit light in a readily visible manner by emitting light from the three-light LED light source 630 at the time the special photography standby key 49 is used.

Variation

Figure 64:
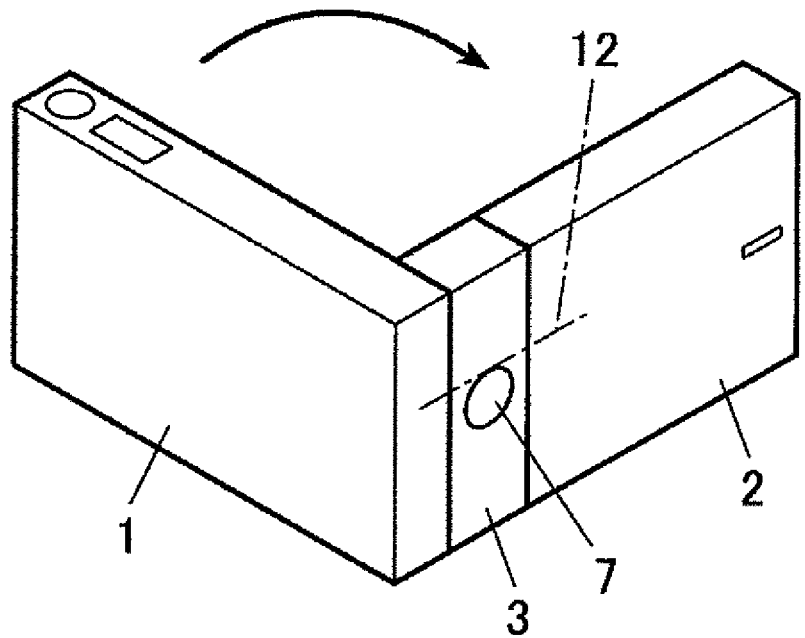
FIG. 64 shows a variation of a mobile phone in the movie style and is an oblique view of the same.
Figure 65:
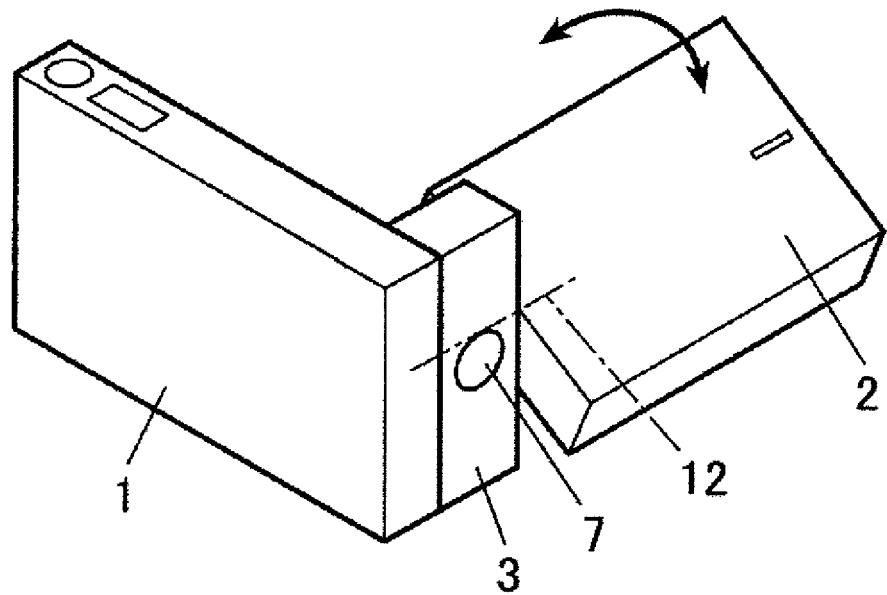
FIG. 65 is a drawing showing a high angle state in the movie style of FIG. 64.

FIGS. 64 and 65 show a variation. In the above-described embodiments, the two-axis hinge unit 10 was explained with the second rotating shaft 12 provided on one side of the third casing 3. In this variation, the second rotating shaft 12 is provided in the center of the third casing 3, as shown in the figures. In other words, the second casing 2 rotates freely about the first casing 1 and the third casing 3 centered about the centrally positioned second rotating shaft 12.

With a two-axis hinge unit 10 having the second rotating shaft 12 provided in the center in this manner, it is possible to achieve the movie style the same as in the above-described embodiments, as shown in the figures, and furthermore, by changing the orientation of the display unit 5 as a finder, it is possible to achieve the high angle style and the low angle style.

In the above-described embodiments, the description was of a mobile phone, but this is intended to be illustrative and not limiting, for the present invention may also be used in PDAs (Personal Digital Assistants), notebook personal computers, wearable personal computers, calculators, electronic notebooks and all other equipments in which casings can freely open horizontally or vertically.

In addition, the shape of the restriction members is arbitrary, and naturally it is possible to appropriately change this with other specific detailed structures or the like.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A two-axis hinge comprising:
    a first rotating shaft, which is positioned on a boundary between an end of a first casing and an end of a second casing, and which through rotating in one direction changes between a folded state with the first casing and the second casing overlapping and an open state with the first casing and the second casing separated from each other;
    a second rotating shaft, which is positioned orthogonal to the first rotating shaft, and which through rotating in another direction orthogonal to the first direction changes between a folded state with the first casing and the second casing overlapping and an open state with the first casing and the second casing separated from each other;
    a restriction member, which is positioned at an end of the first rotating shaft and an end of the second rotating shaft facing said end of the first rotating shaft, such that when one of the rotating shafts is in a predetermined rotational position, the restriction member is pressed by said one rotating shaft and engages with the other rotating shaft, restricting rotation of said other rotating shaft;
    a first cam provided on the first rotating shaft and having a non-uniform radius including a large diameter part and a small diameter part; and
    a second cam provided on the second rotating shaft and having a non-uniform radius including a large diameter part and a small diameter part;
    wherein the restriction member is composed of a first member that abuts the first cam and a second member that abuts the second cam;
    the first member and the second member are positioned so as to be independently slidable up to a position mutually impeding sliding; and
    when the first member abuts the large diameter part of the first cam, the first member restricts sliding of the second member, thereby restricting rotation of the second cam and the second rotating shaft, and when the second member abuts the large diameter part of the second cam, the second member restricts sliding of the first member, thereby restricting rotation of the first cam and the first rotating shaft, and when the first member and the second member are respectively abutting the small diameter part of the first cam and the small diameter part of the second cam, the first member and the second member respectively permit sliding of the second member and the first member, thereby permitting rotation of the second rotating shaft and the first rotating shaft.

2. The two-axis hinge according to claim 1, wherein a hole is formed in a portion of the first member in the sliding direction of the second member; and
    the restriction member permits rotation of the second rotating shaft by said hole in the first member permitting sliding of the second member.

* * * * *